US012699973B1

(12) United States Patent
Prentice

(10) Patent No.: US 12,699,973 B1
(45) Date of Patent: Aug. 4, 2026

(54) ENCRYPTION SERVICE API FOR ENHANCING SECURITY FOR PAYMENT PROCESSING

(71) Applicant: Lithic, Inc., New York, NY (US)

(72) Inventor: Michael Prentice, Ithaca, NY (US)

(73) Assignee: Lithic, Inc., New York, NY (US)

( * ) Notice: Subject to any disclaimer, the term of this patent is extended or adjusted under 35 U.S.C. 154(b) by 186 days.

(21) Appl. No.: 18/181,478

(22) Filed: Mar. 9, 2023

(51) Int. Cl.
  *G06Q 20/10*  (2012.01)
  *G06Q 20/38*  (2012.01)

(52) U.S. Cl.
  CPC ....... *G06Q 20/108* (2013.01); *G06Q 20/3827* (2013.01); *G06Q 20/3829* (2013.01); *G06Q 2220/00* (2013.01)

(58) Field of Classification Search
  CPC ............. G06Q 20/108; G06Q 20/3827; G06Q 20/3829; G06Q 2220/00
  See application file for complete search history.

(56) References Cited

U.S. PATENT DOCUMENTS

| | | | | | |
|---|---|---|---|---|---|
| 11,645,650 | B1 * | 5/2023 | Singh | ................ | G06Q 20/3674 |
| | | | | | 705/75 |
| 2009/0101707 | A1 * | 4/2009 | Kurasaki | .................. | G07F 7/10 |
| | | | | | 235/380 |
| 2009/0119190 | A1 * | 5/2009 | Realini | .............. | G06Q 20/3265 |
| | | | | | 705/37 |

| | | | | | |
|---|---|---|---|---|---|
| 2012/0143767 | A1 * | 6/2012 | Abadir | .................... | H04L 9/321 |
| | | | | | 705/64 |
| 2016/0314465 | A1 * | 10/2016 | Martin | ................... | G06Q 20/20 |
| 2017/0308880 | A1 * | 10/2017 | Phillips | .............. | G06Q 20/4012 |

(Continued)

FOREIGN PATENT DOCUMENTS

| | | | | | |
|---|---|---|---|---|---|
| CN | 106170809 | A | * 11/2016 | ........ | G06F 3/04817 |
| CN | 106992996 | A | * 7/2017 | ........ | H04L 63/0428 |

(Continued)

OTHER PUBLICATIONS

Quang Hieu Vu, Secure Cloud Storage: A framework for Data Protection as a Service in the multi-cloud environment, 2015, IEEE, https://ieeexplore.ieee.org/stamp/stamp.jsp?tp=&arnumber=7346879 (Year: 2015).*

*Primary Examiner* — Chunling Ding
(74) *Attorney, Agent, or Firm* — Baker Botts L.L.P.

(57) ABSTRACT

In one embodiment, a method includes receiving a request from a requesting server by an encryption service API to retrieve account data associated with a virtual bank account (VBAN), wherein the VBAN is decoupled from an external resource account, and wherein the request comprises an identifier associated with the VBAN, accessing an encryption key associated with a secure storage database by the encryption service API, wherein the secure storage database comprises encrypted account data associated with the VBAN and the external resource account, transmitting the encryption key and the identifier by the encryption service API to the secure storage database, receiving decrypted account data associated with the VBAN from the secure storage database by the encryption service API, wherein the decrypted account data is determined based on the encryption key and the encrypted account data, and transmitting the decrypted account data to the requesting server.

19 Claims, 12 Drawing Sheets

(56)          References Cited

U.S. PATENT DOCUMENTS

| | | | | |
|---|---|---|---|---|
| 2019/0386814 | A1* | 12/2019 | Ahmed | .................. H04L 9/008 |
| 2021/0150515 | A1* | 5/2021 | Lu | ........................ G06Q 20/389 |
| 2021/0226933 | A1* | 7/2021 | Puzeris | ............... H04L 63/0442 |
| 2022/0058617 | A1* | 2/2022 | Tibrewala | ............. H04L 67/146 |
| 2023/0141952 | A1* | 5/2023 | West | .................. G06F 21/6218 |
| | | | | 707/785 |
| 2023/0208616 | A1* | 6/2023 | Sato | ................... H04L 63/0428 |
| | | | | 713/171 |
| 2023/0409731 | A1* | 12/2023 | Voelker | ................. H04L 9/0894 |
| 2024/0054498 | A1* | 2/2024 | Sinha | .................. G06Q 20/202 |
| 2024/0160629 | A1* | 5/2024 | Srivastava | ........ G06F 16/24545 |

FOREIGN PATENT DOCUMENTS

| | | | | | |
|---|---|---|---|---|---|
| CN | 111723385 | A | * | 9/2020 | ............. G06F 21/64 |
| WO | WO-2010003079 | A1 | * | 1/2010 | ............. G06Q 40/12 |
| WO | WO-2021249527 | A1 | * | 12/2021 | ........... G06Q 20/409 |

* cited by examiner

Figure 9:
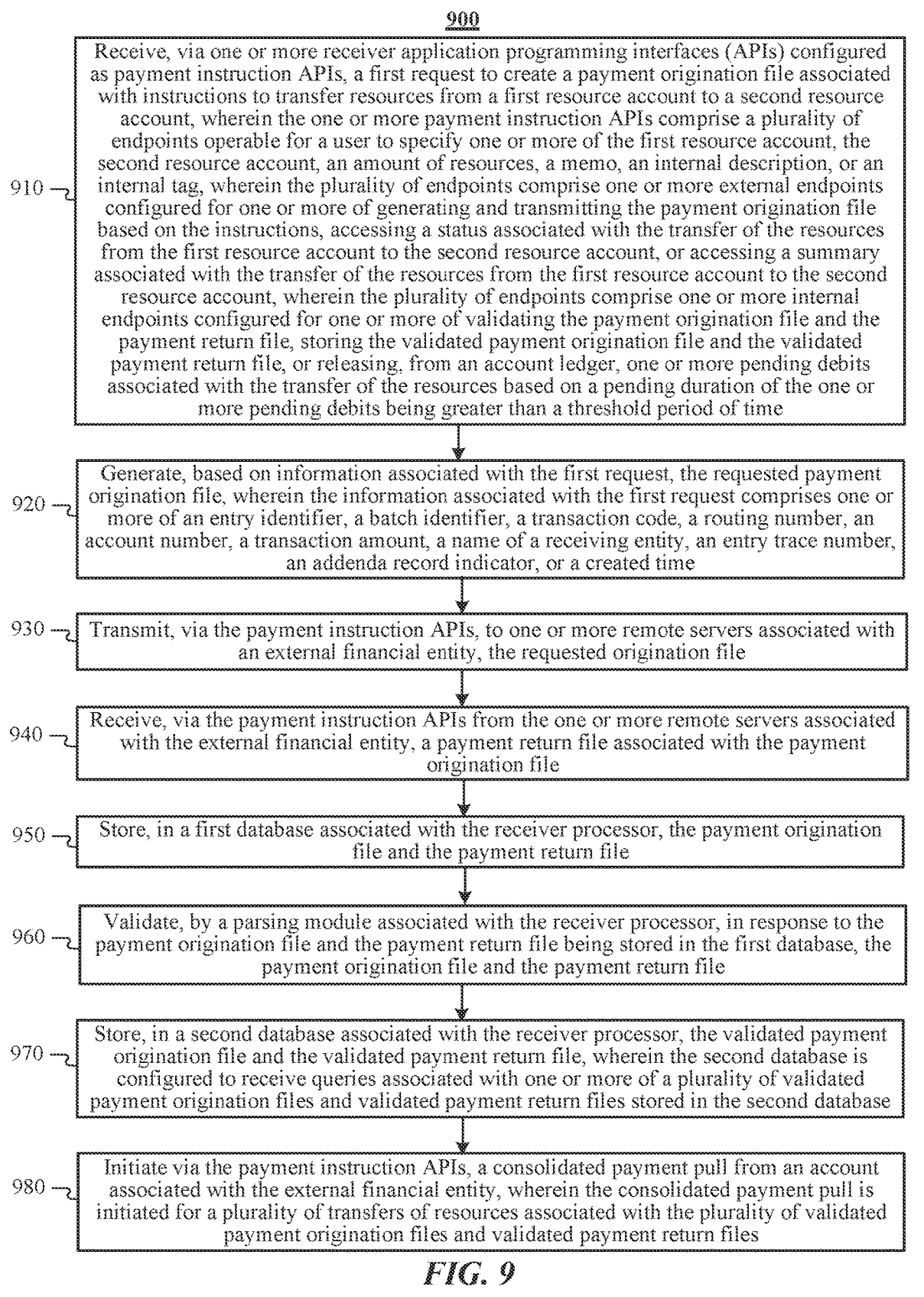

900

910 — Receive, via one or more receiver application programming interfaces (APIs) configured as payment instruction APIs, a first request to create a payment origination file associated with instructions to transfer resources from a first resource account to a second resource account, wherein the one or more payment instruction APIs comprise a plurality of endpoints operable for a user to specify one or more of the first resource account, the second resource account, an amount of resources, a memo, an internal description, or an internal tag, wherein the plurality of endpoints comprise one or more external endpoints configured for one or more of generating and transmitting the payment origination file based on the instructions, accessing a status associated with the transfer of the resources from the first resource account to the second resource account, or accessing a summary associated with the transfer of the resources from the first resource account to the second resource account, wherein the plurality of endpoints comprise one or more internal endpoints configured for one or more of validating the payment origination file and the payment return file, storing the validated payment origination file and the validated payment return file, or releasing, from an account ledger, one or more pending debits associated with the transfer of the resources based on a pending duration of the one or more pending debits being greater than a threshold period of time 920 — Generate, based on information associated with the first request, the requested payment origination file, wherein the information associated with the first request comprises one or more of an entry identifier, a batch identifier, a transaction code, a routing number, an account number, a transaction amount, a name of a receiving entity, an entry trace number, an addenda record indicator, or a created time 930 — Transmit, via the payment instruction APIs, to one or more remote servers associated with an external financial entity, the requested origination file 940 — Receive, via the payment instruction APIs from the one or more remote servers associated with the external financial entity, a payment return file associated with the payment origination file 950 — Store, in a first database associated with the receiver processor, the payment origination file and the payment return file 960 — Validate, by a parsing module associated with the receiver processor, in response to the payment origination file and the payment return file being stored in the first database, the payment origination file and the payment return file 970 — Store, in a second database associated with the receiver processor, the validated payment origination file and the validated payment return file, wherein the second database is configured to receive queries associated with one or more of a plurality of validated payment origination files and validated payment return files stored in the second database 980 — Initiate via the payment instruction APIs, a consolidated payment pull from an account associated with the external financial entity, wherein the consolidated payment pull is initiated for a plurality of transfers of resources associated with the plurality of validated payment origination files and validated payment return files

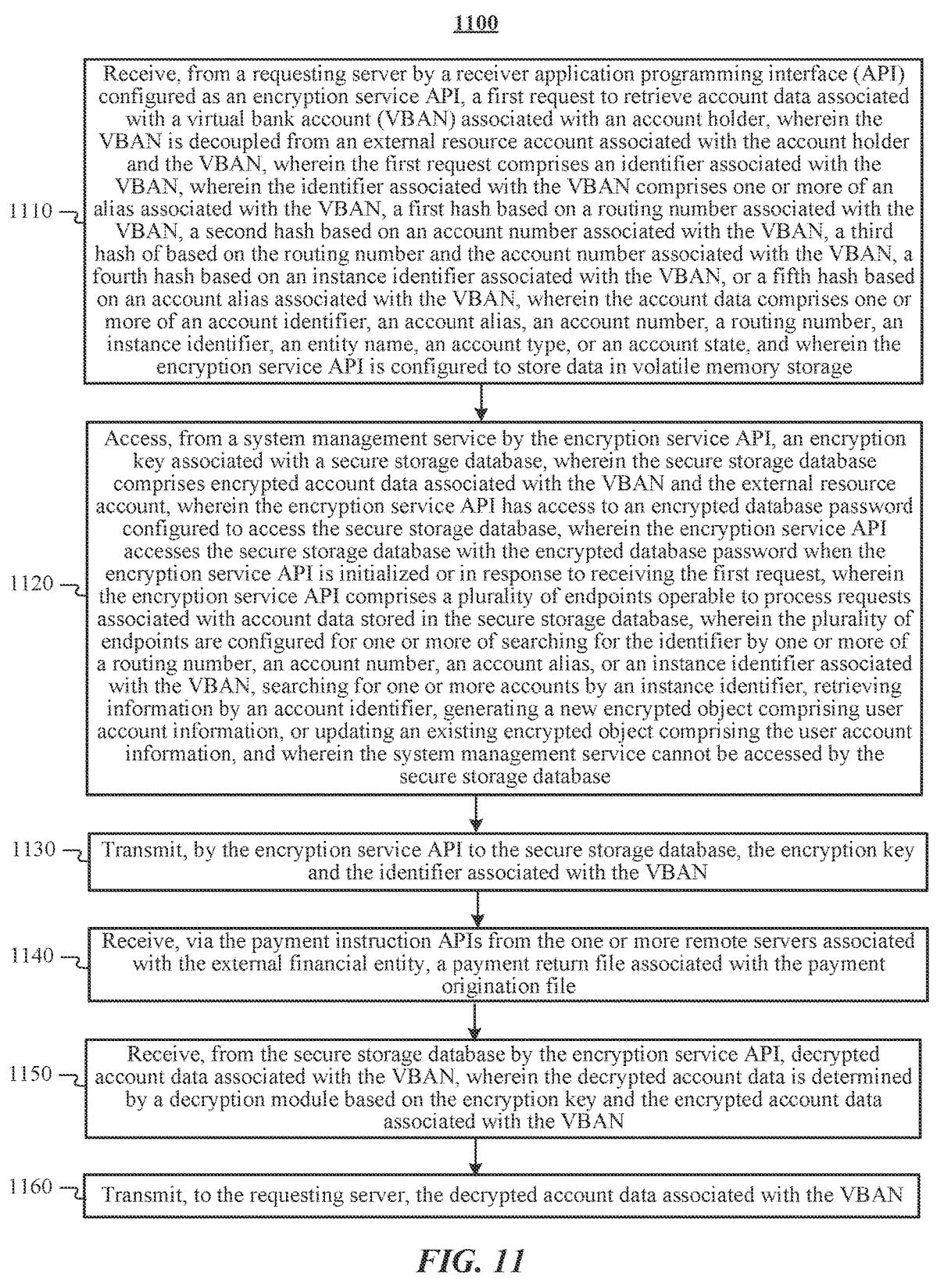

1110 — Receive, from a requesting server by a receiver application programming interface (API) configured as an encryption service API, a first request to retrieve account data associated with a virtual bank account (VBAN) associated with an account holder, wherein the VBAN is decoupled from an external resource account associated with the account holder and the VBAN, wherein the first request comprises an identifier associated with the VBAN, wherein the identifier associated with the VBAN comprises one or more of an alias associated with the VBAN, a first hash based on a routing number associated with the VBAN, a second hash based on an account number associated with the VBAN, a third hash of based on the routing number and the account number associated with the VBAN, a fourth hash based on an instance identifier associated with the VBAN, or a fifth hash based on an account alias associated with the VBAN, wherein the account data comprises one or more of an account identifier, an account alias, an account number, a routing number, an instance identifier, an entity name, an account type, or an account state, and wherein the encryption service API is configured to store data in volatile memory storage 1120 — Access, from a system management service by the encryption service API, an encryption key associated with a secure storage database, wherein the secure storage database comprises encrypted account data associated with the VBAN and the external resource account, wherein the encryption service API has access to an encrypted database password configured to access the secure storage database, wherein the encryption service API accesses the secure storage database with the encrypted database password when the encryption service API is initialized or in response to receiving the first request, wherein the encryption service API comprises a plurality of endpoints operable to process requests associated with account data stored in the secure storage database, wherein the plurality of endpoints are configured for one or more of searching for the identifier by one or more of a routing number, an account number, an account alias, or an instance identifier associated with the VBAN, searching for one or more accounts by an instance identifier, retrieving information by an account identifier, generating a new encrypted object comprising user account information, or updating an existing encrypted object comprising the user account information, and wherein the system management service cannot be accessed by the secure storage database 1130 — Transmit, by the encryption service API to the secure storage database, the encryption key and the identifier associated with the VBAN 1140 — Receive, via the payment instruction APIs from the one or more remote servers associated with the external financial entity, a payment return file associated with the payment origination file 1150 — Receive, from the secure storage database by the encryption service API, decrypted account data associated with the VBAN, wherein the decrypted account data is determined by a decryption module based on the encryption key and the encrypted account data associated with the VBAN 1160 — Transmit, to the requesting server, the decrypted account data associated with the VBAN

*FIG. 11*

ENCRYPTION SERVICE API FOR ENHANCING SECURITY FOR PAYMENT PROCESSING

TECHNICAL FIELD

This disclosure generally relates to databases and file management within network environments, and in particular relates to hardware and software for securing and validating multi-server electronic communications within a network environment.

BACKGROUND

Payment systems provided by banks and other financial institutions are used in lieu of tendering cash in domestic and international transactions. A payment system is any system used to transact, clear, and settle payment transactions through the transfer of currency (e.g., monetary currency, virtual currency, etc.). This includes the institutions, instruments, people, entities, services, rules, procedures, standards, and technologies that make its exchange possible. A common type of payment system is called an operational network, which links bank accounts and provides for monetary exchange using bank deposits. Some payment systems also include credit mechanisms, which are essentially agreements with financial entities to lend currency to borrowers to be repaid at a later point in time.

Traditional payment systems include negotiable instruments such as drafts (e.g., cheques) and documentary credits such as letters of credit. With the advent of computers and electronic communications, many alternative electronic payment systems have emerged. The term electronic payment refers to a payment made from one bank account to another using electronic methods, forgoing the need for bank employees to directly facilitate each transaction. In particular, the term electronic payment may refer to e-commerce, i.e., a payment for buying and selling goods or services offered through an electronic transfer of funds (e.g., through the Internet or other suitable computer network environments). In contrast to traditional payment systems, modern payment systems utilize electronic transactions based on debit cards, credit cards, electronic cards, electronic funds transfers, direct credits, direct debits, internet banking, and other forms of e-commerce payment systems.

Payment systems may be physical or electronic, and each payment system may have its own procedures and protocols. Standardization has allowed some of these systems and networks to grow to a global scale, but there are still many country-specific, platform-specific, entity-specific, and/or product-specific systems. Examples of payment systems that have become globally ubiquitous are credit cards and automated teller machine (ATM) networks. Other specific forms of payment systems are also used to settle financial transactions for products in the equity markets, bond markets, currency markets, futures markets, derivatives markets, and options markets. Additionally, various techniques exist to transfer funds between financial institutions. Domestically, this is accomplished using automated clearing house (ACH) and real-time gross settlement (RTGS) systems. Internationally, this is accomplished using the Society for Worldwide Interbank Financial Telecommunication (SWIFT) network.

SUMMARY OF PARTICULAR EMBODIMENTS

In particular embodiments, a receiver processor may automatically secure and validate multi-server electronic communications over a plurality of networks without requiring additional physical or programmatic infrastructure on the intermediary servers/entities. The receiver processor may communicate with different entities in a payment system, either directly or indirectly, to facilitate account/card generation and transaction payment processing. As an example and not by way of limitation, these entities may comprise an account holder such as an individual payer, a commerce entity such as a merchant, an enterprise client, a payment network, a receiver institution such as an issuing bank, an originator institution such as an acquiring bank, a receiver processor, an originator processor, a payment facilitator, other suitable entities, or any combination thereof. In particular embodiments, the receiver processor may utilize (and/or make available) application programming interface (API) resources, which may provide a predictable and programmatic interface to create and configure accounts/cards and facilitate electronic transactions associated with the accounts/cards. As an example and not by way of limitation, based on real-time payment data, the receiver processor may programmatically issue cards, configure card permissions, and set authorization parameters (e.g., spending limits, periodic limits, merchant locking, location matching, risk thresholds, etc.) all through an API generated by, implemented by, and/or provided by a receiver processor. As another example and not by way of limitation, during a transaction, the receiver processor may authenticate requests from individual payers or enterprise clients via the API, and return the authentication results to them via the API. As yet another example and not by way of limitation, during a transaction, the receiver processor may verify transaction requests from merchants, payment networks, acquirer processors, issuing banks, and/or acquiring banks via the API, and return the verification results to them via the API. Although this disclosure describes particular functions of particular issuer processors in a particular manner, this disclosure contemplates any suitable function of any suitable issuer processor in any suitable manner.

In particular embodiments, the receiver processor may utilize a payment instruction API (PIAPI) as a microservice to accept and process payment requests. As an example and not by way of limitation, the payment requests may be ACH originations. An ACH transaction is an electronic fund transfer made between banks and credit unions across the automated clearing house network. ACH may be used for all kinds of fund transfer transactions, including direct deposit of paychecks and monthly debits for routine payments. In particular embodiments, payments may be requested in batch or individually and the status thereof may be interrogated. The payment instruction API may also support the origination of ACH credits/debits in response to requests from internal services, may allow the entity associated with the receiver processor to automate post-pay program-level settlements and consolidate cardholder funded transactions into a single daily ACH, and may enable a streamlined process of issuing chargeback credits to enterprise clients of the receiver processor. The embodiments disclosed herein may be applied to various types and methods of payments requests including ACH originations, Fedwire, acquiring, pull payments, push payments, etc. In particular embodiments, a pull payment may be a method of payment whereby the payee instructs the payer to send the money. Therefore, the payee may be in control of the payment and instructing that the money be sent. Beforehand, however, a payer may need to give authorization for the funds to be taken. By contrast, a push payment may be a method of payment whereby a payer initiates the sending of money to a payee.

The payer may be therefore in control of the payment, including the amount and destination. Although this disclosure describes processing particular payment requests in a particular manner, this disclosure contemplates processing any suitable payment request in any suitable manner.

In particular embodiments, the receiver processor may receive, via one or more receiver application programming interfaces (APIs) configured as payment instruction APIs, a first request to create a payment origination file associated with instructions to transfer resources from a first resource account to a second resource account. The receiver processor may then generate, based on information associated with the first request, the requested payment origination file. The receiver processor may further transmit, via the payment instruction APIs, to one or more remote servers associated with an external financial entity, the requested origination file. In particular embodiments, the receiver processor may receive, via the payment instruction APIs from the one or more remote servers associated with the external financial entity, a payment return file associated with the payment origination file. The receiver processor may further store, in a first database associated with the receiver processor, the payment origination file and the payment return file. In particular embodiments, the receiver processor may validate, by a parsing module associated with the receiver processor, in response to the payment origination file and the payment return file being stored in the first database, the payment origination file and the payment return file. The receiver processor may further store, in a second database associated with the receiver processor, the validated payment origination file and the validated payment return file. In particular embodiments, the second database may be configured to receive queries associated with one or more of a plurality of validated payment origination files and validated payment return files stored in the second database.

Certain technical challenges exist for utilizing payment instruction APIs to process payment requests. One technical challenge may include enable users to easily request payment processing via the payment instruction APIs. The solution presented by the embodiments disclosed herein to address this challenge may be both external and internal endpoints of the payment instruction APIs that are operable for a user to specific a variety of parameters associated with the payment processing.

Certain embodiments disclosed herein may provide one or more technical advantages. A technical advantage of the embodiments may include easily initiating ACH originations both for internal processes (e.g., program-level settlement) and external use cases (e.g., consolidated daily ACH for cardholder funded users) as the payment instruction API may enable these functions for both internal and external requesting entities. Another technical advantage of the embodiments may include supporting expanded/complex funds flows as the receiver processor may originate ACH semi-arbitrarily and on behalf of multiple parties. Another technical advantage of the embodiments may include automating post-pay program-level settlements and consolidating cardholder-funded transactions into a single daily ACH as the receiver processor may calculate and report settlements and programmatically collect settlement via ACH pull into an account at an external financial entity. Another technical advantage of the embodiments may include streamline-processing the issuing of chargeback credits to users as the receiver processor may automate the dispute and chargeback process for the users. Certain embodiments disclosed herein may provide none, some, or all of the above technical advantages. One or more other technical advantages may be readily apparent to one skilled in the art in view of the figures, descriptions, and claims of the present disclosure.

In particular embodiments, the receiver processor may utilize an encryption service to encrypt confidential and sensitive user information as encrypted data and store the encrypted data in a secure storage database. Such confidential and sensitive user information may be necessary to route a user payment. As an example and not by way of limitation, the confidential and sensitive user information may comprise a routing number and an account number. In particular embodiments, the encrypted data may be associated with an encryption key. The encryption service may access an encryption key which it stores only in volatile, non-persistent memory. The encryption key may also not be stored with the same database or same storage as the encrypted data. As a result, the encryption key and the encrypted data may always be stored separately. The encryption key may be used to encrypt or decrypt the confidential and sensitive user information. In particular embodiments, the encryption service may only load the encryption key into memory and then pass it to the secure storage database to decrypt the encrypted data as needed. Although this disclosure describes processing particular payment requests in a particular manner, this disclosure contemplates processing any suitable payment request in any suitable manner.

In particular embodiments, the receiver processor may receive, from a requesting server by a receiver application programming interface (API) configured as an encryption service API, a first request to retrieve account data associated with a virtual bank account (VBAN) associated with an account holder. The VBAN may be decoupled from an external resource account associated with the account holder and the VBAN. The first request may comprise an identifier associated with the VBAN. In particular embodiments, the receiver processor may access, from a system management service by the encryption service API, an encryption key associated with a secure storage database. The secure storage database may comprise encrypted account data associated with the VBAN and the external resource account. The receiver processor may then transmit, by the encryption service API to the secure storage database, the encryption key and the identifier associated with the VBAN. The receiver processor may then receive, from the secure storage database by the encryption service API, decrypted account data associated with the VBAN. In particular embodiments, the decrypted account data may be determined by a decryption module based on the encryption key and the encrypted account data associated with the VBAN. The receiver processor may further transmit, to the requesting server, the decrypted account data associated with the VBAN.

Certain technical challenges exist for effective encryption service for user information. One technical challenge may include guaranteeing the encrypted data cannot be accessed any other party except the encryption service. The solution presented by the embodiments disclosed herein to address this challenge may be running the encryption service in memory, which may only load the encryption key into memory and then pass it to the secure storage database to decrypt the encrypted data as needed.

Certain embodiments disclosed herein may provide one or more technical advantages. A technical advantage of the embodiments may include enhanced security for users as the receiver processor may encrypt confidential and sensitive user information as encrypted data and store the encrypted data in a secure storage database with the encryption key not accessible by the secure storage database. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 9 illustrates an example method for utilizing payment instruction APIs to process payment requests.

FIG. 11 illustrates an example method for utilizing an encryption service to process confidential and sensitive user information.

DESCRIPTION OF EXAMPLE EMBODIMENTS

System Overview

Figure 1:
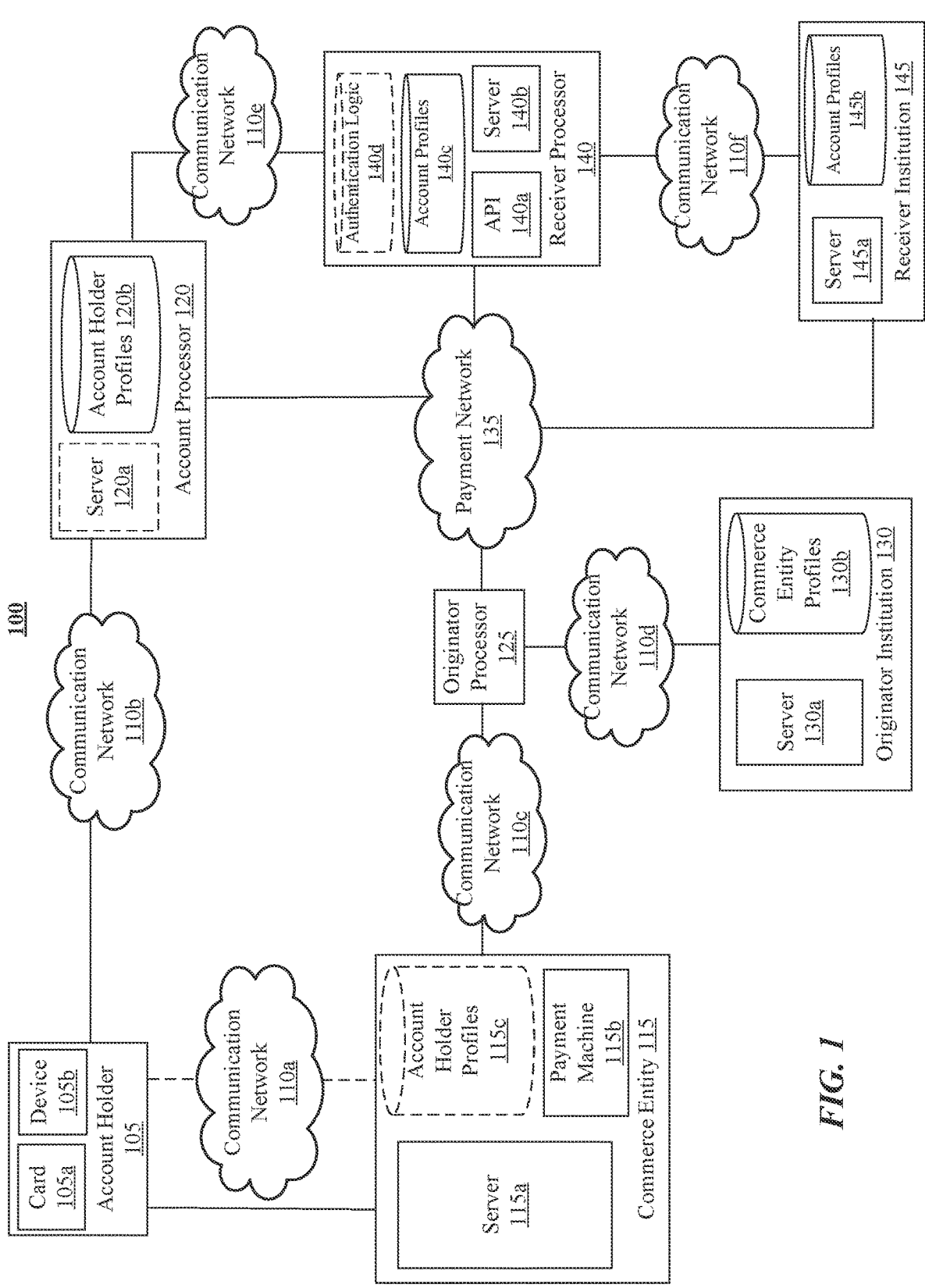
FIG. 1 illustrates an example payment system.

FIG. 1 illustrates an example payment system 100. The payment system 100 includes an account holder 105 (e.g., a payer), a commerce entity 115 (e.g., a merchant), an account processor 120, an originator processor 125, an originator institution 130 (e.g., a financial institution such as an acquiring bank), a receiver processor 140, and a receiver institution 145 (e.g., a financial institution such as an issuing bank), which may be interconnected to another through various networks, including communication networks 110 (e.g., the Internet and/or the like) and a payment network 135 (e.g., credit network, debit network, ATM network, and/or the like). Although FIG. 1 illustrates a particular arrangement of an account holder 105, communication networks 110, a commerce entity 115, an account processor 120, an originator processor 125, an originator institution 130, a payment network 135, a receiver processor 140, and a receiver institution 145, this disclosure contemplates any suitable arrangement of an account holder 105, communication networks 110, a commerce entity 115, an account processor 120, an originator processor 125, an originator institution 130, a payment network 135, a receiver processor 140, and a receiver institution 145. As an example and not by way of limitation, two or more of an account holder 105, a commerce entity 115, and an account processor 120 may be connected to or communicate with each other directly, bypassing the communication network 110. As another example, two or more of an account processor 120 and a receiver processor 140 may be physically or logically co-located with each other in whole or in part. As yet another example, two or more of a receiver processor 140 and a receiver institution 145 may be physically or logically co-located with each other in whole or in part. As yet another example, two or more of an originator institution 130 and a receiver institution 145 may be physically or logically co-located with each other in whole or in part. As yet another example, two or more of an originator processor 125 and an originator institution 130 may be physically or logically co-located with each other in whole or in part. As yet another example, two or more of a payment network 135 and a receiver institution 145 may be physically or logically co-located with each other in whole or in part. Moreover, although FIG. 1 illustrates a particular number of an account holder 105, communication networks 110, a commerce entity 115, an account processor 120, an originator processor 125, an originator institution 130, a payment network 135, a receiver processor 140, and a receiver institution 145, this disclosure contemplates any suitable number of an account holder 105, communication networks 110, a commerce entity 115, an account processor 120, an originator processor 125, an originator institution 130, a payment network 135, a receiver processor 140, and a receiver institution 145. As an example and not by way of limitation, the payment system 100 may include multiple account holders 105, commerce entities 115, account processors 120, originator processors 125, originator institutions 130, payment networks 135, receiver processors 140, and receiver institutions 145.

This disclosure contemplates any suitable communication network 110 or payment network 135. As an example and not by way of limitation, one or more portions of a communication network 110 or payment network 135 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A communication network 110 may include one or more communication networks 110 and a payment network 135 may include one or more payment networks 135.

In particular embodiments, an account holder 105 may initialize a payment to a commerce entity 115 at the commerce entity's 115 location for purchasing merchandise or services from the commerce entity 115. The payment may be an electronic payment with or without a card 105a. The account holder 105 may use a device 105b (e.g., personal computing device such as a smartphone) for such payment. As an example and not by way of limitation, the account holder 105 may use the account holder's device 105b to initialize the payment via a digital payment platform without having a card 105a. The payment may also be a card payment using a card 105a. In particular embodiments, the card 105a may be either a credit card or a debit card for the payment. The card 105a may be issued by the receiver processor 140 or the receiver institution 145. As an example and not by way of limitation, the card 105a may be a physical piece of plastic with a magnetic stripe at the top and/or a chip. As another example, the card 105a may be tokenized so that it is a card stored in a smartphone's digital wallet and then used to tap and pay. In alternative embodiments, the account holder 105 may initialize the payment via the communication network 110a, which may be part of an online transaction. The account holder 105 may use the account holder's device 105b for the online transaction. In particular embodiments, the device 105b may be any computing device comprising networking interface circuitry, such as a network interface card (NIC) or similar component, and a processor capable of accessing data over the communication network 110a. Non-limiting examples of the device 105b may include a workstation computer, a desktop computer, a laptop computer, a notebook computer, a netbook, a tablet, a smartphone, a server, a personal digital assistant (PDA), a handheld electronic device, a cellular telephone, a smartphone, a virtual reality (VR) headset, an augmented reality (AR) smart glasses, other suitable electronic device, or any suitable combination thereof.

In particular embodiments, the commerce entity 115 may comprise a server 115a and a payment machine 115b, and optionally account holder profiles 115c. The payment machine 115b may read the card that is used for payment. As an example and not by way of limitation, the payment machine 115b may be a card reader, a card terminal, a payment terminal, or a point-of-sale (POS) terminal. In particular embodiments, the account holder 105 may use the card 105a to interact with the payment machine 115b, e.g., by swiping the card 105a through the payment machine 115b, inserting the card 105a into the payment machine 115b, tapping the card 105a on the payment machine 115b, or tapping the payment machine 115b with a smartphone having a virtual card in its digital wallet. For online transactions, the payment machine 115b may be considered as a payment gateway, which may be not a physical machine but rather handled via software. For online transactions, the card 105a used for payment may be a virtual card that is just the card number shown in a software application.

In particular embodiments, the originator institution 130 may provide the payment machine 115b to the commerce entity 115. The originator institution 130 may go out and acquire commerce entities 115 and provide them the tools and facilities to accept and process card-based payments. The originator institution 130 may comprise a server 130a and commerce entity profiles 130b. The originator institution 130 may utilize a technology provider, e.g., the originator processor 125, that can connect with the payment network 135 to handle transactions from various channels such as credit cards and debit cards for the originator institution 130. In particular embodiments, the originator processor 125 may process the transactions from the commerce entity 115, through the originator institution 130 and then the payment network 135 (or an alternative payment method such as a digital payment platform) to ensure the receiver institution 145 that the commerce entity's 115 transactions with the account holder 105 are authorized and may be settled. In particular embodiments, the originator processor 125 may utilize hardware (e.g., network interface components at a data center) and a fast direct network connection to the payment network 135 to request approval of a payment. In particular embodiments, the originator institution 130 may build this technology in-house (e.g., via its server 130a) or may rely on a third-party originator processor 125 to handle this functionality.

In particular embodiments, one or more of the account holder 105, the account holder's card 105a, or the account holder's device 105b may be associated with a corporation (e.g., a company) that is an enterprise client or partner of the receiver institution 145 and/or the receiver processor 140. As an example and not by way of limitation, the account holder 105 may be an employee of the corporation. As another example and not by way of limitation, the account holder 105 may be a contractor of the corporation. The corporation may be associated with the account processor 120. In particular embodiments, the account processor 120 may comprise account holder profiles 120b. The account processor 120 may optionally comprise an account processor server 120a. In particular embodiments, the account holder 105 may use the account holder's device 105b to communicate with the account processor 120. As an example and not by way of limitation, the account holder 105 may send a request for account generation, card generation, funding, payment approval, etc. to the account processor 120. As another example and not by way of limitation, the account holder 105 may notify the account processor 120 of a potential payment. As yet another example and not by way of limitation, the account processor 120 or the account holder's device 105b may detect that the account holder 105 is physically at the commerce entity's 115 location (e.g., based on GPS signal from the personal computing device associated with the account holder 105), and upon such detection, the account processor 120 may initialize account/card generation or transaction verification.

In particular embodiments, the card 105a used for payment may be issued by the receiver institution 145. The receiver institution's 145 function may be to underwrite an individual person (e.g., the account holder 105) or an enterprise client or partner (e.g., a corporation) by providing them with a bank account, a debit card, and may optionally grant them access to credit facilities and a credit card. In particular embodiments, the receiver institution 145 may utilize a technology provider (i.e., the receiver processor 140) to connect with the payment network 135. In particular embodiments, the receiver processor 140 may utilize hardware (e.g., network interface components at a data center) and a fast direct network connection to the payment network 135 to approve or decline a payment. The receiver institution 145 may build this technology in-house (e.g., by providing APIs that can be called by the account processor 120 or payment network 135) or may rely on a third-party receiver processor 140 to handle this functionality.

In particular embodiments, the receiver institution 145 may comprise a server 145a that may accept requests for account/card creation from the receiver processor 140, and then generate the card/account according to the information provided from the receiver processor server 140b. It should be noted that, in some embodiments, the receiver institution 145 may issue what appears to be a full-service credit card or debit card, with no limitations on its use. Functionally, the limitations on use of the new card may be imposed by operation of the receiver processor 140. That is, when the receiver institution server 145a receives, from the payment network 135, a request to verify a transaction, the receiver institution server 145a may query the receiver processor server 140b; and the receiver processor 140 may verify only those transactions where the commerce-entity tag associated with the card/account in the receiver processor account profiles 140c (e.g., including payer and/or client profiles) matches the commerce entity 115 identified in the current transaction data. The receiver processor 140 may optionally check parameters associated with the card/account and/or compare other data associated with the transaction, as discussed in greater detail herein. In particular embodiments, the receiver institution 145 may also comprise account profiles 145b. In particular embodiments, the receiver institution 145 may be a distinct entity from the receiver processor 140. In alternative embodiments, the receiver processor 140 functionality may be implemented by the receiver institution 145. In alternative embodiments, the receiver processor 140 may be registered to operate as a receiver institution 145. In alternative embodiments, the receiver processor 140 may maintain a contractual relationship with a financial institution, whereby the receiver processor 140 may function in some respects as a receiver institution 145.

In particular embodiments, the receiver processor 140 may comprise an application programming interface (API) 140a, a server 140b, account profiles 140c (e.g., including payer and/or client profiles), and optionally authentication logic 140d. The account profiles 140c may comprise profiles of individual and enterprise clients. The API 140a may provide a programmatic interface to create and configure accounts/cards. In particular embodiments, the account processor 120 may call the API 140a to request the receiver processor 140 to provide various account/card/transaction services and the receiver processor 140 may return the relevant results to the account processor 120 via the API 140a. As an example and not by way of limitation, the account processor 120 may get real-time payment data, programmatically request issuance of new cards, configure card permissions, and set spending limits through API 140a. In particular embodiments, the receiver processor 140 may verify requests from the account processor 120 via the API 140a. The requests may be verified with an API key (e.g., cryptographic public/private keys). The receiver processor 140 may return errors via the API 140a, which may be used by the account processor 120 to diagnose failed transactions and improve its exception-handling capabilities. As an example and not by way of limitation, an error returned via API 140a may be that [query] is not a valid parameter, indicating that a query parameter in the request does not match the valid queries for the endpoint. As another example, an error returned via API 140a may be that an account holder 105 has not been authenticated, indicating an invalid or missing API key. As yet another example, an error returned via API 140a may be that the API key is not active, indicating that the API key used is no longer active. As yet another example, an error returned via API 140a may be that the receiver processor 140 could not identify the API key, indicating the API key provided is not associated with any account processor 120. As yet another example, an error returned via API 140a may be requiring an API key in authorization header, indicating the authorization header is not in the request. As yet another example, an error returned via API 140a may be that authorization header is not formatted properly. As yet another example, an error returned via API 140a may be insufficient privileges or issuing API key required, indicating write access requires an issuing API key. As yet another example, an error returned via API 140a may be insufficient privileges to create unlocked cards, indicating creating unlocked cards requires an additional privilege. As yet another example, an error returned via API 140a may be authorization failed (in simulation), indicating an authorization fails when simulating an authorization. As yet another example, an error returned via API 140a may be rate limited with too many requests per second, indicating an account processor 120 has exceeded their per second rate limit. As yet another example, an error returned via API 140a may be rate limited with daily limit reached, indicating an account processor 120 has exceeded their daily rate limit. As yet another example, an error returned via API 140a may be rate limited with too many keys tried, indicating one IP has queried too many different API keys. As yet another example, an error returned via API 140a may be an internal server error, indicating there was a processing error on the server-side.

In particular embodiments, a single API key may manage a portfolio of end-users (i.e., accounts), each with its own funding sources, cards, and transactions. End-users may be onboarded through the enrollment endpoint, which runs the candidate enrollment through a customer identification program and returns an account token if successful. After the first end-user is enrolled in the production environment, all subsequent API calls should include a uniform resource identifier (URI) parameter indicating which end-user this API request is on behalf of. The reason for this behavior change is because, upon initial provisioning, the API key may map one-to-one to a root account specifically associated with the account processor 120. After requesting enrollment, the API key mapping may become one-to-many, so the API 140a may require an account-token parameter and/or a URI parameter to indicate which individual account, within the portfolio of accounts, to perform an action on behalf of. If one or more end-users have been enrolled and no account-token argument is supplied, the API 140a may assume the root account.

In particular embodiments, different parties (e.g., a financial institution such as a bank, an account holder 105, the receiver processor 140, etc.) may set rules on accounts created by the receiver processor 140 via the API 140a. As an example and not by way of limitation, the receiver institution 145 may set account specific transaction limits. As another example and not by way of limitation, a payer, as an account holder 105, may set up parental controls if a minor of the account holder 105 also has access to the account. As yet another example and not by way of limitation, the originator processor 125 or originator institution 130 may set rules to protect the commerce entity 115.

In particular embodiments, the account processor 120 may set rules on accounts to control spending via the API 140a. The account configuration schema may comprise the account token, the account state, and one or more parameters for the account (e.g., a spending limit/frequency). The account token may be a globally unique identifier for the account. The account states may include an active, paused, closed, locked, restricted, banned/suspended, and/or flagged state. Spending limit parameters for an account may comprise limitations on an individual transaction or a plurality of transactions. As an example and not by way of limitation, a single transaction may be limited to a maximum permitted payment value. As another example and not by way of limitation, a set of multiple transactions may be limited based on the volume or frequency of transactions (e.g., maximum number of transactions within a day or week). As yet another example, a set of multiple transactions may be limited based on combined transaction values (e.g., maximum total spending permitted daily, monthly, and/or over the lifetime of the account). Any charges to a card associated with this account may be declined (or alternatively paused/held or flagged for additional authorization) once their transaction volume and/or total value has surpassed the limit in the applicable time period, which may be on a rolling basis. A lifetime spending limit value of 0 or null in the account configuration may indicate that the lifetime spending limit feature is disabled such that there is no lifetime spending limit for that account. In particular embodiments, the account processor 120 may access account spending limits for one or more specified accounts via the API 140*a*. This endpoint may only be used on individual accounts within the portfolio of accounts associated with the root account that the calling API key manages. If an account token is specified, this endpoint may return an account-configuration object representing the account specified. If an account token is not specified, a list of account-configurations (e.g., account state and account parameters) for the individual accounts in the portfolio of accounts associated with the root account may be returned. If querying for a single account, the account processor 120 may not include pagination queries as there is only one account. In particular embodiments, the account processor 120 may set spending specified account that are managed by this API key. Accounts that are set as being in the paused account state may not be able to transact or create new cards.

In particular embodiments, the account processor 120 may enroll end-users (e.g., account holder 105) via the API 140*a*. The account processor 120 may enroll a new individual account into the root account managed by the API key. This endpoint may run the candidate enrollment through the customer identification program (CIP) and return an account token if successful. As an example and not by way of limitation, the request for enrollment may comprise one or more of date of birth (as an ISO 8601 date), email (if utilizing the receiver processor 140 for chargeback processing, this email address may be used to communicate dispute status and resolution), account holder's 105 first name, an ISO 8601 timestamp at which precomputed KYC (know-your-customer) was completed, a KYC-type specifying the KYC workflow to run on the account holder 105 for which the individual account is being created, account holder's 105 last name, account holder's 105 phone number which may improve the chances of a positive identity match and successful API response, social security number which may be required for identity verification and compliance with US banking regulations, valid address, an ISO 8601 timestamp at which the terms of service of the receiver processor 140 were accepted by account holder 105, or postal code. When a KYC evaluation fails, one or more of the failure reasons in Table 1 (below) may be returned in the API response.

TABLE 1

Example failure reasons for KYC evaluations.

| | |
|---|---|
| ADDRESS_VERIFICATION_FAILURE | The address provided could not be matched. |
| AGE_THRESHOLD_FAILURE | The user did not fall within an acceptable age range. |
| BANKRUPTCY_RELATED_FAILURE | The user has a bankruptcy on record. |
| BLOCKLIST_ALERT_FAILURE | The user appeared on one or more blocklists. |
| COMPLETE_VERIFICATION_FAILURE | The user could not be matched to a person in any data source. |
| DATA_STRENGTH_FAILURE | The user's public record has insufficient information that can be used for verification. |
| DOB_VERIFICATION_FAILURE | The date of birth provided could not be matched. |
| EMAIL_VERIFICATION_FAILURE | The email provided is not valid or is improperly formatted. |
| MULTIPLE_RECORDS_FAILURE | The user has several valid records with conflicting information. |
| NAME_VERIFICATION_FAILURE | The name provided could not be matched. |
| PHONE_VERIFICATION_FAILURE | The phone number provided could not be matched. |
| RISK_THRESHOLD_FAILURE | The user was flagged for high risk of fraud. |
| SSN_VERIFICATION_FAILURE | The social security number provided could not be matched. |
| OTHER_VERIFICATION_FAILURE | The user was rejected for a reason other than one specified above. | limits for a specified account (e.g., a root account), which may be applied to the accounts in the portfolio of accounts associated with the specified account that are managed by this API key. As an example and not by way of limitation, the account processor 120 may set a new amount for an account's daily spending limit, monthly spending limit, and lifetime spending limit. When one of these limits is reached, no transactions may be accepted on any card created for this account for the corresponding period unless the spending limit is updated. In particular embodiments, the account processor 120 may set the account state for a specified account via the API 140*a*, which may be applied to the accounts in the portfolio of accounts associated with the In particular embodiments, the account processor 120 may use KYC to onboard and verify its customers. Building out KYC for products associated with the account processor 120 may be a substantial build that include third-party vendor selection and contract negotiation. In particular embodiments, through the API 140*a*, the account processor 120 may perform basic KYC, advanced KYC, and bring your own (BYO) KYC. Basic KYC may include identity verification for an individual, with a simple accepted or rejected decision. An example workflow for basic KYC may be as follows. The account processor 120 may submit, via the API 140*a*, required information identifying account holder 105, for which the receiver processor 140 may return, via the API 140*a*, an accepted or rejected status for the account holder 105. Advanced KYC may include identity verification for an individual, with a remediation path if the initially submitted information was not successfully verified (not all cases may be eligible). An example workflow for advanced KYC may be as follows. The account processor 120 may submit, via the API 140*a*, required information identifying account holder 105, for which the receiver processor 140 may return, via the API 140*a*, an accepted, rejected, pending resubmit, or pending document status for the account holder 105. If the status is pending resubmit, the account processor 120 may submit, via the API 140*a*, revised information, for which the receiver processor 140 may return, via the API 140*a*, an accepted, rejected, pending resubmit, or pending document status. If the status is "pending document", the account processor 120 may identify document type to be submitted, for which the receiver processor 140 may return URLs to which documents may be submitted. Once the account processor 120 submits documents with provided URLs, the API 140*a* may send a webhook to the account processor 120 once accepted or rejected status is available. BYO KYC may include an account creation process where the account processor 120 may bypass KYC enabled by the receiver processor 140 via the API 140*a*. The following is an example workflow for BYO KYC. The account processor 120 may submit, via the API 140*a*, required information with its own KYC workflow identifying account holder 105, for which the receiver processor 140 may return, via the API 140*a*, an accepted status for the account holder 105.

In particular embodiments, besides KYC, the account processor 120 may use know your business (KYB) to get to market faster by reducing the number of partners needed to launch a card program. The account processor 120 may perform basic KYB and BYO KYB. In particular embodiments, basic KYB may include identity verification for a business, with a simple accepted or rejected decision. An example workflow for basic KYB may be as follows. The account processor 120 may submit, via the API 140*a*, required information identifying account holder 105, for which the receiver processor 140 may return, via the API 140*a*, a pending status for the account. The API 140*a* may then send a webhook to the account processor 120 once accepted or rejected status is available. In particular embodiments, BYO KYB may include an account creation process where the account processor 120 may bypass KYB enabled by the receiver processor 140 via the API 140*a*. The following is an example workflow for BYO KYB. The account processor 120 may submit, via the API 140*a*, required information with its own KYB workflow identifying account holder 105, for which the receiver processor 140 may return, via the API 140*a*, an accepted status for the account holder 105.

In particular embodiments, the account processor 120 may create, update, manage, and reissue cards (both virtual cards and physical cards) via the API 140*a*. As an example and not by way of limitation, the card schema may comprise one or more of an ISO 8601 timestamp for when the card was created, three digit card verification value (CVV) printed on the back of the card, funding, expiry month and year, hostname of card's locked merchant (empty if not applicable), last four digits of the card number, nickname to identify the card, card number, spending limit (transaction requests above the spend limit may be declined), spending limit duration (e.g., transaction, monthly, annually, forever), state (e.g., open, paused, closed, pending fulfillment, pending activation), token (i.e., globally unique identifier), or type (single use, merchant locked, unlocked, physical). All physical cards may have digital wallet functionality and may be unlocked. Tables 2-4 (below) provide example card types, states, and spending limit durations.

TABLE 2

| Example card types. | |
| --- | --- |
| SINGLE_USE | Card may close shortly after the first transaction. |
| MERCHANT_ LOCKED | Card may be locked to first merchant that successfully authorizes the card. |
| UNLOCKED (Issuing) | Card may authorize at any merchant. Creating these cards may require additional privileges. |
| PHYSICAL (Enterprise) | Manufactured and sent to the cardholder. The receiver processor may offer white label branding, credit, ATM, PIN debit, chip/EMV, NFC and magstripe functionality. |
| DIGITAL_ WALLET (Enterprise) | Cards that may be provisioned to a digital wallet. |

TABLE 3

| Example card states. | |
| --- | --- |
| OPEN | Card may approve authorizations (if they match card and account parameters). |
| PAUSED | Card may decline authorizations but may be resumed at a later time. |
| CLOSED | Card may no longer approve authorizations. Closing a card may not be undone. |
| PENDING_ FULFILLMENT | The initial state for cards of type PHYSICAL. The card may be provisioned pending manufacturing and fulfillment. Cards in this state may accept authorizations for e-commerce purchases, but not for "Card Present" purchases where the physical card itself is present. |
| PENDING_ ACTIVATION | Each day at a certain time, cards of type PHYSICAL instate PENDING_FULFILLMENT may be sent to the card production warehouse and updated to state PENDING_ACTIVATION. Similar to PENDING_FULFILLMENT, cards in this state may be used for e-commerce transactions. API clients may update the card's state to OPEN after the cardholder confirms receipt of the card. |

TABLE 4

| Example card spending limit durations. | |
| --- | --- |
| TRANSACTION | Card may authorize multiple transactions if each individual transaction is under the spending limit. |
| MONTHLY | Card may authorize transactions up to a spending limit for the trailing month. (Note month may be calculated as this calendar date one month prior). |
| ANNUALLY | Card may authorize transactions up to a spending limit in a calendar year. |
| FOREVER | Card may authorize up to a spending limit for the entire lifetime of the card. |

In particular embodiments, the account processor 120 may embed card PANs (primary account numbers) and CVV codes via the API 140*a*. Handling card PANs and CVV codes may require compliance with the payment card industry data security standards (PCI DSS). An enterprise client may choose to reduce their compliance obligations by using an embedded card UI (user interface) solution provided by the receiver processor 140. In this setup, PANs and CVV codes may be presented to the end-user (e.g., account holder 105) via a card UI that the receiver processor 140 provides, optionally styled in the enterprise client's branding using a specified CSS stylesheet. The request for the embedded card UI may be made directly to the receiver processor 140 (e.g., via a browser) such that the card PANs and CVVs are not transmitted or exposed to the account processor servers 120a, but are still displayed and visible to the end-users. The API response may comprise an HTML document, and the URL for the request may be inserted directly into the source attribute (SRC) of an inline frame (iframe) element. In particular embodiments, the account processor 120 may compute the request payload server-side at account processor server 120a. The account processor 120 may render the request payload (or the whole iframe) on the server 120a, or may make an AJAX call from the front-end code. The request for the embedded card UI may comprise an embed request to specify which card to load and a hash-based message authentication code (HMAC). In particular embodiments, the embed request schema (for issuing) may comprise one or more of a token, a publicly available URI, an account token, or an expiration time/date. The token may be a globally unique identifier for the card to be displayed. With the publicly available URI, the white-labeled card element can be styled with the enterprise client's branding. The account token may be included if one or more end-users (e.g., account holder 105) have been enrolled. The expiration may be an ISO 8601 timestamp for when the request should expire. In particular embodiments, the endpoint may return an HTML document. The account processor 120 may be responsible for providing CSS styles for the elements in the embed request. The account processor 120 may provide its own CSS URL in the request to style a card.

In particular embodiments, the account processor 120 may enable its cardholders (e.g., account holders 105) to directly add payment cards to their devices' 105b digital wallets with one touch. This may require some additional setup and configuration. As an example and not by way of limitation, the account processor 120 may specify one or more of a unique token for the card being added to the device's 105b digital wallet, the type of digital wallet, an account token (for multi-account users) identifying the account associated with the card, and optionally provided by the device's 105b wallet, a nonce, a nonce signature, and/or a certificate. The receiver processor 140 may return a provisioning payload, which may be a cryptographic payload representing a payment card 105a that can be passed to a device's 105b digital wallet. In particular embodiments, each digital wallet may utilize a different API 140a.

In particular embodiments, the account processor 120 may make funds available to its cards 105a via the API 140a. As an example and not by way of limitation, the funding account schema may comprise an account name identifying the funding source, an ISO 8601 string representing the time when the funding source was added, the last 4 digits of a funding account (e.g., bank account and debit card) associated with the funding source, a nickname given to the funding account (or null if it has no nickname), a state of the funding account (e.g., "enabled" (indicating the funding account is available to use for card creation and transactions), "pending" (indicating the funding account is still being verified)), a token (globally unique identifier) for the funding account, and/or the type of funding source (e.g., checking account, savings account, credit card account, cryptocurrency account). In particular embodiments, the account processor 120 may add a bank account as a funding source using routing and account numbers via the API 140a. As an example and not by way of limitation, the account processor 120 may specify in the request for adding a bank account one or more of the routing number of the bank account, the account number of the bank account, the account name, or the account token (for multi-account users)

identifying the account that the bank account may be associated with. The receiver processor 140 may return a funding-account object comprising the bank information. In particular embodiments, funding accounts may be initially set to the pending state until a micro-deposit validation is completed, while in other embodiments, funding accounts may be set to the enabled state automatically (e.g., trusted funding sources; testing environments).

In particular embodiments, the account processor 120 may validate a bank account as a funding source by providing received micro-deposit amounts. As an example and not by way of limitation, the account processor 120 may specify in the validation request one or more of the token of the bank account to validate, an array of monetary amounts received in two credit transactions, or the account token (for multi-account users) identifying the account that the bank is associated with. In particular embodiments, the account processor 120 may update a bank account funding source using the given parameter (e.g., the token of the bank account) via the API 140a. As an example and not by way of limitation, the account processor 120 may specify in the updating request one or more of the token of the bank account to edit, the desired state of the bank account (e.g., enabled and deleted), or the account token (for multi-account users) identifying the account that the bank is associated with. If a bank account is set to be deleted, all cards linked to this account may no longer be associated with it. If there are no other funding accounts set to an enabled state on the account, authorizations may not be accepted on any cards linked to the account until a new funding account is added. In particular embodiments, the account processor 120 may list and display all the funding accounts via the API 140a.

In particular embodiments, the account processor 120 may create a virtual or physical card via the API 140a. As an example and not by way of limitation, the account processor 120 may specify one or more of memo which is a nickname to identify the card, a card type (e.g., single use, merchant locked, digital wallet, unlocked, and physical), a token for the desired funding account to use when making transactions with the card, a spending limit, a spending limit duration (e.g., transaction, monthly, annually, forever), a card state (e.g., open, paused), a card program token which may identify the card program under which to create the card (different card programs may have their own configurations, e.g., digital wallet card art, BIN type), an expiration month and year (either may be generated if not provided), an account token (e.g., for multi-account users), an account token identifying the account the card may be associated with, a PIN, a product identifier which may specify a manufacturing and design configuration (e.g., physical card art) for the card, or a shipping address.

In particular embodiments, the account processor 120 may update specified properties of the card via the API 140a. Unsupplied properties may remain unchanged. As an example and not by way of limitation, the account processor 120 may specify updates for one or more of a unique card token, a card state (e.g., open, paused, and closed), a token for a desired funding account, memo which is a friendly name to identify the card, a spending limit, a spending limit duration (e.g., transaction, monthly, annually, forever), an account token (for multi-account users) identifying the account which owns the card, or a PIN.

In particular embodiments, the account processor 120 may list cards via the API 140a. As an example and not by way of limitation, the account processor 120 may specify one or more of page for pagination, page size, begin date (cards created after the specified date may be included), end date (cards created before the specified date may be included), card token for returning a specific card, or account token (for multi-account users) for returning cards associated with this account. Physical cards may be provisioned for ATM/PIN debit access which may require a cardholder PIN. In particular embodiments, the account processor 120 may set and update the cardholder PIN via the API 140*a*. The API 140*a* may additionally enable setting a cryptographic nonce to create additional entropy and prevent replay attacks, which may be unique per request. In particular embodiments, the account processor 120 may reissue cards, i.e., initiating print and shipment of a duplicate card via the API 140*a*. As an example and not by way of limitation, the account processor 120 may specify one or more of card token which is the unique token of the card to update, shipping address, or product identifier which specifies the configuration (e.g., physical card art) that the card should be manufactured with.

In particular embodiments, the account processor 120 may learn more about transactions via the API 140*a*. As an example and not by way of limitation, a transaction schema may comprise one or more of the authorization amount of the transaction with a positive amount representing a debit and a negative amount representing a credit, which may change over time, the card schema, date and time when the transaction first occurred, a list of all events that have modified this transaction, a list of objects that describe how this transaction was funded, where a reference to the funding account for the card that made this transaction may appear here and the token may match the token for the funding account in the card field (if any promotional credit was used in paying for this transaction, its type may be promotion), the merchant schema, the transaction result with approved or decline reason, the amount of the transaction that has been settled, which may change over time, status (e.g., pending, voided, settling, settled, bounced, declined), or the token which is a globally unique identifier. Table 5 (below) enumerates example transaction status. Table 6 (below) enumerates example transaction results. In particular embodiments, a single card transaction may include multiple events that affect the transaction state and lifecycle. An event schema may comprise one or more of the amount of the transaction event, date and time this event entered the system, the result of approved or decline reason, the token which is a globally unique identifier, or the type (e.g., authorization, authorization advice, clearing, void, return). The amount of the transaction event may be always a positive value, unlike the transaction amount in the transaction schema. Whether the amount is a debit or credit may depend on the event type: authorization, authorization advice, and clearing may be debits whereas void and return may be credits. In particular embodiments, the merchant schema may comprise one or more of an identifier for the payment card acceptor, a city of the card acceptor, a country of the card acceptor, a short description of the card acceptor, a merchant category code, or a geographic state of the card acceptor. In particular embodiments, the account processor 120 may list the transactions via the API 140*a*. As an example and not by way of limitation, the account processor 120 may specify in the request one or more of approval status, page for pagination, page size for pagination, begin date (transactions created after the specified date may be included), end date (transactions created before the specified date may be included), card token which may filter transactions associated with a specific card, transaction token which may return a specific transaction, or account token (for multi-account users) which may return transactions associated with this account.

TABLE 5

| Example transaction status. | |
|---|---|
| PENDING | Authorization is pending completion from the merchant |
| VOIDED | The merchant has voided the previously pending authorization |
| SETTLING | The merchant has completed the transaction and the funding source is being debited |
| SETTLED | The transaction is complete |
| BOUNCED | There was an error settling the transaction against the funding source. Your API account may be disabled |
| DECLINED | The transaction was declined |

TABLE 6

| Example transaction results. | |
|---|---|
| APPROVED | |
| CARD_PAUSED | Card state was paused at the time of authorization. |
| CARD_CLOSED | Card state was closed at the time of authorization. |
| GLOBAL_TRANSACTION_LIMIT | Platform spending limit exceeded. |
| GLOBAL_WEEKLY_LIMIT | Platform spending limit exceeded. |
| GLOBAL_MONTHLY_LIMIT | Platform spending limit exceeded. |
| USER_TRANSACTION_LIMIT | User-set spending limit exceeded. |
| UNAUTHORIZED_MERCHANT | Merchant locked a card attempted at different merchants. |
| SINGLE_USE_RECHARGED | Single-use card attempted multiple times. |
| BANK_CONNECTION_ERROR | Please reconnect a funding source. |
| INSUFFICIENT_FUNDS | Please ensure the funding source is connected and up to date. |
| INSUFFICIENT_FUNDS_PRELOAD | Result given when client responds to authorization request with insufficient funds. |
| MERCHANT_BLACKLIST | This merchant is disallowed on the platform. |
| INVALID_CARD_DETAILS | Incorrect CVV or expiry date. |
| BANK_NOT_VERIFIED | Please confirm the funding source. |
| INACTIVE_ACCOUNT | |
| ACCOUNT_STATE_TRANSACTION_FAIL | |
| UNKNOWN_HOST_TIMEOUT | Network error, re-attempt the transaction. |
| SWITCH_INOPERATIVE_ADVICE | Network error, re-attempt the transaction. |

TABLE 6-continued

| Example transaction results. |
| --- |

| FRAUD_ADVICE | Transaction declined due to risk. |
| INCORRECT_PIN | PIN verification failed. |

In particular embodiments, the account processor 120 may receive notifications about API events, sent as they occur. The transaction messages from the receivers processor 140 may be the main vehicle through which live transaction handling is performed. Each message may comprise a full transaction object. Transaction messages may generally be separated along two dimensions: financial versus non-financial messages, and requests versus advice. Financial messages may prompt movement of funds between accounts (e.g., a clearing message that prompts an ACH debit from the user's connected account), while non-financial messages may not prompt movement of funds (e.g., an authorization request that induces a hold on funds but doesn't trigger a payment to the merchant until the transaction is settled). Authorization holds may be temporary, as transactions that are subsequently declined may have the associated funds returned to the end-user for future use. On the other axis, requests may be messages that require a response (i.e., approval or decline) to the receiver processor 140, while advice messages may not require a response other than a notification that the advice was received. In particular embodiments, the receiver processor 140 may provide one or more services that provide access to different types of messages. As an example and not by way of limitation, one service may provide the ability to receive advice. As another example, another service may provide the ability to receive and respond to requests.

In particular embodiments, the receiver processor 140 may include a web-based software application, accessible under a software-as-a-service (SaaS) model, such that the receiver processor 140 and related software applications are executed by the receiver processor server 140*b* and little to no software processes are required by the payer's personal computing device or the account processor 120. As an example and not by way of limitation, the account processor 120 may execute a web browser application that executes software routines to access webpages, but execute few software routines for the receiver processor 140. In this example, the web browser may comprise a plugin that may execute software routines that communicate data with the receiver processor 140, and the majority of the routines associated with the receiver processor 140 may be executed by the receiver process server 140*b*. It should be appreciated that the division of functions between the account processor 120 and the receiver processor server 140*b* may vary across embodiments, and may be tailored for the power of the account processor 120 and/or the available bandwidth (e.g., if only a relatively low-bandwidth communication network 110 is available, the processing may be allocated to reduce the amount of information passed between the account processor 120 and the receiver processor server 140*b*).

In particular embodiments, the software routines of the receiver processor 140 may register account holder/client data that is stored into account profiles 140*c*, monitor transactions, and execute a number of routines to secure a transaction when a new transaction initiation is detected by the receiver processor 140. The receiver processor server 140*b* may include one or more computing devices having processors configured to execute the one or more software components or modules that provide the account holder 105 or account processor 120 the various features of the receiver processor 140 described herein. A receiver processor server 140*b* may comprise network interface circuitry, such as a network interface card (NIC) or similar component, allowing the receiver processor server 140*b* to communicate with various devices in the payment system 100, over a communication network 110 or a payment network 135. The receiver processor server 140*b* may be configured to continuously communicate and monitor the activity of the account holder 105 or account processor 120, and may determine or detect that the account holder 105 is engaged in or engages into a transaction with a commerce entity 115. In particular embodiments, the account holder's 105 personal computing device or the account processor 120 may have a receiver component, such as a web browser plugin, installed locally, where the browser plugin (or other component) may detect the instance of online transaction and can then establish one or more secure authenticating processes with the receiver processor server 140*b*. That is, in such embodiments, when the account holder's 105 personal computing device or the account processor 120 navigates to a webpage comprising a web transaction form, the receiver component or browser plugin may detect that the browser is at webpage with a transaction form and consequently transmit an indication signal to the receiver processor server 140*b* indicating that the account holder's 105 personal computing device or the account processor 120 has landed at the online transaction form. In this example, the receiver processor server 140*b* may then be triggered to execute secure authenticating processes.

In particular embodiments, the receiver processor 140 may comprise account profiles 140*c*, which may be hosted on one or more computing devices comprising non-transitory machine-readable storage media configured to store profile data. In operation, the receiver processor server 140*b* may be communicatively coupled to a database comprising the account profiles 140*c* via a network, where the network may include a private network that is internal to the receiver processor 140. The receiver processor server 140*b* may register new account holders 105 or enterprise clients, generate new card accounts, and perform authorization checks for transactions received from the payment network 135.

During registration, the receiver processor server 140*b* may receive data inputs from the account holder 105 or account processor 120, including funding account identifiers. A funding account may be the source of funds associated with a particular account, such as a bank account, payment card account (credit, debit, stored value, etc.), and/or cryptocurrency account. Although embodiments described herein describe funding accounts as being a checking account, debit card, or credit card, it should be appreciated that the disclosed embodiments can be configured to be funding account source payment system-agnostic. Non-limiting examples of a funding account may include a bank account (e.g., checking, savings), a payment card account (e.g., credit, debit, stored value card, gift card), non-payment card credit (e.g., fixed term loan, alternative lending, etc.)

and cryptocurrency (e.g., Bitcoin). Nothing described herein should be construed as limiting upon the nature of the receiver processor 140 employed as the funding account for an account or a card.

The receiver processor server 140*b* may then establish encrypted connections with those funding accounts, which may be at any of a variety of entities, including banks and/or other financial institutions. When instructed to generate a new account, the receiver processor server 140*b* may request that a receiver institution 145 and/or server 145*a* (or other funding source or server) link the new account to that funding account. The receiver processor server 140*b* may also access this funding account for billing purposes. In some instances, the receiver processor 140 may function as a receiver institution 145, or vice versa, and thus may be understood as the same entity/actor and/or be contractually related.

In particular embodiments, the receiver-component may generate a public-private key (or parameter) pair associated with the account holder's 105 account or the enterprise client's account. The private key/parameter may be stored with the receiver-component on the account holder's 105 personal computing device or the account processor 120, and the public key/parameter may be transmitted to the receiver processor server 140*b* (and stored in an associated account profile 140*c*). The private key may then be used to sign data transmitted with requests to generate new cards/accounts. The public key may be stored into the account holder's/client's profile and may be used by the receiver processor server 140*b* to determine the authenticity of the request for a new card/account.

During a process for generating a new card/account, after the receiver processor server 140*b* is instructed to generate a new card/account, the receiver processor server 140*b* may determine the authenticity of the request based on any number of factors about the account holder/client, account holder's personal computing device, account processor 120, and other factors, which may include thousands of data points. The receiver processor server 140*b* may store data/ one or more records indicating the commerce entity 115 involved/associated with an ongoing transaction (referred to herein as a "tag" or "merchant tag"), for which the account holder 105 or account processor 120 has requested a new card/account. The receiver processor server 140*b* may store this tag into a record for the new card/account into the account holder's/client's profile, along with the other relevant information associated with the new card/account (e.g., card number, CVV, payment network 135).

During a transaction authorization process, the receiver processor server 140*b* may receive or intercept an authorization query issued from the payment network 135 to a receiver institution 145. In some cases, the receiver-component may alert the receiver processor server 140*b* to the transaction and the receiver processor server 140*b* may receive the transaction data before an authorization request is sent from the commerce entity 115 to the payment network 135. The receiver processor server 140*b* may ultimately determine whether to authorize the transaction, as the receiver processor server 140*b* informs the receiver institution 145 or the payment network 135 whether the card is acceptable for the particular transaction. The receiver processor server 140*b* may query the account profiles 140*c* to determine whether the data about the card and the account holder/client matches what is stored for the card in the account profiles 140*c*. In some cases, the receiver processor server 140*b* may determine whether the commerce entity 115 identified in the transaction data matches to a commerce entity 115 associated with the particular card/account being analyzed, as indicated by the commerce-entity tag stored in a record of the card/account in the account profiles 140*c* (in some embodiments stored in and/or associated with an account holder/client profile or record).

In particular embodiments, the receiver processor 140 may optionally comprise authentication logic 140*d*. The authentication logic 140*d* may be provided by the account processor 120. The authentication logic 140*d* may provide the enterprise client with the ability to make custom transaction approval decisions even if the account processor 120 does not comprise a server.

In particular embodiments, the payment network 135 may be referred to as a "card scheme" or just as a "network." The payment network 135 may provide the rails for transactions to occur. The payment network 135 may sit in between acquirers and issuers and pass messages back and forth to make the transaction happen. The payment network 135 may also set the communication rules and standards that the acquirers and issuers need to adhere to. In particular embodiments, the payment network 135 may receive payment authorization requests from commerce-entity servers 115*a*, during or after transactions. New cards/accounts, like any other credit or debit cards, may be issued through the payment network 135. When a commerce-entity server 115*a* queries the payment network 135 on whether a card should be authorized for a transaction, the payment network 135 may review the card digits (e.g., Payment Account Number (PAN), Bank Identification Number (BIN), or Issuer Identification Number (IIN), etc.) to identify the receiver institution 145. The payment network 135 may then query the receiver institution server 145*a* whether to authorize the card. In particular embodiments, several numbers of the account/card number associated with a transaction may be configured to identify the receiver institution 145 as the appropriate party to authorize the transaction. As such, the payment network 135 may use these numbers to route the payment authorization request and transaction data to the receiver institution 145. In some implementations, the receiver institution server 145*a* may forward the authorization query to the receiver processor 140, which may then perform the requisite determinations, including whether the transaction data identifies the correct commerce entity 115 that matches the card's commerce-entity tag. The payment network 135 may then return an approval or rejection to the commerce-entity server 115*a* based upon how the receiver institution server 145*a* and receiver processor server 140*b* respond.

Figure 2:
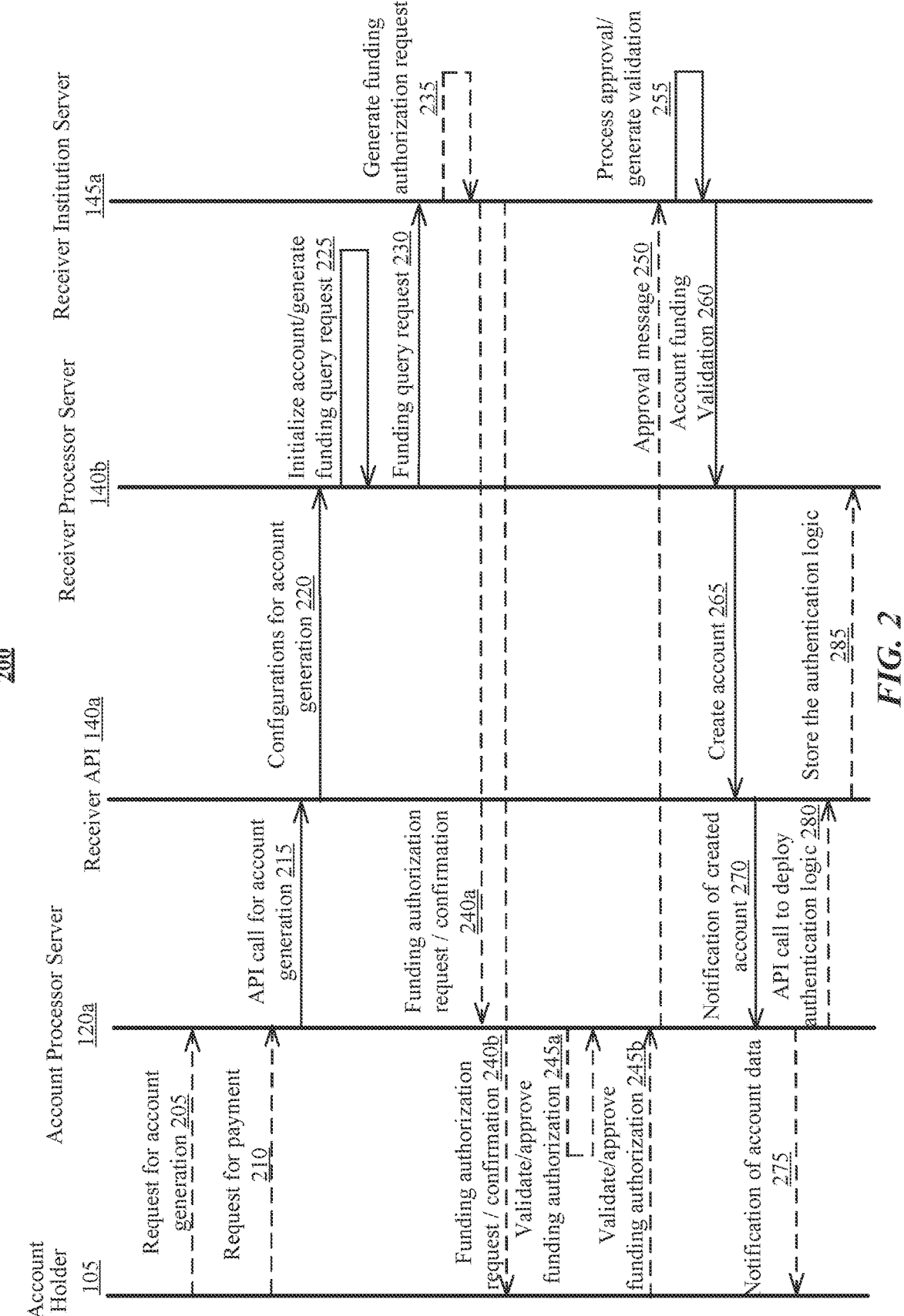
FIG. 2 illustrates an example sequence diagram for account initiation and validation.

FIG. 2 illustrates an example flow diagram 200 for account initiation and validation. The account initiation may be optionally started by the account holder 105. In particular embodiments, the account holder 105 may send a request for account generation 205 to the account processor server 120*a*. In alternative embodiments, the account holder 105 may send a request for payment 210 to the account processor server 120*a*. In particular embodiments, the account holder 105 sending a request for payment 210 comprises a request for account generation 205. As an example and not by way of limitation, the request for payment 210 may be based on the account holder's 105 attempt to make a purchase online. In particular embodiments, the account processor server 120*a* may make an API call for account generation 215. The API call may be responsive to the request for account creation 205 or request for payment 210. In alternative embodiments, the account processor server 120*a* may make the API call without any payer input. As an example and not by way of limitation, the enterprise client associated with the account processor server 120*a* may need to create individual accounts for its employees or contractors for its own business. The API call for account generation 215 may be based on the receiver processor API 140*a*. Through the receiver processor API 140*a*, the receiver processor server 140*b* may get the configurations for account generation 220. As an example and not by way of limitation, the configurations may comprise various account creation data, including email, password, access code (if applicable), name, address, birthday, and/or the like. The configurations may also comprise general information about the enterprise client or the account holder 105 (including preferences, interests, demographics, etc.) and/or know-your-customer (KYC) and/or other regulatory data. The configurations may further comprise one or more funding sources, such as the enterprise client's root account associated with the receiver institutions 145 (e.g., credit card accounts, checking accounts, savings accounts, or other financial accounts), that the enterprise client wishes to use as a funding source to generate the individual accounts. Although embodiments described herein describe funding accounts as being a checking account, savings account, debit card account, or credit card account, it should be appreciated that some embodiments can be configured to be agnostic to the funding source and/or payment system. Non-limiting examples of funding accounts/sources include a bank account (e.g., checking, savings), a payment card account (e.g., credit, debit, stored value card, gift card), and cryptocurrency (e.g., Bitcoin).

In particular embodiments, the receiver processor server 140*b* may use the configurations 220 to initialize an account/generate funding query request 225. During account initialization, the receiver processor server 140*b* may perform geographic analysis, temporal/geographic analysis, and behavioral pattern analysis. The analysis may be based on data collected by the aggregated transaction data. In some implementations, the receiver processor server 140*b* may obtain an identifier (ID, account identifier, etc.) for a payer/client requesting an account. The receiver processor server 140*b* may query a database, such as a receiver database and/or payment network database, for specific data collected by aggregated account transaction data records of the payer/client. The receiver processor server 140*b* may also query the databases for all possible field values that can be taken by each of the field values (e.g., time, AM/PM, postal code, merchant name, merchant identifier, transaction amount, cost, etc.). Using the field values of all the fields, the receiver processor server 140*b* may generate field value pairs for use in a correlation analysis on the field value pairs. An example field value pair is: "time" is "AM (Pacific)", and "merchant" is "Best Coffee Shop." The receiver processor server 140*b* may then generate/determine probability estimates for each field value pair occurring, for example, in the aggregated transaction data records. As an example and not by way of limitation, the receiver processor server 140*b* may select a field value pair and determine the number of records within the aggregated transaction data records where the field value pair occurs. The receiver processor server 140*b* may then calculate a probability quotient for the field value pair, for example, by dividing the number determined for the occurrences of the field value pair by the total number of aggregate transaction data records. The receiver processor server 140*b* may also assign a confidence level for the probability quotient based on the sample size (e.g., total number of records in the aggregated transaction data records). The receiver processor server 140*b* may generate and store a record, such as described above, including the field value pair, the probability quotient, and the confidence level associated with the probability quotient. The receiver processor server 140*b* may perform such a computation for each field value pair generated. The field value pairs and associated records may be used by the receiver processor server 140*b* when determining if a request is valid, and/or when determining whether to require additional validating information from the account holder/client (such as described above when the account holder 105 is outside of specified geographic area), and the account holder/client may be prompted to re-authenticate.

In particular embodiments, the receiver processor server 140*b* may also analyze the commerce entity's location or the location from which the account generation is being requested to determine if the commerce entity 115 is valid. Such analysis may be based on commerce entity's information collected by the account processor server 120*a*, history of the commerce entity 115, owner of the commerce entity 115, location of the commerce entity 115, location of the owner of the commerce entity 115, whether the commerce entity 115 is on a fraud list (or the probability the commerce entity 115 is related to a commerce entity 115 on a fraud list), etc. If the receiver processor server 140*b* determines that the commerce entity 115 exceeds a specified risk threshold (e.g., either because of collected information or lack of available information), or otherwise determines the commerce entity 115 is not valid, the receiver processor server 140*b* may transmit a notification to the account processor server 120*a* and/or the account holder 105 that the commerce entity 115 is not valid (or has the potential to be invalid). In some embodiments, a determination about the validity of a commerce entity 115 may prevent the payer/client from receiving an account for the commerce entity 115, while in other embodiments, the receiver processor server 140*b* may allow the account holder/client, once notified about the risk, to proceed with the transaction and accept the risk. In particular embodiments, the receiver processor server 140*b* may determine if the account holder/client already has an existing account that is tagged to the commerce entity 115, and if so, may retrieve the information for the existing tagged account, provide the account information to the account holder 105 or account processor server 120*a*, and update the corresponding record.

In particular embodiments, the goal of funding query request 225 may be to make sure an individual account can be funded and/or confirm that the stated information (e.g., identity, location, funding information, and/or the like) is accurate/truthful. In some embodiments, a funding source may be required for creating an account, while in other embodiments, a specified funding source may be not initially required for creating an account, though in such embodiments, a validated funding source may be required prior to providing account for use in a transaction.

In particular embodiments, the receiver processor server 140*b* may send the funding query request 230 to the receiver institution server 145*a* (e.g., a bank server associated with a funding checking account indicated by the client-provided information). Optionally, the receiver institution server 145*a* may generate a funding authorization request 235. The receiver institution server 145*a* may then either send the funding authorization request/confirmation 240*a* to the account processor server 120*a* or send the funding authorization request/confirmation 240*b* to the account holder 105 for validation/approval. In one embodiment, the account processor server 120*a* may validate/approve the funding authorization 245*a*. In another embodiment, the account holder 105 may validate/approve the funding authorization 245*b*, which may be returned to the account processor server 120*a*. As an example and not by way of limitation, the receiver institution server 145*a* may generate a message to the account holder 105, such as a text message, mobile application message, email, and/or the like, to which the account holder 105 may reply and/or confirm that the requested funding information is approved/acceptable. The account processor server 120*a* may then send the approval message 250 to the receiver institution server 145*a*. As another example and not by way of limitation, the receiver institution server 145*a* may approve or conduct a micro-transaction (e.g., a transaction for a small amount such as $0.13, $1.07, etc.) that shows up on the account holder's 105 or enterprise client's funding account and the account holder 105 or account processor server 120*a* may provide that specified amount and/or a code associated with the micro-transaction in response to show that the account holder 105 or account processor server 120*a* has access to the account, in order to validate the funding account. In particular embodiments, upon receiving the approval message 250, the receiver institution server 145*a* may validate the funding query request, i.e., process approval/generate validation 255. In particular embodiments, the receiver institution server 145*a* may perform process approval/generate validation 255 without sending an authorization request to the account holder 105 or account processor server 120*a*.

In particular embodiments, the receiver institution server 145*a* may provide an account funding validation 260 to the receiver processor server 140*b*. Once the receiver processor server 140*b* has received the funding account validation 260, it may create an individual account (including updating/creating a corresponding record in a database of the receiver processor 140). In particular embodiments, the individual account may be tagged to one or more specific commerce entities 115. The individual account may be generated as a bank account by the bank, issuer, or other type of financial institution whose servers are configured to receive instructions from the receiver processor server 140*b*. In particular embodiments, the receiver processor server 140*b* may store the new account information into the account profiles 140*c*. The receiver processor server 140*b* may also generate data indicating that the particular account is limited to use for the particular commerce entity 115. This data (referred to herein as a "tag") may be stored into and/or associated with the record of the new account or account profile 140*c*, and may be referenced by the receiver processor server 140*b* in the future to determine whether to authorize transactions attempting to submit the new account's number to a commerce entity 115 as a method of payment. Depending on the implementation, the record, account profile 140*c*, account(s), tag(s), etc. may be stored in a single record or in multiple, linked/associated records on one or more servers and/or databases.

In particular embodiments, the account creation 265 may be sent to the receiver processor API 140*a*, which may then transmit a notification of created account 270 to the account processor server 120*a*, indicating the requested account has been created for them. The account processor server 120*a* may download, access, and/or otherwise receive/retrieve related software program(s)/module(s), that, when activated/instantiated/run, can monitor the account holder's 105 actions/behaviors/interaction, such as browsing, transactions initiated by the account holder's 105 personal computing device (and associated programs), and interact with the receiver processor 140. In particular embodiments, the account processor server 120*a* may optionally send a notification of account data 275 to the account holder 105. As an example and not by way of limitation, the account data may comprise account number, routing number, merchant tag, etc.

In particular embodiments, the account processor server 120*a* may optionally make another API call to deploy its own authentication logic 280. Upon receiving the API call, the receiver processor server 140*b* may store the authentication logic 285. The authentication logic may provide the account processor 120 the ability to make custom transaction approval decisions without implementing it on its account processor server 120*a* or even if the account processor 120 does not have a server. Instead, the receiver processor 140 may implement and run the authentication logic on its server 140*b*.

Figure 3:
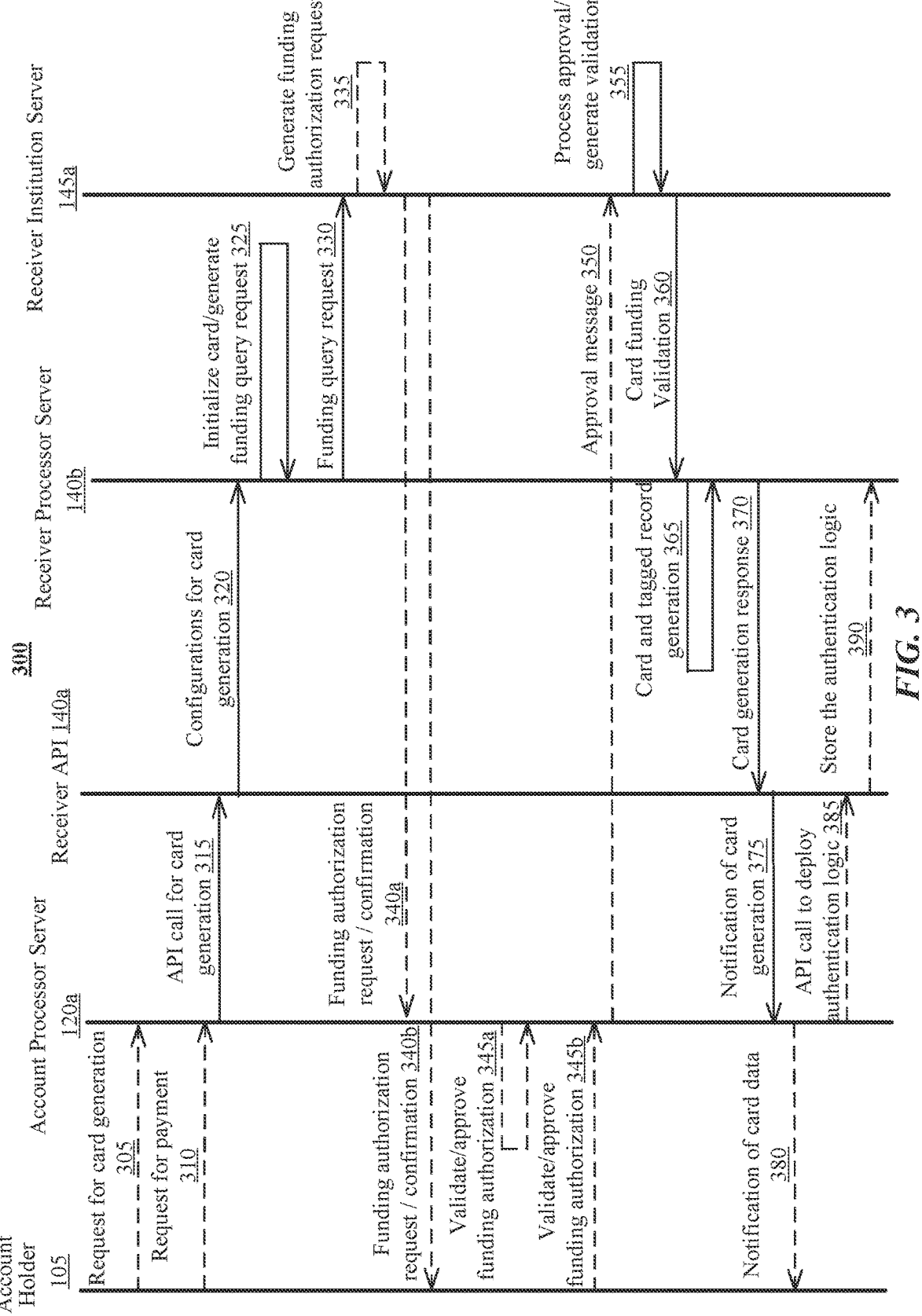
FIG. 3 illustrates an example sequence diagram for card initiation and validation.

FIG. 3 illustrates an example flow diagram 300 for card initiation and validation. The card initiation may optionally be started by the account holder 105. In particular embodiments, the account holder 105 may send a request for card generation 305 to the account processor server 120*a*. In alternative embodiments, the account holder 105 may send a request for payment 310 to the account processor server 120*a*. As an example and not by way of limitation, the request for payment 310 may be based on the account holder's 105 attempt to make a purchase online. In particular embodiments, the account processor server 120*a* may make an API call for card generation 315. The API call may be responsive to the request for card creation 305 or request for payment 310. However, the account processor server 120*a* may make the API call without any payer input. As an example and not by way of limitation, the enterprise client associated with the account processor server 120*a* may need to create individual cards for its employees or contractors for its own business. The API call for card generation 315 may be based on the receiver processor API 140*a*. Through the receiver processor API 140*a*, the receiver processor server 140*b* may get the configurations for card generation 320. As an example and not by way of limitation, the configurations may comprise various card creation data, including email, password, access code (if applicable), name, address, birthday, and/or the like. The configurations may also comprise general information about the enterprise client or the account holder 105 (including preferences, interests, demographics, etc.) and/or know-your-customer (KYC) and/or other regulatory data. The configurations may further comprise one or more funding sources, such as the enterprise client's root account associated with the receiver institutions 145 (e.g., credit card accounts, checking accounts, savings accounts, or other financial accounts) the enterprise client wishes to use as a funding source to generate the individual cards. Although embodiments described herein describe funding accounts as being a checking account, savings account, debit card account, or credit card account, it should be appreciated that some embodiments can be configured to be funding account source agnostic/payment system agnostic. Non-limiting examples of a funding accounts/sources include a bank account (e.g., checking, savings), a payment card account (e.g., credit, debit, stored value card, gift card), and cryptocurrency (e.g., Bitcoin).

In particular embodiments, the receiver processor server 140*b* may use the configurations to initialize card/generate funding query request 325. During card initialization, the receiver processor server 140*b* may perform geographic analysis, temporal/geographic analysis, and behavioral pattern analysis. The analysis may be based on data collected by the aggregated transaction data. In some implementations, the receiver processor server 140*b* may obtain an identifier (ID, account identifier, etc.) for an account holder/client requesting a card. The receiver processor server 140*b* may query a database, such as a receiver database and/or payment network database, for specific data collected by aggregated card transaction data records of the account holder/client. The receiver processor server 140*b* may also query the databases for all possible field values that can be taken by each of the field values (e.g., time, AM/PM, postal code, merchant name, merchant identifier, transaction amount, cost, etc.). Using the field values of all the fields, the receiver processor server 140*b* may generate field value pairs for use in a correlation analysis on the field value pairs. An example field value pair is: "time" is "AM (Pacific)" and "merchant" is "Best Coffee Shop" The receiver processor server 140*b* may then generate/determine probability estimates for each field value pair occurring, As an example and not by way of limitation, occurring in the aggregated transaction data records. As another example and not by way of limitation, the receiver processor server 140*b* may select a field value pair and determine the number of records within the aggregated transaction data records where the field value pair occurs. The receiver processor server 140*b* may then calculate a probability quotient for the field value pair, for example, by dividing the number determined for the occurrences of the field value pair by the total number of aggregate transaction data records. The receiver processor server 140*b* may also assign a confidence level for the probability quotient based on the sample size (e.g., total number of records in the aggregated transaction data records). The receiver processor server 140*b* may generate and store a record, such as described above, including the field value pair, the probability quotient, and the confidence level associated with the probability quotient. The receiver processor server 140*b* may perform such a computation for each field value pair generated. The field value pairs and associated records may be used by the receiver processor server 140*b* when determining if a request is valid, and/or when determining whether to require additional validating information from the account holder/client (such as described above when the payer is outside of specified geographic area), and the account holder 105 may be prompted to re-authenticate.

In particular embodiments, the receiver processor server 140*b* may also analyze the commerce entity's location for or from which the card is being requested to determine if the commerce entity 115 is valid. Such analysis may be based on commerce entity's information collected by the account processor server 120*a*, history of the commerce entity 115, owner of the commerce entity 115, location of the commerce entity 115, location of the owner of the commerce entity 115, whether the commerce entity 115 is on a fraud list (or the probability the commerce entity 115 is related to a commerce entity 115 on a fraud list), etc. If the receiver processor server 140*b* determines that the commerce entity 115 exceeds a specified risk threshold (e.g., either because of collected information or lack of available information), or otherwise determines the commerce entity 115 is not valid, the receiver processor server 140*b* may transmit a notification to the account processor server 120*a* and/or the account holder 105 that the commerce entity 115 is not valid (or has the potential to be invalid). In some embodiments, a determination about the validity of a commerce entity 115 may prevent the account holder/client from receiving a card for the commerce entity 115, while in other embodiments, the receiver processor server 140*b* may allow the account holder/client, once notified about the risk, to proceed with the transaction and accept the risk.

In particular embodiments, the receiver processor server 140*b* may determine if the account holder/client already has an existing card that is tagged to the commerce entity 115 (typically a multi-use card, as single-use cards may be limited to a single transaction), and if so, may retrieve the information for the existing tagged card, provide the card information to the account processor server 120*a* or account holder 105, and update the corresponding record. If the receiver processor server 140*b* determines that the commerce entity 115 is not already associated with an existing card for the account holder/client, the receiver processor server 140*b* may determine (in some embodiments, based on account holder/client specified information and/or parameters) if a new card for the commerce entity 115 is to be a single-use card or a multi-use card (e.g., for recurring payments, such as a monthly subscription). If single use, the receiver processor server 140*b* may generate a merchant-tagged single-use card and corresponding record (as detailed above) and provide/transmit the single-use card information to the account holder/client (and in turn the information may be provided to the account holder 105 and commerce entity 115 corresponding to the tag). If multi-use, the receiver processor server 140*b* may generate a merchant-tagged multi-use card and corresponding record and transmit information regarding that tagged multi-use card to the account processor server 120*a* or account holder 105 in recurring payments. In some embodiments, the multi-use tagged card may be configured for recurring payments to the tagged commerce entity 115 (e.g., a monthly subscription for a particular commerce entity 115), where the amount is unlikely to vary widely, if at all, and the timing of payment/charge is likely to be at a particular time each time period (e.g., the first of every month, or the first week of every month). In other embodiments, the merchant-tagged, multi-use card may be configured such that an account holder 105 can use the card at the tagged commerce entity 115 for a specified or unlimited amount of transactions, and may further be configured to limit the transaction amount per period and/or per transaction. In such embodiments, the receiver processor server 140*b* may still perform the analytics on the payer/client behavior, merchant information, and/or other collected data to confirm that each card request/transaction request and each payment validation is valid, and the matching may be performed for each.

In particular embodiments, the goal of funding query request 325 may be to make sure that an individual card can be funded and/or confirm that the stated information (e.g., identity, location, funding information, and/or the like) is accurate/truthful. In some embodiments, a funding source may be required for creating a card, while in other embodiments, a specified funding source may be not initially required for creating a card, though in such embodiments, a validated funding source may be required prior to providing a card for use in a transaction.

In particular embodiments, the receiver processor server 140*b* may send the funding query request 330 to the receiver institution server 145*a* (e.g., a bank server associated with a funding checking account indicated by the client-provided information). Optionally, the receiver institution server 145*a* may generate a funding authorization request 335. The receiver institution server 145*a* may then either send the funding authorization request/confirmation 340*a* to the account processor server 120*a* or send the funding authorization request/confirmation 340*b* to the account holder 105 for validation/approval. In one embodiment, the account processor server 120*a* may validate/approve the funding authorization 345*a*. In another embodiment, the account holder 105 may validate/approve the funding authorization 345b, which may be returned to the account processor server 120a. As an example and not by way of limitation, the receiver institution server 145a may generate a message to the account holder 105, such as a text message, mobile application message, email, and/or the like, to which the account holder 105 may reply and/or or confirm that the requested funding information is approved/acceptable. The account processor server 120 may then send the approval message 350 to the receiver institution server 145a. As another example and not by way of limitation, the receiver institution server 145a may approve or conduct a micro-transaction (e.g., a transaction for a small amount such as $0.13, $1.07, etc.) that shows up on the account holder's 105 or enterprise client's funding account and the account holder 105 or account processor server 120a may provide that specified amount and/or a code associated with the micro-transaction in response to show that the account holder 105 or account processor server 120a has access to the account, in order to validate the funding account. In particular embodiments, upon receiving the approval message 350, the receiver institution server 145a may validate the funding query request, i.e., process approval/generate validation 355. In particular embodiments, the receiver institution server 145a may perform process approval/generate validation 355 without sending an authorization request to the account holder 105 or account processor server 120a.

In particular embodiments, the receiver institution server 145a may provide a card funding validation 360 to the receiver processor server 140b. Once the receiver processor server 140b has received the card funding validation 360, the receiver processor server 140b may perform card and tagged record generation 365. Specifically, the receiver processor server 140b may create an individual card (including updating/creating a corresponding record in a database of the receiver processor 140). The receiver processor server 140b may also tag the individual card to one or more specific commerce entities 115. The individual card may be generated as an actual debit/credit card account or virtual card by the bank, issuer, or other type of financial institution whose servers are configured to receive instructions from the receiver processor server 140b. For a physical card, the receiver processor server 140b may access a card issuer server to request generation of the physical card. In particular embodiments, the receiver processor server 140b may store the new card information into the account profiles 140c. The receiver processor server 140b may also generate data indicating that the particular card is limited to use for the particular commerce entity 115. This data (referred to herein as a "tag") may be stored into and/or associated with the record of the new card or account profile 140c, and may be referenced by the receiver processor server 140b in the future to determine whether to authorize transactions attempting to use the new card at a commerce entity 115 as a method of payment. Depending on the implementation, the record, account profile 140c, card(s), tag(s), etc. may be stored in a single record or in multiple, linked/associated records on one or more servers and/or databases.

In particular embodiments, the receiver processor server 140b may send a card generation response 370 to the receiver processor API 140a, which may then transmit a notification of card generation 375 to the account processor server 120a, indicating the requested card has been created for them. The account processor server 120a may download, access, and/or otherwise receive/retrieve related software program(s)/module(s), that, when activated/instantiated/run, can monitor the account holder's 105 actions/behaviors/ interaction, such as using the card at commerce entities 115, browsing, transactions initiated by the account holder's 105 personal computing device (and associated programs), and interact with the receiver processor 140. In particular embodiments, the account processor server 120a may optionally send a notification of card data 380 to the account holder 105. As an example and not by way of limitation, the card data may comprise card number, authorization code (CVV), expiration date, merchant tag, etc.

In particular embodiments, the account processor server 120 may optionally make another API call to deploy its own authentication logic 385. Upon receiving the API call, the receiver processor server 140b may store the authentication logic 390. The authentication logic may provide the account processor 120 the ability to make custom transaction approval decisions without implementing it on its account processor server 120a or even if the account processor 120 does not have a server. Instead, the receiver processor 140 may implement and run the authentication logic on its server 140c.

Figure 4:
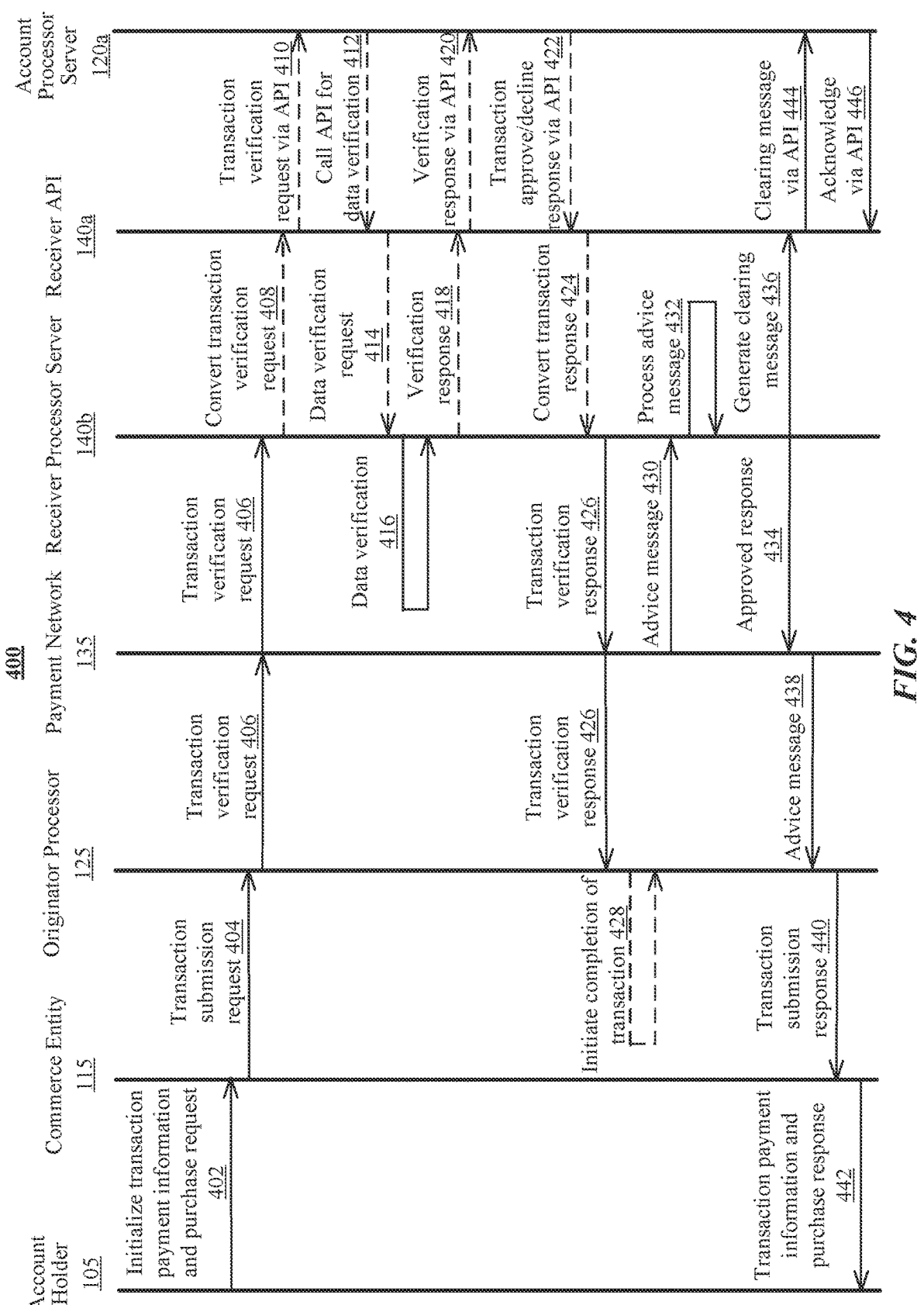
FIG. 4 illustrates an example sequence diagram for enabling a transaction by the receiver processor.

FIG. 4 illustrates an example flow diagram 400 for enabling a transaction by the receiver processor 140. In particular embodiments, the account holder 105 may initialize transaction payment information and purchase request 402 to the commerce entity 115. As an example and not by way of limitation, the account holder 105 may use a card at a payment machine 115b associated with the commerce entity 115. As another example, for online transaction, the account holder 105 may provide input into a personal computing device, such as mobile application input (e.g., via a user interface such as a touch screen, voice commands, gestures, eye-tracking, etc.) and web navigation input (via keyboard, mouse, other peripheral, etc.). Additional input may be monitored, tracked, and/or recorded, including direct input from the account holder 105, information/data from another program or application running on the personal computing device, information/data from sensors of the personal computing device (e.g., GPS data, BLUETOOTH data, wireless network data, camera data, video data, photo data, microphone data, accelerometer data, etc.), and/or the like.

In particular embodiments, the commerce entity 115 may collect the transaction data (including the account/card information) and purchase request (e.g., via the payment machine 115b). For online transactions, the commerce entity 115 may comprise any number of servers 115a responsible for processing incoming online transaction data, or the commerce entity 115 may transmit the data from the online transaction to the servers of a third-party payment-processing vendor. In either case, the account/card information and any other relevant data may be submitted to the appropriate verifying party, after the online transaction data comprising the payment information is received from the account holder's 105 personal computing device.

In particular embodiments, the commerce entity 115 may then transmit the transaction data (e.g., as a transaction submission request 404) to the originator processor 125 (for the appropriate originator institution 130). The originator processor 125 may in turn transmit a transaction verification request 406 including the transaction data (typically via the payment network 135) to the receiver processor server 140b.

In particular embodiments, the transaction data that is provided by the commerce entity 115 and goes through to the receiver processor server 140b may comprise one or more of card information, payment/charge amount, billing information, or card acceptor name and location. The card acceptor name and location may be defined, for example, to be 43 characters in length, divided into 4 distinct sub-properties: positions 1-25 is address data, positions 26-38 is city data, positions 39-40 is state data, positions 41-43 is country data. The disclosed messages may conform to the appropriate ISO protocols, and, unlike other payment methods that require use of new data formats, communications equipment, complex security token, and/or complex user-defined rules, may not require any additional burden, bandwidth, or processing power on the part of the commerce entity 115, the originator processor 125, the receiver processor server 140*b*, and/or the payment network 135 (depending on which are implicated in the transaction). The transaction data received by the receiver processor server 140*b* may be analyzed, such as by tag matching and/or as detailed below.

As noted above, the receiver processor 140 may not require additional bandwidth, or even additional processing on the part of the commerce entity 115 or intermediary parties—the card issued by the receiver processor 140 may be handled by them in the same way as a traditional credit card without requiring the commerce entity 115 to provide additional information, making the receiver processor 140 function for commerce entities 115 relying on payment methods used more than a decade ago while also be functional with commerce entities 115 that have the latest payment methods (e.g., tokenized payment, mobile wallet, QR payment, etc.). As such, when the receiver processor server 140*b* receives card acceptor name and location, the format and content of that information may vary widely.

In particular embodiments, the receiver processor server 140*b* may optionally convert the transaction verification request 408 for the receiver processor API 140*a* and provide it to the receiver processor API 140*a*. A transaction request via the API 410 may be then sent to the account processor server 120*a*. It should be understood that, in some implementations, the originator institution 130/originator processor 125, receiver institution 145/receiver processor 140, and/or the payment network 135 may not be included and/or may represent/be associated with the same entity (e.g., if the originator institution 130 is also the receiver institution 145), and in any event the relevant information starting with the information provided by the commerce entity 115 may be ultimately provided to the receiver processor server 140*b* (e.g., in the form a transaction verification request 406). In particular embodiments, the account processor server 120*a* may verify the data by itself. In alternative embodiments, the account processor server 120*a* may call the API for data verification 412 by the receiver processor 140. The receiver processor API 140*a* may transmit the data verification request 414 to the receiver processor server 140*b*.

In particular embodiments, the receiver processor server 140*b* may perform data verification 416, which may be responsive to the transaction verification request 406 or data verification request 414. During data verification 416, the receiver processor server 140*b* may determine whether to authorize the payment by comparing fields of the transaction data against fields stored in the account profiles 140*c*. As an example and not by way of limitation, the receiver processor server 140*b* may receive the card number and then cross-reference the card number against the corresponding record in account profiles 140*c*. Using the transaction data, the receiver processor server 140*b* may determine not only whether the data associated with the card number is generally correct (e.g., card number, CVV, name, address), and may also determine whether the transaction data identifies the commerce entity 115 as the particular commerce entity 115 tagged to the particular card number. Conventional systems may determine whether the inputted data is accurate and satisfies the required data field inputs. Some conventional systems may link cards/accounts to categories of commerce entities 115 through the well-known MCC coding standards, which may limit the category for the card number. In some cases, conventional systems may limit the number of uses for the card number. Some conventional systems may be available to commerce entities 115 wanting to publish their own merchant-specific branded cards, such as gift cards, but these may be unwieldy, and may be not brand agnostic. Here, the transaction data may comprise an indicator for the particular commerce entity 115 associated with the transaction, which may then be matched to a tag stored in the record of the card. Thus, the limitations may be addressed, but there may be additional protection over known authorization techniques, because a card number stolen from Merchant A cannot be later used to pay for transactions to Merchant B, as the receiver processor server 140*b* may automatically review the transaction data before issuing a verification response to the payment network 135.

In particular embodiments, the transaction data that is received by the receiver processor server 140*b* may be unstructured, making it difficult to match the transaction message with the commerce entity 115 that originated the transaction. The address field may generally be used for the name of the commerce entity/service (though the name is sometime incomplete or missing), and the city field may be sometimes used for city, other times with the domain name, phone number, service name, etc., and state and country may sometimes be offshore for a domestic business.

In particular embodiments, when the receiver processor server 140*b* receives a transaction verification request 406, a confidence score may be calculated for whether the charge matches the metadata captured when generating the corresponding card. In some implementations, first the card acceptor name and location address and city subfields may be lexically parsed and tokenized by splitting on any non-alphanumeric characters. This may yield what can be understood or defined as a bag-of-words (BOW), and the BOW of the lexically parsed and tokenized subfields defined as a first BOW ("BOW A"). The BOW may comprise data where text is represented as the multiset of its components, in some embodiments disregarding grammar and word order while keeping multiplicity. A second BOW ("BOW B") may comprise the stored metadata from the configurations for card generation 320 collected when the card was generated/created. Depending on the implementation, a variety of processes may be applied, for example, words of two characters or less may be stripped from both bags. Similarly, commonly occurring strings such as www, inc, llc may additionally or alternatively be stripped out from both bags.

Then, BOW A and BOW B may be input to a function (e.g., Bayesian probability function, k-means clustering algorithm, etc.) that returns a percentage confidence score that BOW A is related to BOW B. If the probability is over a specified threshold T, then the receiver processor server 140*b* may communicate that the charge is accepted, else the receiver processor server 140*b* may communicate that the charge is declined. In some embodiments, threshold T may change as more transactions are processed and/or as a probability function (e.g., Bayes function) and/or cluster analysis (e.g., k-means clustering algorithm) is trained and/or updated with historical data. In some embodiments, if the threshold T was not reached, the receiver processor server 140*b* may determine if the card was created within a given time period (e.g., within the past five minutes) and if so, provided the other parameters are within tolerances (e.g., payment amount), the charge may be approved based on temporal locality as an indicator of validity (presuming the probability function returned a false negative). For online transactions, the authorization decisioning of the receiver processor server 140*b* may be enhanced by comparing entered information, such as billing information, at checkout with corresponding information, such as AVS (address verification system) information passed within the authorization message. Some information entered at time of billing may, in some embodiments, comprise coded or tagged information based on the card generation. In some embodiments, the receiver processor server 140*b* may determine if the authorization amount matches what was collected as the total on card created (in some embodiments, within specified tolerances to account for service fees and/or service/convenience charges).

In particular embodiments, the receiver processor server 140*b* may utilize stream training and matching for authorization. In some implementations, the receiver processor server 140*b* may utilize clustering analysis, for example, to analyze two or more BOWs. In one embodiment, BOWs may be input to a k-means clustering algorithm. In some implementations, a k-means cluster may be retrained every time a new card is generated/created. In some embodiments, a k-means cluster may utilize the number of clusters to compute when the model is trained, and each commerce entity 115 for which a card is created may be a cluster. For each cluster, the receiver processor server 140*b* may tokenize every word (and/or every word meeting specifications, such as a length greater than 1 character, etc.) and vectorize it to create a BOW. For an example merchant "Merchant A", an example card request may generate a BOW having the form of: ["merchant A", "your", "wallet", "utf8", "2062664064", "reno", "nv", "usa"]. Depending on the implementation, the k-means cluster may include more than 100, 500, 1000, 2000, 3000, 4000, 5000, 6000, 7000, 8000, 9000, 10000, 11000, 12000, 13000, 14000, 15000, 20000, 25000, 30000, 40000, 50000, or more than 100000 unique clusters. The receiver processor server 140*b* may, in some embodiments, retrain the k-means clustering on each card-create request, to retrain the k-means cluster with the new, additional cluster added.

In particular embodiments, the receiver processor server 140*b* may use behavioral pattern analysis in validating an incoming transaction. In some embodiments, the receiver processor server 140*b* may also utilize machine learning to provide dynamic (i.e., real-time and/or near real-time) fraud and risk management, including fraud/risk scoring. The receiver processor server 140*b* may collect many different data points per account holder/client and transaction which may be aggregated in a centralized database. This data may be secured and augmented with third-party data. Machine-learning models may be applied to analyze the data and assign a risk score (e.g., from 1-100, based on increasing risk). This risk score may allow the receiver processor server 140*b* to further analyze/determine whether a transaction should be authorized or rejected. This score may also allow the receiver processor server 140*b* to determine what risk management actions it may take with an account holder/client, including but not limited to lending and underwriting as well as fraud monitoring and prevention. In some instances, the risk score may be dynamic because the machine-learning models may run continuously and may be constantly refining themselves based on the latest data inputs.

In particular embodiments, after data verification 416, a verification response 418 may be provided to the receiver processor API 140*a*. The receiver processor API 140*a* may further transmit the verification response via API 420 to the account processor server 120*a*. In particular embodiments, the transaction approve/decline response via API 422 may be returned to the receiver processor API 140*a*. The receiver processor API 140*a* may then convert the transaction response 424 for the receiver processor server 140*b*.

In particular embodiments, after the receiver processor server 140*b* or account processor server 120*a* determines from the transaction data that the commerce entity 115 is not the commerce entity 115 identified by the tag stored in the record for the card number, as indicated in the account profiles 140*c*, the receiver processor server 140*b* or account processor server 120*a* may then return a rejection/decline indicator message. It should be noted that the card owner's true and accurate information may be submitted for verification, but the transaction may still be declined. A bad actor, such as a hacker, may be able to steal enough accurate data about the card/bank account from its owner to be capable of submitting the requisite information. The payment, however, may be rejected when the transaction data for the commerce entity 115 is not matched to the tag associated with the card number under scrutiny.

In particular embodiments, after the receiver processor server 140*b* or account processor server 120*a* determines from the transaction data that the commerce entity 115 is the commerce entity 115 identified by the tag stored in the record for the card number, as indicated in the account profiles 140*c*, the receiver processor server 140*b* or account processor server 120*a* may then return an approval indicator message.

In particular embodiments, the receiver processor server 140*b* may send the transaction verification response 426 via the payment network 135 to the originator processor 125. The originator processor 125 may optionally initiate completion of transaction 428. In particular embodiments, the payment network 135 may send an advice message 430 to the receiver processor server 140*b*, which may process the advice message 432. The receiver processor server 140*b* may send the approved response 434 to the payment network 135. In particular embodiments, the payment network 135 may generate an advice message 438 based on the approved response 434 and send it to the originator processor 125. The originator processor 125 may send the transaction submission response 440 to the commerce entity 115. The commerce entity 115 may then return the transaction payment information and purchase response 442 to the account holder 105.

In particular embodiments, while sending the approved response 434 to the payment network 135, the receiver processor server 140*b* may generate a clearing message 436 for the receiver processor API 140*a*. The receiver processor API 140*a* may send the clearing message via API 444 to the account processor server 120*a*. The account processor server 120*a* may then acknowledge via API 446 the receipt of the clearing message.

Payment Instruction APIs for Accepting and Processing Payment Requests

In particular embodiments, the receiver processor 140 may utilize a payment instruction API (PIAPI) as a microservice to accept and process payment requests. As an example and not by way of limitation, the payment requests may be ACH originations. An ACH transaction is an electronic fund transfer made between banks and credit unions across the automated clearing house network. ACH may be used for all kinds of fund transfer transactions, including direct deposit of paychecks and monthly debits for routine payments. In particular embodiments, payments may be requested in batch or individually and the status thereof may be interrogated. The payment instruction API may also support the origination of ACH credits/debits in response to requests from internal services, may allow the entity associated with the receiver processor 140 to automate post-pay program-level settlements and consolidate cardholder funded transactions into a single daily ACH, and may enable a streamlined process of issuing chargeback credits to enterprise clients of the receiver processor 140. The embodiments disclosed herein may be applied to various types and methods of payment requests including ACH originations, Fedwire, acquiring, pull payments, push payments, etc. In particular embodiments, a pull payment may be a method of payment whereby the payee instructs the payer to send the money. Therefore, the payee may be in control of the payment and instructing that the money be sent. Beforehand, however, a payer may need to give authorization for the funds to be taken. By contrast, a push payment may be a method of payment whereby a payer initiates the sending of money to a payee. The payer may be therefore in control of the payment, including the amount and destination. Although this disclosure describes processing particular payment requests in a particular manner, this disclosure contemplates processing any suitable payment request in any suitable manner.

In particular embodiments, the receiver processor 140 may receive, via one or more receiver application programming interfaces (APIs) configured as payment instruction APIs, a first request to create a payment origination file associated with instructions to transfer resources from a first resource account to a second resource account. The receiver processor 140 may then generate, based on information associated with the first request, the requested payment origination file. The receiver processor 140 may further transmit, via the payment instruction APIs, to one or more remote servers associated with an external financial entity, the requested origination file. In particular embodiments, the receiver processor 140 may receive, via the payment instruction APIs from the one or more remote servers associated with the external financial entity, a payment return file associated with the payment origination file. The receiver processor 140 may further store, in a first database associated with the receiver processor 140, the payment origination file and the payment return file. In particular embodiments, the receiver processor 140 may validate, by a parsing module associated with the receiver processor 140, in response to the payment origination file and the payment return file being stored in the first database, the payment origination file and the payment return file. The receiver processor 140 may further store, in a second database associated with the receiver processor 140, the validated payment origination file and the validated payment return file. In particular embodiments, the second database may be configured to receive queries associated with one or more of a plurality of validated payment origination files and validated payment return files stored in the second database.

There may be different types of funding associated with transactions. As an example and not by way of limitation, one type may be program-level funding where an enterprise client of the receiver processor 140 funds all transactions in their instance with a single bank account. As another example and not by way of limitation, another type may be cardholder funding where transactions are funded by the bank accounts of the end-users instead of an overall program-managed user. Program-managed users may be settled in two ways depending on whether they are program-level funded or cardholder-funded. For cardholder funding. ACH pulls in conventional financial systems may be largely per transaction and may not be consolidated into a single daily ACH entry (with the exception of house accounts). Regarding the settlement for program-level funding, there may be a manual process that relies on a query (e.g., SQL) to a transaction log. For example, users of the receiver processor 140 may receive a pulse email with a CSV file that breaks down the aggregate ACH amount by transaction. But such manual process may have issues such as CSVs being limited to 2K rows, future deprecation of the feature itself, etc. In addition, both cardholder funding and program-level funding may rely on internal records of settlement (e.g., transaction log) associated with the receiver processor 140 and may be not programmatically reconciled against a third-party's reporting of settled transaction (e.g., a report from a network provider). For example, there may be manual reconciling of settlements against cash and network ledger on a monthly (or weekly) basis.

As discussed above, a general and flexible ACH service that allows for easy initiation of ACH originations both for internal processes (e.g., program-level settlement) and user use cases (e.g., consolidated daily ACH for cardholder funded users) may not exist in conventional financial/payment systems. Programmatic ACH originations may be only done for cardholder-funded users and may largely occur on the transaction-level (i.e., each settled transaction is one ACH entry). To address these issues, the embodiments disclosed herein may decouple ACH originations from transactions and create a new flexible payment instruction API (PIAPI) to support a plurality of use cases.

Figure 5:
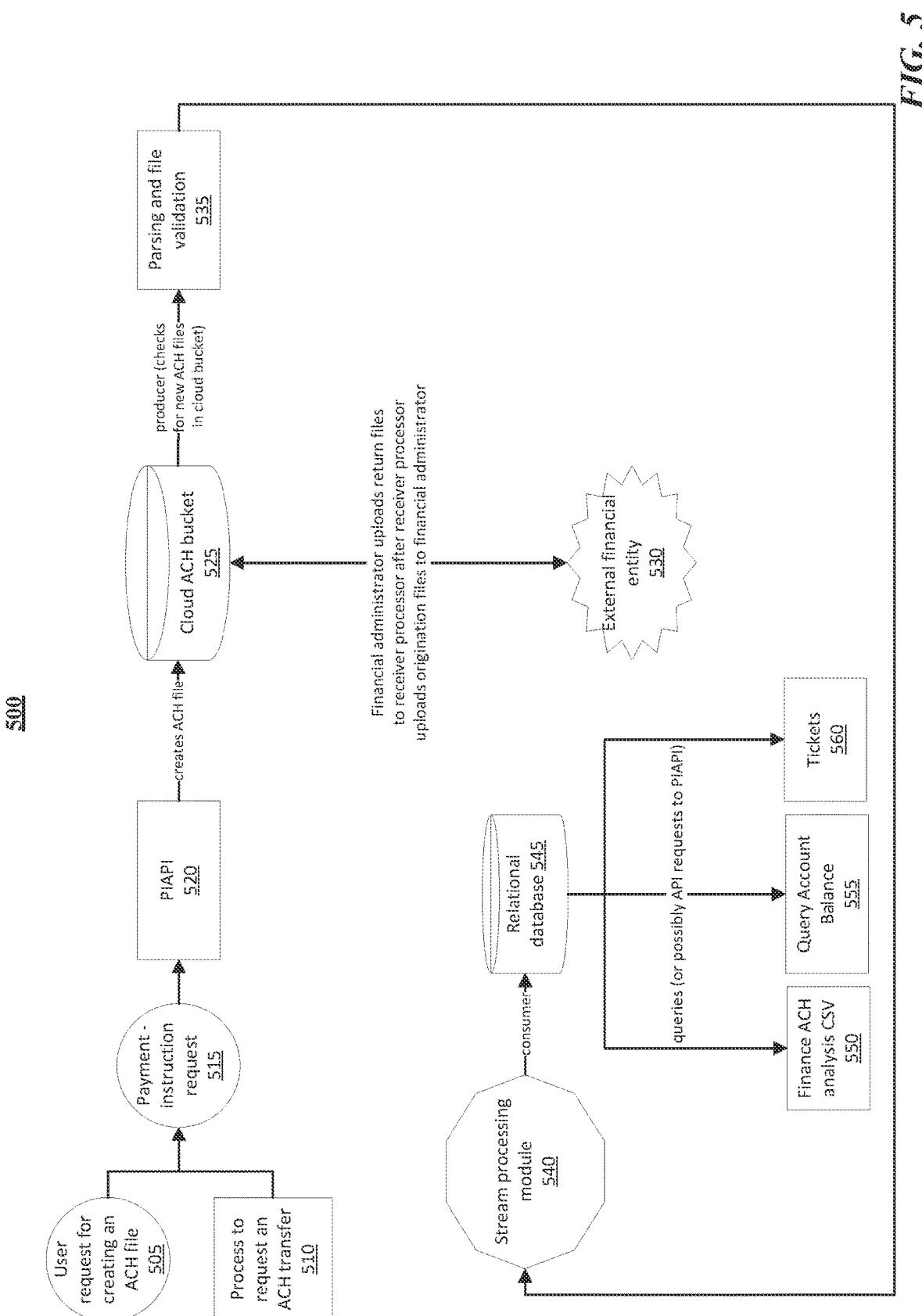
FIG. 5 illustrates an example flow diagram for decoupling ACH originations from transactions.

FIG. 5 illustrates an example flow diagram 500 for decoupling ACH originations from transactions. In particular embodiments, the receiver processor 140 may receive a user request for creating an ACH file 505. In alternative embodiments, the receiver processor 140 may receive a process to request an ACH transfer 510. As an example and not by way of limitation, the process to request an ACH transfer may be a funding management logic. Such process 510 may query the transaction information from a database of the receiver processor 140 and request the payment instruction API 520 to create the same ACH file. The user request 505 or process 510 may be formed into a payment instruction request 515. The payment instruction request 515 may be sent to the payment instruction API (PIAPI) 520.

In particular embodiments, the endpoint of the payment instruction API 520 may take entry details and account details to create an ACH origination file. The created ACH file may be uploaded to a cloud ACH bucket 525. In particular embodiments, the created ACH file may be also uploaded to its respective receiver institution 145 (e.g., a bank). The created ACH file may be additionally uploaded to an external financial entity 530 (e.g., Fed), which in return uploads ACH return files to the cloud ACH bucket 525. The receiver processor 140 may generate audit or communications (e.g., email) every time an ACH file is created. In particular embodiments, the payment instruction API 520 may also be able to accept requests for internal use cases like account rebalancing. The ACH files in the ACH bucket 525 may be either ACH originations sent by the payment instruction API 520 or ACH returns sent by the external financial entity 530. As a result, the embodiments disclosed herein may have a technical advantage of easily initiating ACH originations both for internal processes (e.g., program-level settlement) and user use cases (e.g., consolidated daily ACH for cardholder funded users) as the payment instruction API 520 may enable these functions for both internal and external requesting entities.

In particular embodiments, the receiver processor 140 may then validate and store ACH files. ACH origination files and ACH return files may be stored in the cloud ACH bucket 525. In alternative embodiments, ACH files created by the payment instruction API 520 may drop ACH origination files into a cloud ACH-originations bucket and ACH return files into a cloud ACH-returns bucket with the two buckets being separate from each other. In particular embodiments, the cloud event of a file getting created in the respective buckets may trigger a function-executing logic. As an example and not by way of limitation, a producer module may check for new ACH files in the cloud buckets 525. The function-executing logic may perform parsing and file validation 535 on the ACH file.

After parsing and file validation 535, the function-executing logic may load the ACH file into the stream processing module 540 (i.e., for ACH-originations or ACH-returns). Another function-executing logic with a consumer module associated with the stream processing module 540 may then consume any new messages that get populated to the ACH-returns or ACH-originations topics and write them into a relational database 545. As an example and not by way of limitation, the relational database 545 may be an SQL database.

In particular embodiments, the receiver processor 140 may further perform ACH database queries. Queries may run against the relational database 545 (optionally by additional endpoints added to the payment instruction API 520) for the following purposes. First, the receiver processor 140 may create finance ACH file analysis CSV 550. In particular embodiments, the receiver processor 140 may receive, via the one or more payment instruction APIs 520 from a requesting entity, a query for a financial analysis associated with one or more of the plurality of validated payment origination files and validated payment return files stored in the second database. The receiver processor 140 may then generate, for each of the one or more validated payment origination files and validated payment return files, one or more message schemas. The receiver processor 140 may then generate a financial analysis report by querying, for each of the one or more validated payment origination files and validated payment return files, the one or more message schemas against the second database. The receiver processor 140 may further send, via the one or more payment instruction APIs 520, to the requesting entity, the financial analysis report.

Second, the receiver processor 140 may query the balance of an account 555 associated with the external financial entity 530 (e.g., a Fed account). In particular embodiments, the receiver processor 140 may receive, via the one or more payment instruction APIs 520 from a requesting entity, a query for a balance of an account associated with the external financial entity 530. The receiver processor 140 may then generate, for each of the plurality of validated payment origination files and validated payment return files, one or more message schemas. The receiver processor 140 may then determine the balance by querying the one or more message schemas for each of the plurality of validated payment origination files and validated payment return files against the second database. The receiver processor 140 may further send, via the one or more payment instruction APIs 520 to the requesting entity, the determined balance.

Third, the receiver processor 140 may provide quick responses to tickets 560 from any associated receiver institutions 145 about discrepancies. In particular embodiments, the receiver processor 140 may receive, via the one or more payment instruction APIs 520 from a requesting entity, a query for a discrepancy. The receiver processor 140 may then generate, for each of the plurality of validated payment origination files and validated payment return files, one or more message schemas. The receiver processor 140 may then generate a response regarding the discrepancy by querying the one or more message schemas for each of the plurality of validated payment origination files and validated payment return files against the second database. The receiver processor 140 may further send, via the one or more payment instruction APIs 520 to the requesting entity, the response regarding the discrepancy.

In particular embodiments, the one or more payment instruction APIs 520 may comprise a plurality of endpoints operable for a user to specify one or more of the first resource account, the second resource account, an amount of resources, a memo, an internal description, or an internal tag. In other words, at a high-level, the endpoints of the payment instruction APIs 520 may allow users to specify one or more of "from account", "to account", amount, memo to the receiver, or internal description or tag. The plurality of endpoints may comprise one or more external endpoints and one or more internal endpoints. In particular embodiments, the one or more external endpoints may be configured for one or more of generating and transmitting the payment origination file based on the instructions, accessing a status associated with the transfer of the resources from the first resource account to the second resource account, or accessing a summary associated with the transfer of the resources from the first resource account to the second resource account. External and internal endpoints of the payment instruction APIs 520 that are operable for a user to specific a variety of parameters associated with the payment processing may be an effective solution for addressing the technical challenge of enabling users to easily request payment processing via the payment instruction APIs 520.

The external endpoints may be used to create and upload an ACH file with the given payment instructions. To do that, a user may specify body parameters such as request, class of payment batch item, class of payment entry item (e.g., transaction type, originating account ID, receiving account ID, and amount), etc. The payment instruction API 520 may return a response including response ID, token, message, etc. The external endpoints may be also used to get the status and summary of a given payment. To do that, the user may specify query parameters such as file ID which is a UUID token and option of whether using testing flow. The payment instruction API 520 may then return a response including response ID, token, payment status, filename, total debit amount, total credit amount, payments count, payment type, entries, message, etc. As a result, the embodiments disclosed herein may have a technical advantage of supporting expanded/complex funds flows as the receiver processor may originate ACH semi-arbitrarily and on behalf of multiple parties.

In particular embodiments, the one or more internal endpoints may be configured for one or more of validating the payment origination file and the payment return file, storing the validated payment origination file and the validated payment return file, or releasing, from an account ledger, one or more pending debits associated with the transfer of the resources based on a pending duration of the one or more pending debits being greater than a threshold period of time. The internal endpoints may be used to parse and process a completed ACH file or ACH acknowledgement file. For an ACH file, the receiver processor 140 may write messages into the account ledger, update account information if notifications of changed entries were present in the file (in case of return file), create an ACH origination file if unknown external origination entries are present in file (in case of return file), and store ACH data into the database. In particular embodiments, the receiver processor 140 may write, in an account ledger associated with the receiver processor 140, one or more messages associated with the payment origination file and the payment return file. In particular embodiments, the receiver processor 140 may identify, in the payment return file, one or more notification-of-change (NOC) entries identifying account information associated with the first account to be updated. The receiver processor 140 may further update, in an account ledger associated with the receiver processor 140, the account information associated with the first resource account. In particular embodiments, the receiver processor 140 may identify, in the payment return file, one or more unknown external origination entries. The receiver processor 140 may further generate an additional payment origination file. For an ACH acknowledgement file, the receiver processor 140 may generate an alert if the status of the file is anything other than "accepted with no errors" and update the status of the ACH file in the database. The internal endpoints may be also used to parse and store data from the ACH file into the database. The internal endpoints may be additionally used to release pending ACH debits from the account ledger that are older than a number of (e.g., 4) business days.

In particular embodiments, the receiver processor 140 may attribute millions of transactions to a diverse set of financial accounts. Such transactions may follow different flows and affect different accounts based on user and internal configurations. The receiver processor 140 may use an account ledger to attribute transactions, aid in transaction processing by decisioning on balances, produce accurate balances and model all money movements. As a result, the receiver processor 140 may automate the real-time ledgering of financial and non-financial activities from multiple sources. In particular embodiments, the receiver processor 140 may use the account ledger to process a transaction by using real-time balance information to determine whether a message should be authorized, which may include assigning a transaction identifier and a group identifier, processing the authorization, and updating various ledger balances based on the transaction itself. With the account ledger, the receiver processor 140 may automate and streamline the process of posting both financial and non-financial transactions to a flexible chart of accounts, as well as approve or decline transactions that result in movements of money. The receiver processor 140 may also offer an auditable trail of transactions and balances, both real-time and historical. More information on the account ledger may be found in U.S. patent application Ser. No. 17/949,012, filed 20 Sep. 2022, which is incorporated by reference.

In particular embodiments, the receiver processor 140 may store data from ACH origination and return files into tables (by date range, by trace id, by batch id, by company name). As an example and not by way of limitation, such tables may be SQL tables. Table 7 illustrates an example SQL table of ACH files. The receiver processor 140 may set up columns with schema as illustrated in Table 7 below. The receiver processor 140 may then create a database from that data. The receiver processor 140 may further feed ACH files into the table of ACH files.

TABLE 7

| An example SQL table of ACH files. | | |
|---|---|---|
| id | file ID, UUID or autoincrementing integer, primary key | |
| immediate_destination | routing number to which file is being transmitted | |
| immediate_origin | routing number that is transmitting the file | |
| immediate_destination_ name | | |
| immediate_origin_name | | |
| file_creation_date | YYYYMMDD | |
| file_creation_time | HHMM | |
| filename | name of file in cloud | |
| total_debit | | BIGINT |
| total_credit | | BIGINT |
| created_at | ETL (extract, transform, load) metadata, row creation date, default NOW( ) | |
| file_type | origination, return | |
| file_id_modifier | | |
| batch_count | | |
| block_count | | |
| entry_count | | |
| entry_hash | | |

In particular embodiments, the information associated with the first request may comprise one or more of an entry identifier, a batch identifier, a transaction code, a routing number, an account number, a transaction amount, a name of a receiving entity, an entry trace number, an addenda record indicator, or a created time. Table 8 illustrates an example SQL table of ACH batches. Table 9 illustrates an example SQL table of ACH entries. Table 10 illustrates an example SQL table of ACH addenda.

TABLE 8

| An example SQL table of ACH batches. | | |
|---|---|---|
| id | batch ID, UUID or autoincrementing integer, primary key | |
| file_id | foreign key to file id | |
| company_name | name of originator | |
| company_id | alphanumeric code to identify originator | |
| standard_entry_class | CCD (Corporate Credit or Debit), PPD (Prearranged Payment or Deposit), etc. | |
| entry_description | | |
| effective_entry_date | banking day on which originator intends the batch to settle | |
| batch_number | | |
| total_debit | | BIGINT |
| total_credit | | BIGINT |
| company_discretionary_ data | | |
| settlement_date | | |
| originating_dfi_id | | |
| entry_count | | |
| entry_hash | | |
| created_at | | |

TABLE 9

| An example SQL table of ACH entries. | | |
|---|---|---|
| id | entry ID, UUID or autoincrementing integer, primary key | |
| batch_id | foreign key to batch ID | |
| transaction_code | debit or credit | |
| receiving_dfi_id | routing number | |
| dfi_account_number | RDFI's (receiving depository financial institution) user's account number (may be encrypted) | |
| amount | e.g., in cents | BIGINT |
| id_number | | |

TABLE 9-continued

An example SQL table of ACH entries.

receiving_company_name identifies receiver
entry_trace_number
discretionary_data
addenda_record_indicator
created_at

TABLE 10

An example SQL table of ACH addenda.

| id | addenda ID, UUID or autoincrementing integer, primary key |
|---|---|
| entry_id | foreign key to entry ID |
| addenda_type | |
| return_reason | for return addenda |
| original_entry_trace_number | for return addenda |
| original_receiving_dfi_id | for return addenda |
| addenda_info | for return addenda |
| addenda_trace_number | for return addenda |
| payment_related_info | for regular addenda |
| addenda_sequence_number | for regular addenda |
| entry_detail_sequence_number | for regular addenda |
| created_at | |

In particular embodiments, with payment instruction API 520, the receiver processor 140 may ensure there is enough funds in the account at the external financial entity 530 and the main activity account at its receiver institution 145 (e.g., bank) by transferring cash between the two accounts on a specified (e.g., monthly) basis. In particular embodiments, the receiver processor 140 may generate a user interface operable for one or more of accessing a centralized view of the first resource account, managing the first resource account, initiating a payment origination from an account associated with the external financial entity 530, monitoring a status of the payment origination, reprocessing the payment origination if the payment origination is rejected, remediating a settlement error associated with the first resource account, accessing, for one or more first accounts associated with the first resource account, from an account ledger associated with the receiver processor 140 via the payment instruction APIs 520, a first account balance for each of the first accounts, or accessing, for one or more second accounts associated with the account associated with the external financial entity 530, from the one or more remote servers associated with the external financial entity 530 via the payment instruction APIs 520, a second account balance for each of the second accounts. As an example and not by way of limitation, for internal users (e.g., finance and operation users) associated with the receiver processor 140, the receiver processor 140 may provide a portal for a centralized view of each user's account, to manage user accounts, and to submit ACH transfers (push or pull). This portal may be a user interface (UI) to interact with the account at the external financial entity 530. In particular embodiments, the internal users may use the portal to initiate and track ACH origination from the accounts at the external financial entity 530. The payment instruction API 520 may enable the internal users to initiate all ACH originations from the account at the external financial entity 530, which may allow for programmatically tracking ACH transfers. The internal users may also monitor the status of ACH transfers of the account at the external financial entity 530 (e.g., whether the transfer was accepted by the external financial entity 530, whether the transfer was acknowledged by the external financial entity 530, whether the transfer was bounced by the external financial entity 530, etc.). The internal users may additionally retry a bounced ACH for the account at the external financial entity 530. The payment instruction API 520 may also enable the internal users to remediate settlement errors, e.g., clearing queue failures. The payment instruction API 520 may further enable the internal users to view balances based largely on data from the account ledger and data associated with the account at the external financial entity 530. As an example and not by way of limitation, the internal users may view information related to settlement accounts including current balance, list of all daily settlements, account status (e.g., open, paid), and associated ACH transfers, as well as information related to reserve accounts including current balance, list of all ACH transfers and associated events (e.g., funding, debit due to losses), chargeback credits including list of all chargebacks credits, and list of all ACH transfers (push or pull initiated by either the receiver processor 140 or the user) and associated event (e.g., settlement payment, reserve funding, fee collection, chargeback credit).

In particular embodiments, the portal may have different levels of permissions to ensure that the receiver processor 140 limits the number of people who can initiate ACH originations. As an example and not by way of limitation, the portal may have a read-only permission (i.e., no ability to origination ACH transfers) versus read-and-write permission (i.e., has ability to originate ACH transfers). As another example and not by way of limitation, the portal may have more granular permissions such as limiting who can originate from which bank accounts, limiting the amount of origination (e.g., any amount above $10K needs the highest level of permission), restricting who can do ACH pushes versus ACH pulls, and different write permissions for ACH originations versus other potential edits such as raising balance check thresholds. In addition, the portal may have an audit trail of all actions taken, especially for ACH originations. The portal may log who took the action, what the action was, and when the action occurred.

In particular embodiments, the UI for the portal may be a simple form where users can enter the following information. Users may enter the type of ACH transfer via a dropdown box with options of "internal rebalancing" or "external transfer." Users may also enter the reason for the ACH. For internal rebalancing, there may be a dropdown box with option of "account rebalancing." For external transfer, there may be an option of "settlement." For "From account," there may be a dropdown box with options of either the account at the external financial entity 530 or the main activity account at the receiver institution 145. For "To account," there may be a dropdown box with options of either the external financial entity 530, the main activity account at the receiver institution 145, or the user account. The UI may also comprise an integer field for the amount to be entered. The UI may additionally comprise a memo entry, which may be a string field subject to the same limits as the field. Users may also enter ACH settlement date, which is the date that the ACH should settle (can be future dated). Users may additionally enter instance ID (settlement), which may be the ID of the instance impacted. Users may further enter network settlement date (settlement), which may be the date of settlement when the payment is to be collected.

In particular embodiments, the portal may also have a table of all ACH originations. The table may display each ACH entry and include the example columns and functionalities listed in Table 11. Table 11 illustrates example columns and functionalities for ACH entries.

TABLE 11

Example columns and functionalities for ACH entries.

| Column Name | Description | Functionality |
|---|---|---|
| Network settlement date | date when the transactions cleared; may be aligned with funding management logic | |
| ACH submitted date | timestamp of when the NACHA file was submitted. The NACHA file may comprise a set of instructions that trigger a batch of ACH payments as soon as it is uploaded into a bank portal | can filter and sort on this |
| ACH settled date | date entered for ACH settlement | |
| ID | unique identifier for this ACH entry | |
| Trace ID | trace number submitted to the external financial entity (e.g., Fed) | |
| Instance ID | identifies which instance this belongs to | can filter on this |
| Instance name | name of the instance (may be retrievable from the instance object) | can filter on this |
| Amount | amount being transferred | |
| Status | RECEIVED: batch success received BOUNCED: return file from the external financial entity FAILED: batch failure received from the external financial entity UNKNOWN: catch-all for ACH transfers where the status is uncertain | can filter on this |
| Response code | for bounced transactions, the reason why the bounce happened | |
| Action | for bounced ACH, there may be a RETRY button that users can click on to retry a bounce | can click on this |

In particular embodiments, the portal may surface a table of pending settlements and action buttons of approve/deny. Table 12 illustrates an example table of pending settlements and action buttons.

TABLE 12

Example table of pending settlements and action buttons.

| Column Name | Description | Functionality |
|---|---|---|
| Date Submitted | date that the ACH form was submitted | |
| Type | internal rebalancing or external transfer | can filter and sort on this |
| Reason | account rebalancing, ACH settlement | can filter and sort on this |
| From | origination account | |
| To | destination account | |
| amount | amount to be transferred | |
| Memo | description entered | |
| ACH settlement date | date that the ACH may settle (may be future dated) | |
| instance ID | identifies which instance this belongs to if it is an ACH settlement | can filter on this |
| instance name | name of the instance (may be retrievable from the instance object) | can filter on this |
| action | APPROVE: amount may be included in the next ACH window DENY: amount may not be included in the next ACH window Correct amount may need to be manually triggered via the ACH origination form | can click on this |

In particular embodiments, the portal may further enable internal users to manually set up an "expected bank transaction" entry to more easily reconcile ACH pushes from users. The expected ACH transfer may include fields such as amount, type of transfer (e.g., pre-funding, reserve account funding, etc.) and may be linked to other internal objects (e.g., reserve invoice ID). A separate service may automatically link this expected ACH transfer to the actual funding in accounts at the receiver institution 145 (e.g., bank accounts) associated with the receiver processor 140. The portal may additionally provide an option to manage limits configurations. In particular embodiments, the receiver processor 140 may integrate the data from a separate billing and invoicing platform into the portal. As an example and not by way of limitation, invoices for reserve funding may automatically trigger an expected ACH transfer entry.

In particular embodiments, with payment instruction API 520, the receiver processor 140 may streamline processing of the issuance of chargeback credits to users. An enterprise client may want to regularly get chargeback credits so that they can refund their end users in a timely manner. Internal users associated with the receiver processor 140 may want to be able to track the ACH pushes to users for financial reporting purposes and may also want tools to submit chargeback credits easily. In particular embodiments, the receiver processor 140 may receive, via the payment instruction APIs 520, from a network provider, a chargeback report associated with the transfer of resources. The receiver processor 140 may then reconcile the chargeback report against the plurality of validated payment origination files and validated payment return files stored in the second database. The receiver processor 140 may then determine a chargeback value for the first resource account based on the reconciled chargeback report. The receiver processor 140 may further send, via the payment instruction APIs 520, to the network provider, instructions for crediting the chargeback value to the first resource account. The embodiments disclosed herein may have another technical advantage of streamline-processing the issuance of chargeback credits to users as the receiver processor may automate the dispute and chargeback process for the users.

As an example and not by way of limitation, to streamline processing of chargeback cases such as those mentioned above, the receiver processor 140 may ingest chargeback reporting from the network provider. The receiver processor 140 may then parse the ingested reports and reconcile them against the transaction data using acquirer reference number or other data. The internal users may then manually enter the credit amount in a portal for chargeback credit management. In particular embodiments, the credit may go to the program-level funding source (e.g., the same account users use to pay for settlement). The amount entered may be net of chargeback fees so that the user can cover the chargeback fees in this instance. Optionally, internal users may download from the portal a CSV file of chargebacks issued. In alternative embodiments, the receiver processor 140 may parse the reports from the network provider, reconcile them against the claims data using acquirer reference number as the foreign key, and automatically update the admin portal with the reported amounts. As an example and not by way of limitation, there may be a column in the admin portal indicating the final credit amount. This column may be populated based on the credit amount reported by the network provider, which may be net of chargeback fees. The receiver processor 140 may credit the users this amount. The internal users may continue to manually trigger a credit to be issued to the funding account specified by the user. Once an "issue credit" button in the portal is clicked, the receiver processor 140 may automatically credit the final credit amount reported by the network provider to the funding account.

In particular embodiments, with payment instruction API 520, the receiver processor 140 may automatically trigger ACH pulls and reporting for settlement of post-pay enterprise clients. The frequency may be any suitable frequency (e.g., daily, biweekly) set by the users. In particular embodiments, the receiver processor 140 may initiate, via the payment instruction APIs 520, a consolidated payment pull from an account associated with the external financial entity 530. The consolidated payment pull may be initiated for a plurality of transfers of resources associated with the plurality of validated payment origination files and validated payment return files. In particular embodiments, initiating the consolidated payment pull from the account associated with the external financial entity 530 may be responsive to determining that a specified settlement-frequency is satisfied. Customers may retrieve details of their daily settlement via the payment instruction API 520. In particular embodiments, the receiver processor 140 may generate a settlement report for a plurality of transfers of resources associated with the plurality of validated payment origination files and validated payment return files. The receiver processor 140 may further provide, via the payment instruction APIs 520, the settlement report to a user associated with the first resource account in response to a query from the user. The receiver processor 140 may additionally support options to consolidate daily transactions into a single ACH pull for cardholder funded users. The embodiments disclosed herein may have another technical advantage of automating post-pay program-level settlements and consolidating cardholder-funded transactions into a single daily ACH as the receiver processor 140 may calculate and report settlements and programmatically collect settlements via ACH pull into an account at an external financial entity 530.

In particular embodiments, with payment instruction API 520, the receiver processor 140 may calculate settlement amounts based on the instance funding configuration and data that is reconciled against network-provider/network reporting. The receiver processor 140 may programmatically settle into an account at the external financial entity 530 (e.g., Fed account) via an ACH pull. The receiver processor 140 may further report on settled amounts via emailed CSVs and an API. In particular embodiments, the receiver processor 140 may receive, via the payment instruction APIs 520, from a network provider, a settlement report associated with the first resource account. The receiver processor 140 may then reconcile the settlement report against the plurality of validated payment origination files and validated payment return files stored in the second database. The receiver processor 140 may then calculate, based on a funding configuration associated with the first resource account and the reconciliation, a plurality of settlement values associated with the first resource account. The receiver processor 140 may then process the settlement values for an account associated with the external financial entity 530 via a payment pull. The receiver processor 140 may further send, via the payment instruction APIs 520, the settlement values to a user associated with the first resource account.

In particular embodiments, the receiver processor 140 may utilize ledger balances to determine the amount owed for ACH settlements. The receiver processor 140 may also create two batch processes to automate/improve settlement calculations and processing by accelerating the timeline so that the receiver processor 140 does not have to float money for an extra period of time (e.g., a day) and submitting a second "remediation" settlement using data that is reconciled against network-provider reporting.

In particular embodiments, the receiver processor 140 may float funds for network-provider settlements, for example, because the receiver processor 140 may not initiate manual ACH settlement pulls until morning of the next day (D+1). This means that, while the network provider collects settlement on D+1, the receiver processor 140 may not receive user funds until the day after (D+2), resulting in a float of a considerable amount of money. To eliminate this float, the automated ACH settlement process may submit ACH files to the external financial entity 530 (e.g., the Fed) by, e.g., 2 AM of the next day. Based on the ACH schedules of the external financial entity 530, the receiver processor 140 may receive these funds the same day (D+1) by, e.g., 8:30 AM, which may eliminate weekday float and reduce weekend/holiday floats.

The second "remediation" settlement using network-provider data may be illustrated as follows. In particular embodiments, there may be two rounds of settlement for a given day's settled transactions. The first settlement may be next day (D+1) before, e.g., 2 AM, using internal calculations leveraging SQL queries. The internal SQL query results may closely match network-provider reported settlement. As not all network-provider reports may be available before 2 AM, attempting to switch over to network-provider reporting for the first settlement may not result in greater accuracy than just using the existing SQL query. The second settlement may be 2-3 days later (D+2) before 2 AM using data reconciled against network-provider reporting. This may be a "true-up" settlement to include the <1% of network-provider reported settlements that require manual remediation in order to correctly identify the right user. The amount may be added to the daily first settlement total. In other words, it may not be a separate ACH entry. As an example and not by way of limitation, if there is $60 in settled transaction before 7:30 PM EST on April 15 and then $40 in settled transaction between 7:30 PM EST and 11:59 PM EST on April 15, the following may happen. On April 16, the network provider may pull $60 from the receiver processor 140 and the receiver processor 140 may initiate an ACH pull for $60 from the users. On April 17, the network provider may pull the remaining $40 from the receiver processor 140 and the receiver processor 140 may initiate an ACH pull for $40 from the users. For remediations beyond 2-3 days, the receiver processor 140 may collect on all transactions, even if the remediations are past the 2-3 days window. The receiver processor 140 may choose to refund the user for this late remediation but that may be posted as a separate transaction. In particular embodiments, settlements may be recorded in a new dataset that may be surfaced to users via an API. The dataset may maintain a record of each settled transaction and the ACH pull that it was a part of.

For fully automated end-to-end process for program-level post-pay users, the user experience may be exemplified as follows. To begin with, users may securely send banking information (e.g., bank name, routing number, account number) to the receiver processor 140 either via API or a dashboard interface provided by the receiver processor 140. If the dashboard interface is used, there may be an additional field asking for the email address that may receive daily settlement reports as part of the enterprise onboarding experience. There may be controls in place so that a user can be either cardholder-funded or program-level funded but not both. Conversion between cardholder-funded and program-level funded may also be handled with care. Then, the internal service of the receiver processor 140 may associate the funding source with the appropriate ledger account. Then a user may verify that it is their bank account (e.g., micro transactions). Customers may then retrieve daily settlement reports via a settlement reconciliation API. They may also receive emails that breakdown the total amount pulled by transaction. In particular embodiments, the receiver processor 140 may send emails of CSVs with format that follows the API schema. In alternative embodiments, the same reports may be made available in the dashboard interface. Next, ACH pull may be automatically submitted to the external financial entity 530 (e.g., the Federal Reserve ("Fed")) by, e.g., 2:00 AM the next day. Upon approval, an ACH pull may be initiated based on the calculated settlement amount and the instance's settlement configuration. Lastly, settlement funds may be pulled into the account at the external financial entity 530 first before being transferred into the main activity account at the receiver institution 145 (e.g., bank) associated with the receiver processor 140.

Similar process may be enabled for cardholder-funded users looking to consolidate settlement into a single daily ACH pull, with a difference being their instance configuration. At the instance-level, the receiver processor 140 may store settlement configurations that may determine how and when to aggregate settled transactions for ACH pulls. Table 13 illustrates example instance-level settlement configurations.

TABLE 13

Example instance-level settlement configurations.

| Type | Aggregation | Frequency |
|---|---|---|
| program-level | total daily aggregate settlement OR per-transaction settlement | daily OR custom X days |
| cardholder-funded | total daily aggregate settlement OR per-transaction settlement | daily OR custom X days |

In particular embodiments, the receiver processor 140 may generate reports regarding automated ACH pull settlements and send them to users via, e.g., email. The reports may comprise a CSV file for the aggregate amount settled and per-transaction details. The CSV file may comprise summary CSV fields such as a network settlement date, which is the date for the settlement, and a settled gross amount, which is a positive amount indicating an outbound settlement (i.e., a credit), versus a negative amount indicating an inbound settlement (i.e., a refund). The CSV file may also comprise per-transaction CSV fields. As an example and not by way of limitation, per-transaction CSV fields may comprise one or more of token, card token, card program token, event token, transaction token, bin, card memo (e.g., nickname for the card), last four digits on the card, acquirer ID (i.e., unique ID of the acquirer), merchant category code, merchant descriptor, network settlement date, or settled gross amount.

In particular embodiments, for cardholder-funded users, the payment instruction API 520 may enable the cardholder-funded users to consolidate their ACH settlement pulls into a single ACH pull per day instead of an ACH pull per transaction. As a result, the cardholder-funded users may declutter and better understand their bank statements. The payment instruction API 520 may enable internal users to easily track bounces, inform users of these bounces, and retry these bounces per user request.

In particular embodiments, the receiver processor 140 may provide a dynamic and customizable development platform for implementing VBAN solutions to decouple a user's root account, including stored value balances for the root account, from publicly routable account credentials. The user may be, for example, an account holder 105, an enterprise client, or employees of an enterprise client. In particular embodiments, the receiver processor 140 may decouple a user's root account credentials from publicly routable account credentials with a virtual bank account (VBAN) having a Payment Account Number (PAN). In particular embodiments, a transaction authorization request may comprise publicly routable account credentials of a VBAN associated with a receiving entity, the user, and a stored value balance of an external resource account (e.g., a traditional bank account issued by a bank) associated with the user. The VBAN may be configured as a privacy shield for the publicly routable account credentials of the external resource account by decoupling the stored value balance of the external resource account from the publicly routable account credentials of the external resource account. Although this disclosure refers to VBANs throughout, this disclosure contemplates any suitable means of decoupling a user's root account credentials from publicly routable account credentials. The receiver processor 140 may allow VBANs to fully participate in financial interchange networks and clearing houses by sending and receiving payments or transactions. By utilizing permission-based VBANs customized for user-specific use cases, the receiver processor 140 may facilitate real-time payments or transactions (as opposed to, e.g., simply caching funds) while protecting sensitive financial information, shielding users against fraud and overbilling, and ensuring that each approved transaction conforms to specific parameters applicable to that transaction. Different from a traditional bank account, a VBAN may decouple the concept of stored value balance from publicly routable account credentials. For example, a VBAN may shield a user's root account's credentials and stored value balances from being transmitted to other entities for a given transaction (e.g., a merchant, an issuing bank, a financial interchange network, or a clearing house). More information on VBANs may be found in U.S. patent application Ser. No. 17/859,943, filed 7 Jul. 2022, which is incorporated by reference.

In particular embodiments, the payment instruction API 520 may enable ledger users to fund their programs' VBANs at the receiver processor 140 via ACH push from their external bank account or via ACH originations. Ledger users may easily set recurring ACH originations every few days so that their programs may not run out of funds. Ledger users may also automatically initiate an ACH origination for an amount of money every time their balance hits a preset amount. In particular embodiments, the first resource account may be a virtual bank account (VBAN). Accordingly, the receiver processor 140 may receive, via the payment instruction APIs 520, from a user associated with the VBAN, a first request to fund the VBAN with a specified first resource value. The receiver processor 140 may then initiate a first payment push from an account associated with the external financial entity 530. The first payment push may comprise the specified first resource value. The receiver processor 140 may further fund the VBAN based on the first payment push.

The payment instruction API 520 may additionally enable ledger users to fund their end-users' cards by pushing/originating funds via ACH to their programs' VBAN at the receiver processor 140 and using APIs to instantly move funds from their programs' VBAN to their end-users' accounts. In particular embodiments, the receiver processor 140 may receive, via the payment instruction APIs 520, from the user, a second request to fund an end-user account associated with the VBAN with a specified second resource value. The receiver processor 140 may further fund, via the payment instruction APIs 520, from the VBAN, the end-user account with the specified second resource value.

Figure 6:
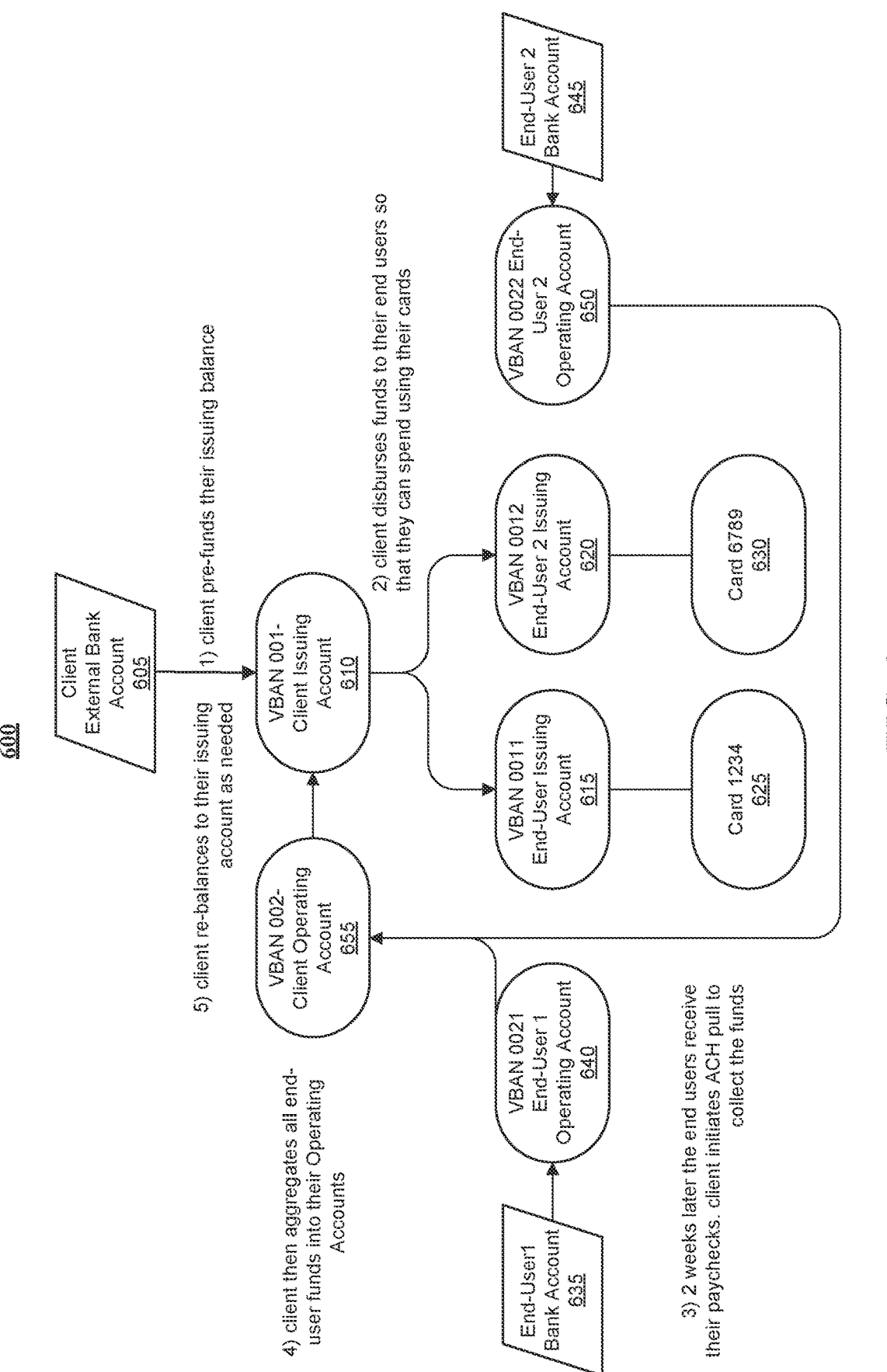
FIG. 6 illustrates an example flow diagram for an enterprise client to offer cash advance to their end users.

FIG. 6 illustrates an example flow diagram 600 for an enterprise client to offer cash advances to their end users. The enterprise client may fund their end-users' cards using the client's own funds at the receiver processor 140 and then later collect funds from their end-users' external bank accounts into the client's VBAN at the receiver processor 140 via ACH. At step 1, the enterprise client may pre-fund their issuing balance from client external bank account 605 to client issuing account 610 ("VBAN 001-client issuing account"). At step 2, the enterprise client may disburse funds to their end users so that they can spend using their cards. As an example and not by way of limitation, the disbursed funds may first go to end-user issuing account 615 ("VBAN 0011 end-user issuing account") and end-user issuing account 620 ("VBAN 0012 end-user 2 issuing account"), respectively. Card 625 ("Card 1234") and card 630 ("6789") may be then funded from the two VBAN accounts, respectively. At step 3, 2 weeks later the end users receive their paychecks. The enterprise client may then initiate ACH pull to collect the funds. In particular embodiments, the ACH pull may be from end-user bank account 635 ("end-user 1 bank account") to end-user operation account 640 ("VBAN 0021 end-user 1 operation account") and from end-user bank account 645 ("end-user 2 bank account") to end-user operation account 650 ("VBAN 0022 end-user 2 operation account"), respectively. At step 4, the enterprise client may then aggregate all end-user funds into their operating accounts, e.g., from end-user operation account 640 ("VBAN 0021 end-user 1 operation account") and end-user operation account 650 ("VBAN 0022 end-user 2 operation account") to client operating account 655 ("VBAN 002-client operating account"). At step 5, the enterprise client may re-balance to their issuing account as needed, e.g., from client operating account 655 ("VBAN 002-client operating account") to client issuing account 610 ("VBAN 001-client issuing account").

Figure 7:
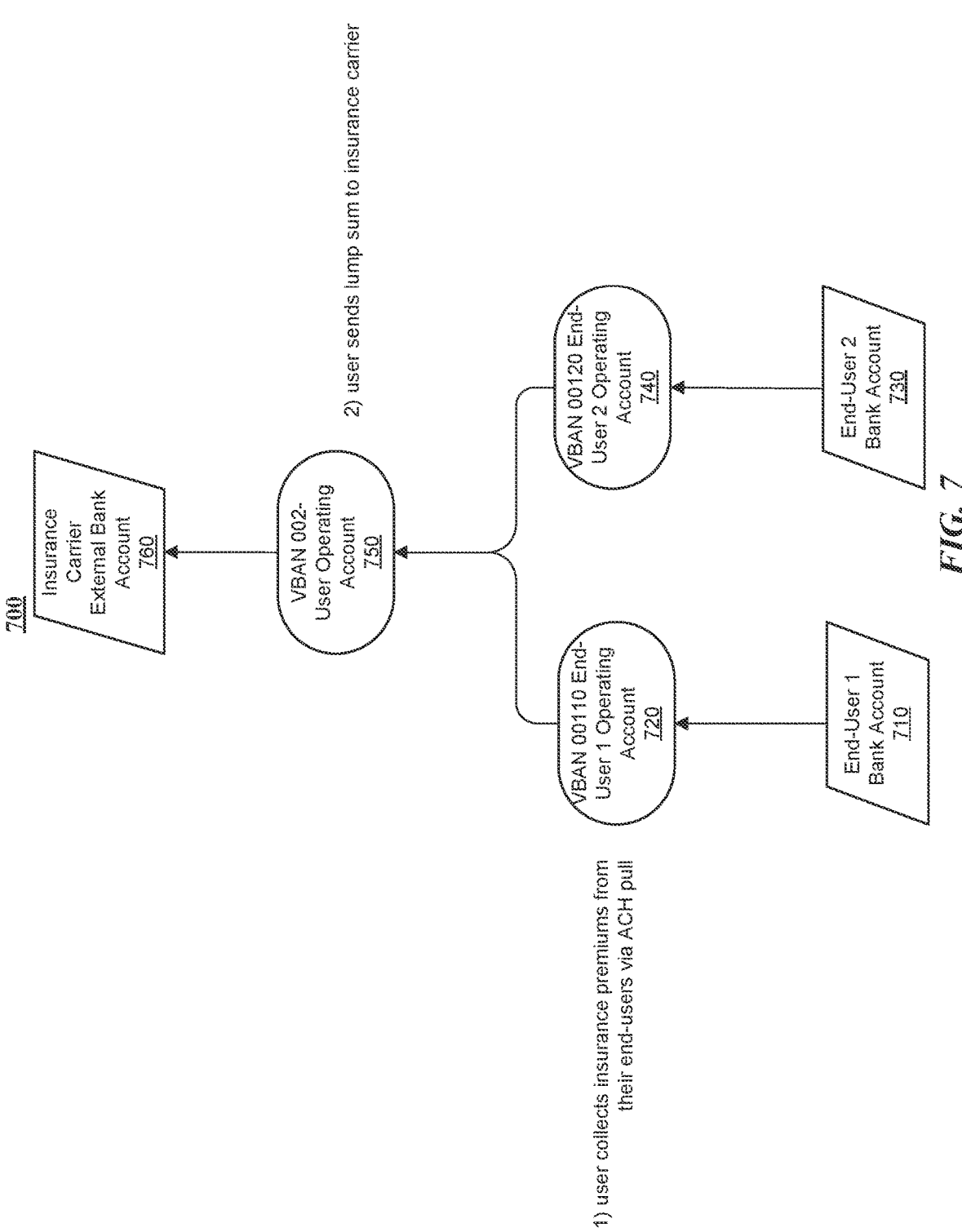
FIG. 7 illustrates an example flow diagram workflow for collecting monthly insurance premiums.

In particular embodiments, with payment instruction API 520, the receiver processor 140 may enable a back-office software for insurance carriers to help carriers collect premiums from their end users via ACH. The receiver processor 140 may create VBANs for each end user of an insurance carrier. Then, the receiver processor 140 may initiate ACH pulls from each end user for their monthly insurance premiums and then do a single ACH push to the insurance carrier. In particular embodiments, the receiver processor 140 may receive, via the payment instruction APIs 520, from a user associated with a first VBAN, a request to generate one or more second VBANs for one or more end-users associated with the user, respectively. The receiver processor 140 may then generate the one or more second VBANs. The receiver processor 140 may then initiate one or more payment pulls from the one or more second VBANs, respectively. The receiver processor 140 may further fund the first VBAN via a consolidated payment push based on a sum amount generated from the one or more payment pulls. FIG. 7 illustrates an example flow diagram workflow 700 for collecting monthly insurance premiums. At step 1, the user (i.e., the back-office software) may collect insurance premiums from their end-users via ACH pull. As an example and not by way of limitation, the ACH pulls may be from end-user bank account 710 ("end-user 1 bank account") to end-user operating account 720 ("VBAN 00110 end-user 1 operating account") and from end-user bank account 730 ("end-user 2 bank account") to end-user operating account 740 ("VBAN 00120 end-user 2 operating account"), respectively. At step 2, the user may send a lump sum to the insurance carrier, e.g., from user operating account 750 ("VBAN 002-user operating account") to insurance carrier external bank account 760.

Figure 8:
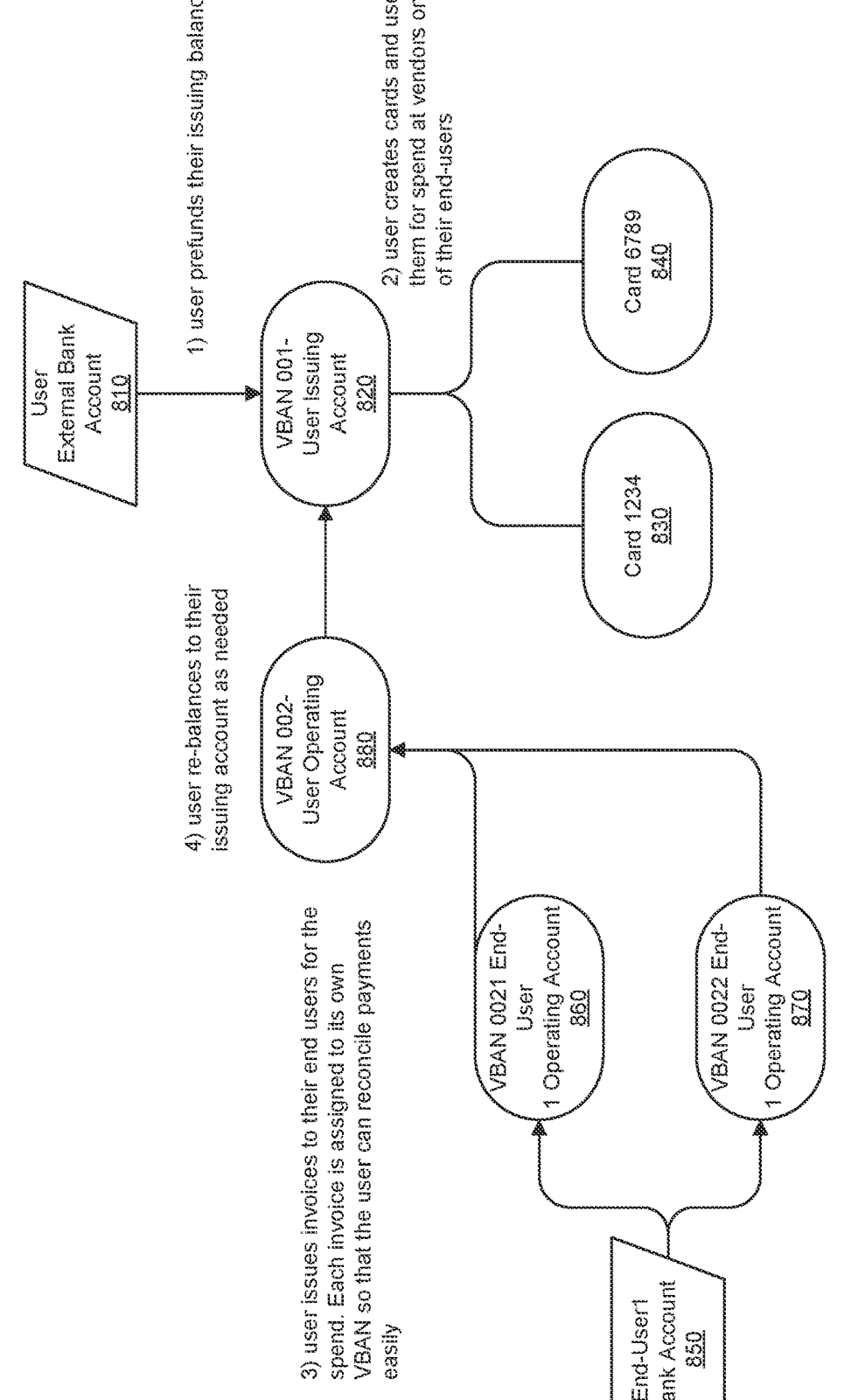
FIG. 8 illustrates an example flow diagram workflow for issuing invoices based on VBAN.

In particular embodiments, with payment instruction API 520, the receiver processor 140 may enable a merchant who issues invoices to create a VBAN for each invoice so that the merchant can attribute the received ACH payments to a specific invoice. FIG. 8 illustrates an example flow diagram workflow 800 for issuing invoices based on VBAN. At step 1, a user (i.e., a merchant who issues invoices) may prefund their issuing balance, e.g., from user external bank account 810 to user issuing account 820 ("VBAN 001-user issuing account"). At step 2, the user may create cards, e.g., card 830 ("card 1234") and card 840 ("card 6789"), and use them for spending at vendors on behalf of their end-users. At step 3, the user may issue invoices to their end-users for the spending. Each invoice may be assigned to its own VBAN so that the user can reconcile payments easily. As an example and not by way of limitation, payments from end-user bank account 850 ("end-user 1 bank account") may be pulled to end-user operating account 860 ("VBAN 0021 end-user 1 operating account") and end-user operating account 870 ("VBAN 0022 end-user 1 operating account"), respectively, based on the invoices assigned to the two VBANs. The funds may then go from end-user operating account 860 ("VBAN 0021 end-user 1 operating account") and end-user operating account 870 ("VBAN 0022 end-user 1 operating account") to user operating account 880 ("VBAN 002-user operating account"). At step 4, the user may re-balance their issuing account as needed.

FIG. 9 illustrates an example method 900 for utilizing payment instruction APIs 520 to process payment requests. The method may begin at step 910, where the receiver processor 140 may receive, via one or more receiver application programming interfaces (APIs) configured as payment instruction APIs 520, a first request to create a payment origination file associated with instructions to transfer resources from a first resource account to a second resource account, wherein the one or more payment instruction APIs 520 comprise a plurality of endpoints operable for a user to specify one or more of the first resource account, the second resource account, an amount of resources, a memo, an internal description, or an internal tag, wherein the plurality of endpoints comprise one or more external endpoints configured for one or more of generating and transmitting the payment origination file based on the instructions, accessing a status associated with the transfer of the resources from the first resource account to the second resource account, or accessing a summary associated with the transfer of the resources from the first resource account to the second resource account, wherein the plurality of endpoints comprise one or more internal endpoints configured for one or more of validating the payment origination file and the payment return file, storing the validated payment origination file and the validated payment return file, or releasing, from an account ledger, one or more pending debits associated with the transfer of the resources based on a pending duration of the one or more pending debits being greater than a threshold period of time. At step 920, the receiver processor 140 may generate, based on information associated with the first request, the requested payment origination file, wherein the information associated with the first request comprises one or more of an entry identifier, a batch identifier, a transaction code, a routing number, an account number, a transaction amount, a name of a receiving entity, an entry trace number, an addenda record indicator, or a created time. At step 930, the receiver processor 140 may transmit, via the payment instruction APIs 520, to one or more remote servers associated with an external financial entity 530, the requested origination file. At step 940, the receiver processor 140 may receive, via the payment instruction APIs 520 from the one or more remote servers associated with the external financial entity 530, a payment return file associated with the payment origination file. At step 950, the receiver processor 140 may store, in a first database associated with the receiver processor 140, the payment origination file and the payment return file. At step 960, the receiver processor 140 may validate, by a parsing module associated with the receiver processor 140, in response to the payment origination file and the payment return file being stored in the first database, the payment origination file and the payment return file. At step 970, the receiver processor 140 may store, in a second database associated with the receiver processor 140, the validated payment origination file and the validated payment return file, wherein the second database is configured to receive queries associated with one or more of a plurality of validated payment origination files and validated payment return files stored in the second database. At step 980, the receiver processor 140 may initiate via the payment instruction APIs 520, a consolidated payment pull from an account associated with the external financial entity 530, wherein the consolidated payment pull is initiated for a plurality of transfers of resources associated with the plurality of validated payment origination files and validated payment return files. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for utilizing payment instruction APIs to process payment requests including the particular steps of the method of FIG. 9, this disclosure contemplates any suitable method for utilizing payment instruction APIs to process payment requests including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

User Information Encryption Service

In particular embodiments, the receiver processor 140 may utilize an encryption service to encrypt confidential and sensitive user information as encrypted data and store the encrypted data in a secure storage database. Such confidential and sensitive user information may be necessary to route a user payment. As an example and not by way of limitation, the confidential and sensitive user information may comprise a routing number and an account number. In particular embodiments, the encrypted data may be associated with an encryption key. The encryption service may access an encryption key which it stores only in volatile, non-persistent memory. The encryption key may also not be stored with the same database or same storage as the encrypted data. As a result, the encryption key and the encrypted data may always be stored separately. The encryption key may be used to encrypt or decrypt the confidential and sensitive user information. In particular embodiments, the encryption service may only load the encryption key into memory and then pass it to the secure storage database to decrypt the encrypted data as needed. Although this disclosure describes processing particular payment requests in a particular manner, this disclosure contemplates processing any suitable payment request in any suitable manner.

In particular embodiments, the receiver processor 140 may receive, from a requesting server by a receiver application programming interface (API) configured as an encryption service API, a first request to retrieve account data associated with a virtual bank account (VBAN) associated with an account holder 105. The VBAN may be decoupled from an external resource account associated with the account holder 105 and the VBAN. The first request may comprise an identifier associated with the VBAN. In particular embodiments, the receiver processor 140 may access, from a system management service by the encryption service API, an encryption key associated with a secure storage database. The secure storage database may comprise encrypted account data associated with the VBAN and the external resource account. The receiver processor 140 may then transmit, by the encryption service API to the secure storage database, the encryption key and the identifier associated with the VBAN. The receiver processor 140 may then receive, from the secure storage database by the encryption service API, decrypted account data associated with the VBAN. In particular embodiments, the decrypted account data may be determined by a decryption module based on the encryption key and the encrypted account data associated with the VBAN. The receiver processor 140 may further transmit, to the requesting server, the decrypted account data associated with the VBAN.

In particular embodiments, the system management service may be accessed by an encryption service. When the encryption service starts up, it may load the encryption key into its memory. The encryption service may then listen for requests for stored encrypted data. As an example and not by way of limitation, a user may request the encryption service to post a new account which may be associated with a routing number, an account number, a user name, and other relevant information. The encryption service may take the account information and use the encryption key to encrypt it. The encryption service may further send the encrypted data to the secure storage database. In particular embodiments, the system management service cannot be accessed by the secure storage database. Running the encryption service in memory such that it only loads the encryption key into memory and then passes the encryption key to the secure storage database to decrypt the encrypted data as needed may be an effective solution for addressing the technical challenge of guaranteeing that the encrypted data cannot be accessed any other party except the encryption service.

Figure 10:
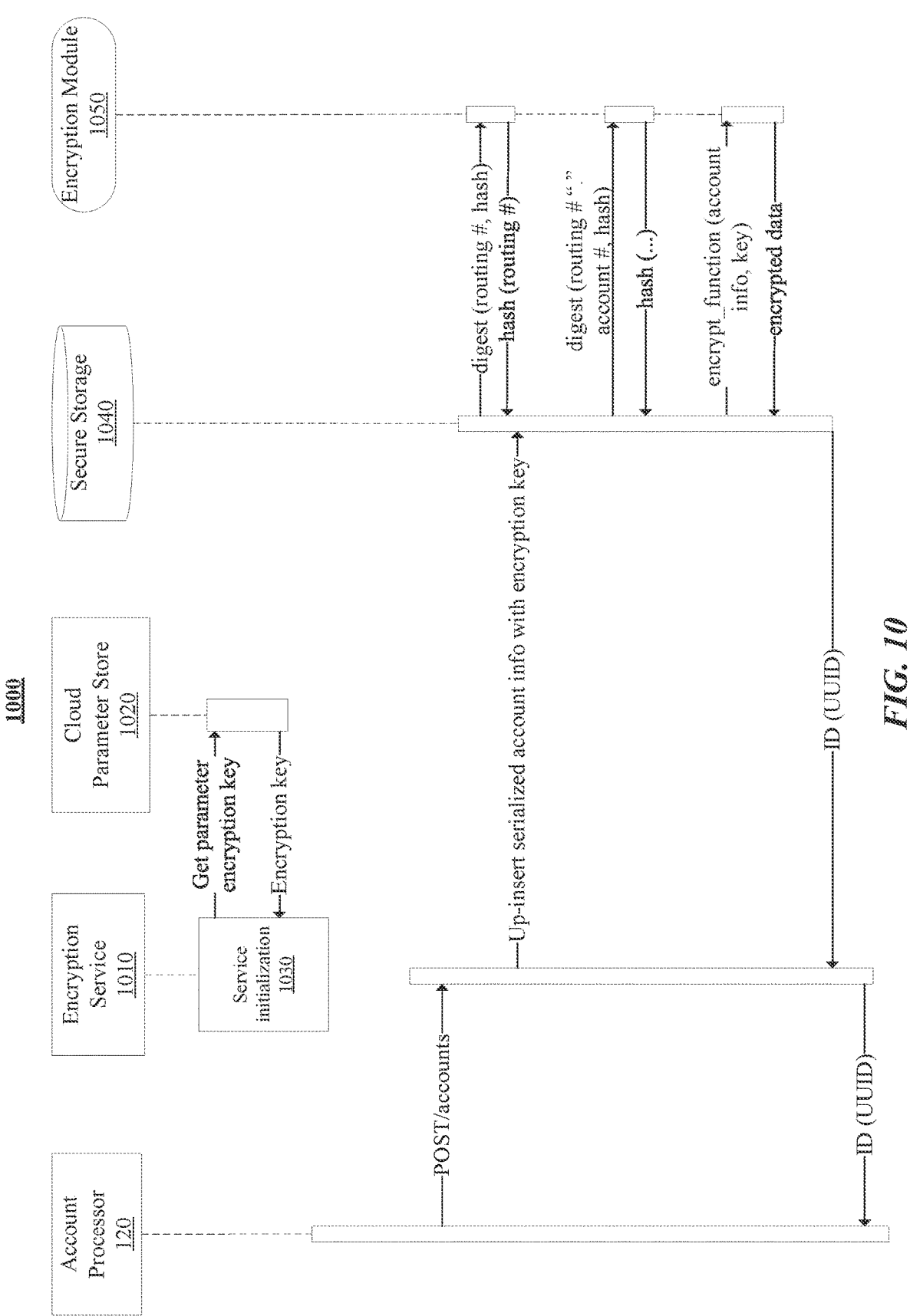
FIG. 10 illustrates an example sequence diagram of the encryption service.

FIG. 10 illustrates an example sequence diagram 1000 of the encryption service. The encryption service 1010 may reside only in memory. When the encryption service 1010 starts up, it may get parameter encryption key from the cloud parameter store 1020. Upon receiving the encryption key, the encryption service 1010 may create an ephemeral service initialization 1030. One reason this setup is secure may be that the encryption service 1010 may have access to both the cloud parameter store 1020 and the secure storage 1040. However, the encryption service 1010 may need two separate permissions. First, the encryption service 1010 may have to ask permission to get the encryption key from the cloud parameter store 1020. Then separately the encryption service 1010 may have to ask permission to connect to the secure storage 1040.

In particular embodiments, the account data may comprise one or more of an account identifier, an account alias, an account number, a routing number, an instance identifier, an entity name, an account type, or an account state. In particular embodiments, the account processor 120 may post account information to the encryption service 1010. The encryption service 1010 may then buddle the account information with the encryption key, e.g., by up-inserting serialized account information with the encryption key. The encryption service 1010 may then send the bundled data to the secure storage 1040. In particular embodiments, the secure storage 1040 may be an on-disk permanent storage. The secure storage database may store account metadata tables. The metadata may be encrypted at rest. The account metadata tables may be only accessible by the encryption service APIs. Table 14 illustrates an example account metadata table.

TABLE 14

Example account metadata table.

| account_id | uuid | internal id for account |
| --- | --- | --- |
| routing_number | str | 9 digits |
| account_number | str | |
| company_name | str | |
| account_type | Enum("CHECKING", "DEBIT") | |
| account_state | Enum("PENDING", "ENABLED", "DELETED", "CLOSED") | |

In particular embodiments, the identifier associated with the VBAN may comprise one or more of an alias associated with the VBAN, a first hash based on a routing number associated with the VBAN, a second hash based on an account number associated with the VBAN, a third hash of based on the routing number and the account number associated with the VBAN, a fourth hash based on an instance identifier associated with the VBAN, or a fifth hash based on an account alias associated with the VBAN.

In particular embodiments, a complete history of account information may be stored in a separate append-only audit history table, so information may be never lost. Table 15 shows an example user account audit history. In particular embodiments, the receiver processor 140 may store, in an audit history database, for an audit associated with the VBAN, data comprising one or more of an audit history identifier associated with the audit, the identifier associated with the VBAN, an alias associated with the VBAN, a first hash based on a routing number associated with the VBAN, a second hash based on an account number associated with the VBAN, a third hash based on the routing number and the account number associated with the VBAN, a fourth hash based on an instance identifier associated with the VBAN, an account state associated with the VBAN, the encrypted account data, an account creation timestamp associated with the VBAN, an account update timestamp associated with the VBAN, an audit action timestamp associated with the audit, or an audit action associated with the audit.

TABLE 15

Example user account audit history.

| Column | Type | Nullable? | Description |
| --- | --- | --- | --- |
| audit_id | UUID | No | unique audit history ID |
| id | UUID | No | UUID |

TABLE 15-continued

Example user account audit history.

| Column | Type | Nullable? | Description |
| --- | --- | --- | --- |
| alias | str | yes | optional alias for account |
| routing_number_x | bytea | Yes | sha1 hash of routing # |
| account_number_x | bytea | Yes | sha1 hash of routing #.account # |
| instance_id_x | bytea | Yes | sha1 hash of instance ID |
| account_state | Enum | Yes | PENDING, ENABLED, DELETED, CLOSED |
| account_info_x | bytea | Yes | encrypted account information |
| created_ts | timestamp | No | account creation date |
| updated_ts | timestamp | No | time of update of account |
| audit_ts | timestamp | No | always time of audit history insertion |
| audit_action | Enum | No | INSERT, UPDATE, DELETE |

In particular embodiments, an encryption module 1050 may process the encryption and generate the hash. As an example and not by way of limitation, the encryption module 1050 may digest routing number to generate its hash. The generated hash may be stored back in the secure storage 1040. As another example and not by way of limitation, the encryption module 1050 may digest (routing number). (account number) to generate its hash. The generated hash may be also stored back in the secure storage 1040. The hashes of the routing number and (routing number). (account number) may be stored to enable lookups. Besides routing number and account number, the encryption module 1050 may generate hashes for instance ID and alias, which may be later used for indexing.

In particular embodiments, the encryption module 1050 may use an encrypt function to encrypt the account information with the encryption key. The encryption module 1050 may store the encrypted data back in the secure storage 1040. Unencrypted information may not get stored.

In particular embodiments, the secure storage 1040 may return an ID (UUID) to the encryption service 1010. The encryption service 1010 may send the ID (UUID) to the account processor 120. The account processor 120 may use that ID later to reference the encrypted data.

In particular embodiments, the encryption service 1010 may use two cloud secure string encrypted secrets to access the API. The first may be the encrypted database password to login to the back-end service database, i.e., secure storage database. In other words, the encryption service API may have access to an encrypted database password configured to access the secure storage database. In particular embodiments, the encryption service API may access the secure storage database with the encrypted database password when the encryption service API is initialized. In particular embodiments, the encryption service API may access the secure storage database with the encrypted database password in response to receiving the first request. The second may be a separate encryption passphrase, not available to the secure storage database, that is used to encrypt and decrypt account information using a decrypt function of the encryption module 1050. In alternative embodiments, the encryption service API may be configured to have password-less access the secure storage database.

In particular embodiments, the encryption service 1010 may be accessed via the encryption service API. The encryption service API may be configured to store data in volatile memory storage. The encryption service API may enable a user to add, update, and get account information from encrypted storage. In particular embodiments, the encryption service API may comprise a plurality of endpoints operable to process requests associated with account data stored in the secure storage database. The plurality of endpoints may be configured for one or more of searching for the identifier by one or more of a routing number, an account number, an account alias, or an instance identifier associated with the VBAN, searching for one or more accounts by an instance identifier, retrieving information by an account identifier, generating a new encrypted object comprising user account information, or updating an existing encrypted object comprising the user account information.

The following describes example endpoints. "GET/account" may be used to search and retrieve information by instance ID, by the hash of the routing number and the hash of the account number, by account alias, or by UUID. The query parameters may comprise the UUID, routing number (string) and account number (string), and alias (string). Example responses indicating errors may include HTTP 400 error: Invalid request (no UUID, routing number and account number, or alias given), and HTTP 404 error: Account not found.

Another endpoint may be "GET/account/<instance_id>" used to search for accounts by instance ID. The query parameters may comprise the instance ID. An example response indicating an error may include HTTP 404 error: No accounts found for instance ID. Another endpoint may be "GET/account/<uuid>" used to get information by UUID. This endpoint may be used by the payment instructions API 520 to get account information needed to fill out a payment origination file. The query parameters may comprise the UUID. An example response indicating an error may include HTTP 404 error: Account not found.

Another endpoint may be "POST/account" used to create a new encrypted user account information object or update an existing account by routing number and account number. All metadata values may be required. In the request body, if creating a new object, routing number and account number may be required. If updating an existing object, UUID may be required. All other keys in the request body may be optional. The endpoint may return the newly created account ID.

Another endpoint may be "POST/account/<uuid>" used to create or update an account by UUID. Another endpoint may be "PUT/account/<uuid>" used to create or replace an account by UUID. All updateable values may be optional, but at least one may be included to be updated. Another endpoint may be "DELETE/account/<uuid>" used to close an account by UUID. In particular embodiments, the receiver processor 140 may receive, by the encryption service API, a second request to update the account data associated with the VBAN based on one or more account data updates. The second request may comprise an identifier associated with the VBAN. In particular embodiments, the one or more account data updates may comprise replacing account data associated with the VBAN with account data associated with a second VBAN or updating an account state to a closed account state. The receiver processor 140 may then transmit, by the encryption service API, to the secure storage database, the encryption key and the identifier associated with the VBAN. The receiver processor 140 may then receive, from the secure storage database, by the encryption service API, the decrypted account data associated with the VBAN. The receiver processor 140 may then update the account data based on the one or more account data updates. The receiver processor 140 may further store, in the secure storage database, encrypted updated account data in the secure storage database. In particular embodiments, the encrypted updated account data may be determined by an encryption module 1050 based on the encryption key and the updated account data. In particular embodiments, the one or more account data updates may comprise updating an account state to a deleted account state. Responsive to the account state being updated to a deleted account state, the encrypted account data associated with the VBAN may be deleted from the secure storage server.

In particular embodiments, the encryption service 1010 may provide support for other services associated with the receiver processor 140. The other services may authenticate themselves and submit their requests to the encryption service 1010, so they do not need to have access to the encryption key. The other services may need to have permission to ask the encryption service to encrypt or decrypt information.

As an example and not by way of limitation, the receiver processor 140 may use the payment instructions API 520 to route payments between different types of payment services. To make the payment routing easier, the encryption service 1010 may encrypt an actual bank account into a token, store it in the secure storage database, and provide it to the payment instructions API 520 to route the payments. As an example and not by way of limitation, the encryption service 1010 may encrypt account information associated with a cash account of the receiver processor 140 and an account at an external financial entity 530 (e.g., a Fed account). The receiver processor 140 may then use the payment instructions API 520 to balance the two accounts with the encryption service 1010 accessing and decrypting the encrypted data. In particular embodiments, the receiver processor 140 may receive, via one or more receiver application programming interfaces (APIs) configured as payment instruction APIs 520, a request to create a payment origination file associated with instructions to transfer resources from the VBAN to a resource account. The receiver processor 140 may then generate, based on the decrypted account data associated with the VBAN, the requested payment origination file. The receiver processor 140 may then transmit, via the payment instruction APIs 520, to one or more remote servers associated with an external financial entity 530, the requested origination file. The receiver processor 140 may then receive, via the payment instruction APIs 520 from the one or more remote servers associated with the external financial entity 530, a payment return file associated with the payment origination file. The receiver processor 140 may then store, in a first database associated with the receiver processor 140, the payment origination file and the payment return file. The receiver processor 140 may then validate, by a parsing module associated with the receiver processor 140, in response to the payment origination file and the payment return file being stored in the first database, the payment origination file and the payment return file. The receiver processor 140 may further store, in a second database associated with the receiver processor 140, the validated payment origination file and the validated payment return file. In particular embodiments, the second database may be configured to receive queries associated with one or more of a plurality of validated payment origination files and validated payment return files stored in the second database.

As another example and not by way of limitation, the account ledger may interact with the encryption service 1010 regarding a new VBAN. The encryption service 1010 may encrypt the account information associated with the VBAN and store it in the secure storage database. The account ledger may then route to or from the VBAN, to or from an external bank account, with the encryption service 1010 accessing and decrypting the encrypted data. In particular embodiments, the receiver processor 140 may receive a first network event corresponding to a first transaction associated with a transfer of resources between the VBAN and a third party. The first network event may be assigned a unique transaction group identifier associated with the first transaction. The receiver processor 140 may then identify, based on the decrypted account data associated with the VBAN, a ledger account recorded in an account ledger. The ledger account may represent the VBAN in the account ledger. In particular embodiments, the receiver processor 140 may authorize the transfer of resources based at least in part on a balance value of the ledger account. The receiver processor 140 may then record a first update in the account ledger. Recording the first update may comprise recording the unique transaction group identifier in association with the first update and the ledger account, and modifying the balance value of the ledger account in the account ledger based on a transfer value associated with the transfer of resources. In particular embodiments, the receiver processor 140 may receive a second network event corresponding to a second transaction associated with the transfer of resources between the VBAN and the third party. The receiver processor 140 may then determine that a unique transaction group identifier assigned to the second network event matches the unique transaction group identifier associated with the first update and the ledger account. In particular embodiments, the determination of a match may indicate that the balance value of the VBAN has already been modified based on the transfer of resources. The receiver processor 140 may further record a second update in the account ledger. In particular embodiments, recording the second update may comprise recording the unique transaction group identifier in association with the second update without modifying the balance value of the ledger account in the account ledger.

The following describes an example use case associated with a VBAN. A user may want to set up a VBAN and fund the VBAN. The user may request, via an encryption API, the encryption service 1010 to withdraw, e.g., 100 dollars from their bank account and put the funds in the VBAN. The user may provide their routing number and account number to the encryption service 1010. The encryption service 1010 may then encrypt the routing number and account number with the encryption key. The encryption service 1010 may request the payment service, via the payment instructions API 520, to verify the account information with the user and verify that the user made the request, e.g., by depositing a small amount of funds in the account. The encryption service 1010 may further request the payment service, via the payment instructions API 520, to make the funds transfer. In particular embodiments, the account ledger may keep track of the fund withdrawal from the user's bank account, deposit it in an account at an external financial entity 530 (e.g., Fed account), and attribute it to the user's VBAN. In particular embodiments, the user may directly interact with the encryption API such that the encryption take place before the payment service, account ledger, or any other service gets involved.

FIG. 11 illustrates an example method 1100 for utilizing an encryption service 1010 to process confidential and sensitive user information. The method may begin at step 1110, where the receiver processor 140 may receive, from a requesting server by a receiver application programming interface (API) configured as an encryption service API, a first request to retrieve account data associated with a virtual bank account (VBAN) associated with an account holder 105, wherein the VBAN is decoupled from an external resource account associated with the account holder 105 and the VBAN, wherein the first request comprises an identifier associated with the VBAN, wherein the identifier associated with the VBAN comprises one or more of an alias associated with the VBAN, a first hash based on a routing number associated with the VBAN, a second hash based on an account number associated with the VBAN, a third hash of based on the routing number and the account number associated with the VBAN, a fourth hash based on an instance identifier associated with the VBAN, or a fifth hash based on an account alias associated with the VBAN, wherein the account data comprises one or more of an account identifier, an account alias, an account number, a routing number, an instance identifier, an entity name, an account type, or an account state, and wherein the encryption service API is configured to store data in volatile memory storage. At step 1120, the receiver processor 140 may access, from a system management service by the encryption service API, an encryption key associated with a secure storage database, wherein the secure storage database comprises encrypted account data associated with the VBAN and the external resource account, wherein the encryption service API has access to an encrypted database password configured to access the secure storage database, wherein the encryption service API accesses the secure storage database with the encrypted database password when the encryption service API is initialized or in response to receiving the first request, wherein the encryption service API comprises a plurality of endpoints operable to process requests associated with account data stored in the secure storage database, wherein the plurality of endpoints are configured for one or more of searching for the identifier by one or more of a routing number, an account number, an account alias, or an instance identifier associated with the VBAN, searching for one or more accounts by an instance identifier, retrieving information by an account identifier, generating a new encrypted object comprising user account information, or updating an existing encrypted object comprising the user account information, and wherein the system management service cannot be accessed by the secure storage database. At step 1130, the receiver processor 140 may transmit, by the encryption service API to the secure storage database, the encryption key and the identifier associated with the VBAN. At step 1140, the receiver processor 140 may receive, via the payment instruction APIs 520 from the one or more remote servers associated with the external financial entity 530, a payment return file associated with the payment origination file. At step 1150, the receiver processor 140 may receive, from the secure storage database by the encryption service API, decrypted account data associated with the VBAN, wherein the decrypted account data is determined by a decryption module based on the encryption key and the encrypted account data associated with the VBAN. At step 1160, the receiver processor 140 may transmit, to the requesting server, the decrypted account data associated with the VBAN. Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for utilizing an encryption service to process confidential and sensitive user information including the particular steps of the method of FIG. 11, this disclosure contemplates any suitable method for utilizing an encryption service to process confidential and sensitive user information including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Systems and Methods

Figure 12:
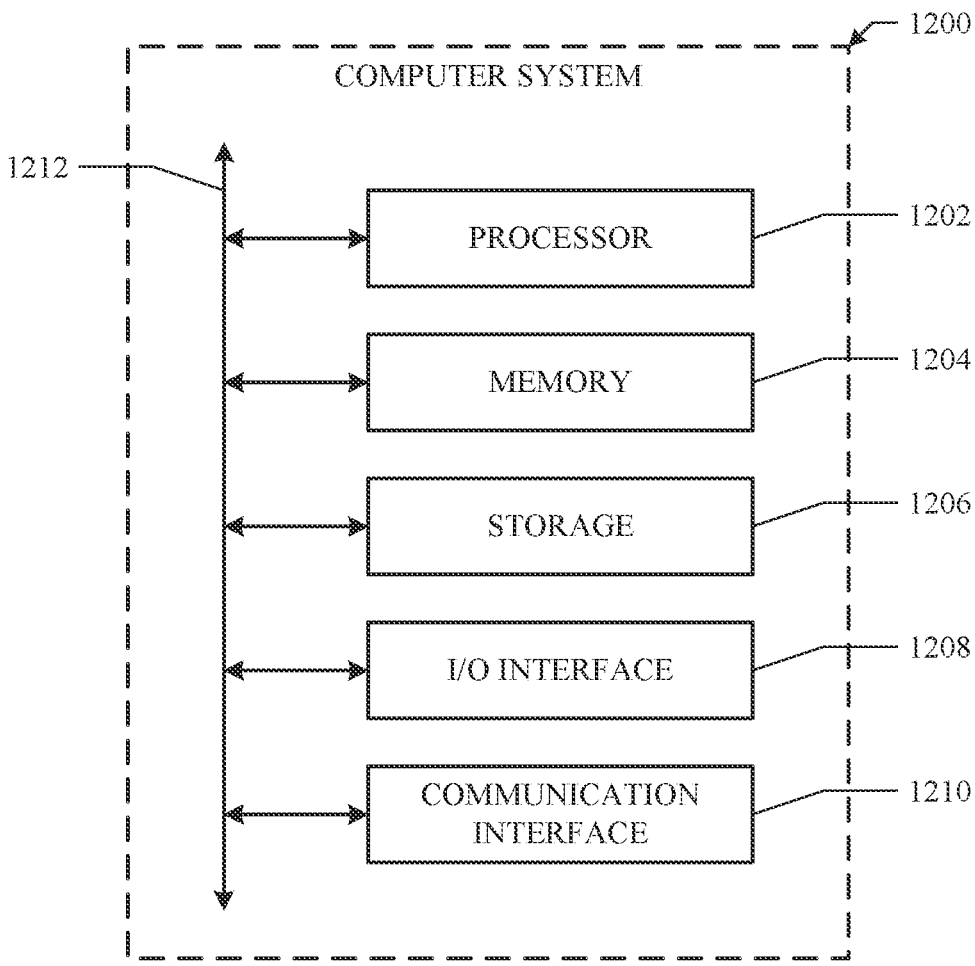
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more servers associated with a receiver processor:

receiving, from a requesting server via a receiver application programming interface (API) associated with the receiver processor and configured as an encryption service API, a first request to transfer resources from a virtual bank account (VBAN) associated with an account holder to a resource account, wherein the VBAN is decoupled from an external resource account associated with the account holder and the VBAN, and wherein the first request comprises an identifier associated with the VBAN;

responsive to receiving the first request, retrieving, from a volatile memory associated with a system management service via the encryption service API, an encryption key associated with a secure storage database, wherein the secure storage database comprises encrypted account data associated with the VBAN and the external resource account, and wherein the encryption key is loaded into the volatile memory from a data storage associated with the system management service that cannot be accessed by the secure storage database;

requesting, via the encryption service API, permission to access the secure storage database;

responsive to receiving permission to access the secure storage database, bundling the identifier with the encryption key to generate a set of bundled data;

transmitting, via the encryption service API to the secure storage database, the set of bundled data generated based on the encryption key and the identifier associated with the VBAN;

receiving, from the secure storage database via the encryption service API, decrypted account data associated with the VBAN, wherein the decrypted account data is determined by a decryption module based on the encryption key and the encrypted account data associated with the VBAN;

determining that account data associated with the VBAN based at least in part on the decrypted account data is required for processing the first request;

authorizing the transfer of resources from the VBAN to the resource account based at least in part on the determined account data; and transmitting, via the encryption service API, to the requesting server, an authorization of the transfer of resources from the VBAN to the resource account.

2. The method of claim 1, wherein the account data comprises one or more of an account identifier, an account alias, an account number, a routing number, an instance identifier, an entity name, an account type, or an account state.

3. The method of claim 1, further comprising:

receiving, via the encryption service API, a second request to update the account data associated with the VBAN based on one or more account data updates, wherein the second request comprises an identifier associated with the VBAN;

transmitting, via the encryption service API, to the secure storage database, the encryption key and the identifier associated with the VBAN;

receiving, from the secure storage database via the encryption service API, the decrypted account data associated with the VBAN;

updating the account data based on the one or more account data updates;

storing, in the secure storage database, encrypted updated account data in the secure storage database, wherein the encrypted updated account data is determined by an encryption module based on the encryption key and the updated account data.

4. The method of claim 3, wherein the one or more account data updates comprise replacing account data associated with the VBAN with account data associated with a second VBAN.

5. The method of claim 3, wherein the one or more account data updates comprise updating an account state to a closed account state.

6. The method of claim 3, wherein the one or more account data updates comprise updating an account state to a deleted account state, and wherein, responsive to the account state being updated to the deleted account state, the encrypted account data associated with the VBAN is deleted from the secure storage database.

7. The method of claim 1, further comprising:

storing, in an audit history database, for an audit associated with the VBAN, data comprising one or more of:

an audit history identifier associated with the audit;

the identifier associated with the VBAN;

an alias associated with the VBAN;

a first hash based on a routing number associated with the VBAN;

a second hash based on an account number associated with the VBAN;

a third hash based on the routing number and the account number associated with the VBAN;

a fourth hash based on an instance identifier associated with the VBAN;

an account state associated with the VBAN;

the encrypted account data;

an account creation timestamp associated with the VBAN;

an account update timestamp associated with the VBAN;

an audit action timestamp associated with the audit; or an audit action associated with the audit.

8. The method of claim 1, wherein the encryption service API has access to an encrypted database password configured to access the secure storage database.

9. The method of claim 8, wherein the encryption service API accesses the secure storage database with the encrypted database password when the encryption service API is initialized.

10. The method of claim 8, wherein the encryption service API accesses the secure storage database with the encrypted database password in response to receiving the first request.

11. The method of claim 1, wherein the encryption service API is configured to have password-less access the secure storage database.

12. The method of claim 1, wherein the identifier associated with the VBAN comprises one or more of:

an alias associated with the VBAN;

a first hash based on a routing number associated with the VBAN;

a second hash based on an account number associated with the VBAN;

a third hash based on the routing number and the account number associated with the VBAN;

a fourth hash based on an instance identifier associated with the VBAN; or a fifth hash based on an account alias associated with the VBAN.

13. The method of claim 1, wherein the encryption service API is configured to store data in the volatile memory storage.

14. The method of claim 1, wherein the encryption service API comprises a plurality of endpoints operable to process requests associated with account data stored in the secure storage database.

15. The method of claim 14, wherein the plurality of endpoints are configured for one or more of:

searching for the identifier by one or more of a routing number, an account number, an account alias, or an instance identifier associated with the VBAN;

searching for one or more accounts by an instance identifier;

retrieving information by an account identifier;

generating a new encrypted object comprising user account information; or updating an existing encrypted object comprising the user account information.

16. The method of claim 1, further comprising:

receiving, via one or more receiver application programming interfaces (APIs) configured as payment instruction APIs, a request to create a payment origination file associated with instructions to transfer the resources from the VBAN to the resource account;

generating, based on the decrypted account data associated with the VBAN, the requested payment origination file;

transmitting, via the payment instruction APIs, to one or more remote servers associated with an external financial entity, the requested payment origination file;

receiving, via the payment instruction APIs from the one or more remote servers associated with the external financial entity, a payment return file associated with the payment origination file;

storing, in a first database associated with the receiver processor, the payment origination file and the payment return file;

validating, by a parsing module associated with the receiver processor, in response to the payment origination file and the payment return file being stored in the first database, the payment origination file and the payment return file; and storing, in a second database associated with the receiver processor, the validated payment origination file and the validated payment return file, wherein the second database is configured to receive queries associated with one or more of a plurality of validated payment origination files and validated payment return files stored in the second database.

17. The method of claim 1, further comprising:

receiving a first network event corresponding to a first transaction associated with a transfer of resources between the VBAN and a third party, wherein the first network event is assigned a first unique transaction group identifier associated with the first transaction;

identifying, based on the decrypted account data associated with the VBAN, a ledger account recorded in an account ledger, wherein the ledger account represents the VBAN in the account ledger;

authorizing the transfer of resources based at least in part on a balance value of the ledger account;

recording a first update in the account ledger, wherein recording the first update comprises recording the first unique transaction group identifier in association with the first update and the ledger account, and modifying the balance value of the ledger account in the account ledger based on a transfer value associated with the transfer of resources;

receiving a second network event corresponding to a second transaction associated with the transfer of resources between the VBAN and the third party;

determining that a second unique transaction group identifier assigned to the second network event equals the first unique transaction group identifier associated with the first update and the ledger account, wherein the determination of an equivalence indicates that the balance value of the VBAN has already been modified based on the transfer of resources; and recording a second update in the account ledger, wherein recording the second update comprises recording the second unique transaction group identifier in association with the second update without modifying the balance value of the ledger account in the account ledger.

18. One or more computer-readable non-transitory storage media embodying software that is operable when executed to:

receive, from a requesting server by a receiver application programming interface (API) associated with a receiver processor and configured as an encryption service API, a first request to transfer resources from a virtual bank account (VBAN) associated with an account holder to a resource account, wherein the VBAN is decoupled from an external resource account associated with the account holder and the VBAN, and wherein the first request comprises an identifier associated with the VBAN;

responsive to receiving the first request, retrieve, from a volatile memory associated with a system management service via the encryption service API, an encryption key associated with a secure storage database, wherein the secure storage database comprises encrypted account data associated with the VBAN and the external resource account, and wherein the encryption key is loaded into the volatile memory from a data storage associated with the system management service that cannot be accessed by the secure storage database;

request, via the encryption service API, permission to access the secure storage database;

responsive to receiving permission to access the secure storage database, bundle the identifier with the encryption key to generate a set of bundled data;

transmit, via the encryption service API to the secure storage database, the set of bundled data generated based on the encryption key and the identifier associated with the VBAN;

receive, from the secure storage database via the encryption service API, decrypted account data associated with the VBAN, wherein the decrypted account data is determined by a decryption module based on the encryption key and the encrypted account data associated with the VBAN;

determine that account data associated with the VBAN based at least in part on the decrypted account data is required for processing the first request;

authorize the transfer of resources from the VBAN to the resource account based at least in part on the determined account data; and transmit, via the encryption service API, to the requesting server, an authorization of the transfer of resources from the VBAN to the resource account.

19. A receiver processor comprising: one or more processors; and a non-transitory memory coupled to the one or more processors comprising instructions executable by the one or more processors, the one or more processors operable when executing the instructions to:

receive, from a requesting server by a receiver application programming interface (API) associated with the receiver processor and configured as an encryption service API, a first request to transfer resources from a virtual bank account (VBAN) associated with an account holder to a resource account, wherein the VBAN is decoupled from an external resource account associated with the account holder and the VBAN, and wherein the first request comprises an identifier associated with the VBAN;

responsive to receiving the first request, retrieve, from a volatile memory associated with a system management service via the encryption service API, an encryption key associated with a secure storage database, wherein the secure storage database comprises encrypted account data associated with the VBAN and the external resource account, and wherein the encryption key is loaded into the volatile memory from a data storage associated with the system management service that cannot be accessed by the secure storage database;

request, via the encryption service API, permission to access the secure storage database;

responsive to receiving permission to access the secure storage database, bundle the identifier with the encryption key to generate a set of bundled data;

transmit, via the encryption service API to the secure storage database, the set of bundled data generated based on the encryption key and the identifier associated with the VBAN;

receive, from the secure storage database via the encryption service API, decrypted account data associated with the VBAN, wherein the decrypted account data is determined by a decryption module based on the encryption key and the encrypted account data associated with the VBAN;

determine that account data associated with the VBAN based at least in part on the decrypted account data is required for processing the first request;

authorize the transfer of resources from the VBAN to the resource account based at least in part on the determined account data; and transmit, via the encryption service API, to the requesting server, an authorization of the transfer of resources from the VBAN to the resource account.

*    *    *    *    *